United States Patent
Yin et al.

(10) Patent No.: US 11,411,623 B2
(45) Date of Patent: Aug. 9, 2022

(54) CHANNEL MEASUREMENT METHOD AND COMMUNICATIONS APPARATUS

(71) Applicant: HUAWEI TECHNOLOGIES CO., LTD., Guangdong (CN)

(72) Inventors: Haifan Yin, Shenzhen (CN); Huangping Jin, Shanghai (CN); Zhimeng Zhong, Shanghai (CN); Xiaoyan Bi, Shanghai (CN); Li Fan, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/347,850

(22) Filed: Jun. 15, 2021

(65) Prior Publication Data

US 2021/0314034 A1    Oct. 7, 2021

Related U.S. Application Data

(63) Continuation of application No. PCT/CN2019/124792, filed on Dec. 12, 2019.

(30) Foreign Application Priority Data

Dec. 18, 2018   (CN) .......................... 201811550128.X

(51) Int. Cl.
    *H04B 7/02*       (2018.01)
    *H04B 7/0456*     (2017.01)
    *H04B 7/0417*     (2017.01)

(52) U.S. Cl.
    CPC ......... *H04B 7/0456* (2013.01); *H04B 7/0417* (2013.01)

(58) Field of Classification Search
    CPC .......................... H04B 7/0456; H04B 7/0417
    (Continued)

(56) References Cited

U.S. PATENT DOCUMENTS

| 2014/0177683 A1 | 6/2014 | Krishnamurthy et al. |
| 2017/0302353 A1 | 10/2017 | Rahman et al. |

(Continued)

FOREIGN PATENT DOCUMENTS

| CN | 107370558 A | 11/2017 |
| CN | 107534533 A | 1/2018 |

(Continued)

OTHER PUBLICATIONS

3GPP TS 38.214 V15.3 0 (Sep. 2018), 3rd Generation Partnership Project; Technical Specification Group Radio Access Network; NR; Physical layer procedures for data (Release 15), Sep. 2018, 96 pages.

(Continued)

*Primary Examiner* — Zewdu A Kassa
(74) *Attorney, Agent, or Firm* — Fish & Richardson P.C.

(57) ABSTRACT

One example method includes receiving one or more precoded reference signals, where the one or more precoded reference signals are obtained by precoding one or more reference signals based on K angle vectors. First indication information can then be generated, where the first indication information is used to indicate at least one delay vector and P weighting coefficients corresponding to P angle-delay pairs, the at least one delay vector and the P weighting coefficients are determined based on the one or more precoded reference signals, each of the P angle-delay pair includes one of the K angle vectors and one of the at least one delay vector, and the P angle-delay pairs and the P weighting coefficients are used to determine a precoding matrix, where P and K are positive integers, and where $P \geq 1$, $K \geq 1$. The first indication information can then be sent.

20 Claims, 6 Drawing Sheets

(58) Field of Classification Search
USPC .................................. 375/267, 219, 295, 316
See application file for complete search history.

(56) References Cited

U.S. PATENT DOCUMENTS

2018/0069680 A1 3/2018 Lee et al.
2021/0076241 A1* 3/2021 Yang .................... H04L 5/0051

FOREIGN PATENT DOCUMENTS

| CN | 107733485 A | 2/2018 |
| CN | 108418612 A | 8/2018 |
| CN | 108631891 A | 10/2018 |
| EP | 3499776 A1 | 6/2019 |
| WO | 2018028463 A1 | 2/2018 |

OTHER PUBLICATIONS

Huawei, HiSilicon, "Discussion on CSI enhancement," 3GPP TSG RAN WG1 Meeting #95, R1-1812242, Spokane, USA, Nov. 12-16, 2018, 8 pages.
Intel Corporation, "Discussion on Type II CSI compression," 3GPP TSG RAN WG1 #95, R1-1812511, Spokane, USA, Nov. 12-16, 2018, 10 pages.
Office Action issued in Chinese Application No. 201811550128.X dated Oct. 26, 2020, 16 pages (with English translation).
PCT International Search Report and Written Opinion issued in International Application No. PCT/CN2019/124792 dated Mar. 13, 2020, 16 pages (with English translation).
Extended European Search Report issued in European Application No. 19900807.9 dated Dec. 3, 2021, 8 pages.

\* cited by examiner

CHANNEL MEASUREMENT METHOD AND COMMUNICATIONS APPARATUS

CROSS-REFERENCE TO RELATED APPLICATIONS

This application is a continuation of International Application No. PCT/CN2019/124792, filed on Dec. 12, 2019, which claims priority to Chinese Patent Application No. 201811550128.X, filed on Dec. 18, 2018. The disclosures of the aforementioned applications are hereby incorporated by reference in their entireties.

TECHNICAL FIELD

This application relates to the wireless communications field and, more specifically, to a channel measurement method and a communications apparatus.

BACKGROUND

In a massive multiple-input multiple-output (Massive MIMO) technology, a network device may reduce interference between a plurality of users and interference between a plurality of signal flows of one user through precoding. This helps improve signal quality, implement spatial multiplexing, and increase spectrum utilization.

A terminal device may, for example, determine a precoding matrix through downlink channel measurement, and expect to use a feedback to enable the network device to obtain a precoding matrix that is the same as or similar to the precoding matrix determined by the terminal device. Specifically, the terminal device may indicate the precoding matrix, for example, by feeding back one or more beam vectors and a weighting coefficient corresponding to the one or more beam vectors. For details of the feedback of the terminal device, refer to a type II codebook feedback mode defined in the new radio (NR) protocol TS38.214.

However, such a feedback mode causes relatively high feedback overheads.

SUMMARY

This application provides a channel measurement method and a communications apparatus, to reduce feedback overheads.

According to a first aspect, a channel measurement method is provided. The method may be performed by a terminal device, or may be performed by a chip disposed in the terminal device.

Specifically, the method includes: receiving precoded reference signals, where the precoded reference signals are obtained by precoding reference signals based on K angle vectors; generating first indication information, where the first indication information is used to indicate at least one delay vector and P weighting coefficients corresponding to P angle-delay pairs, the at least one delay vector and the P weighting coefficients are determined based on the precoded reference signals, each of the P angle-delay pairs includes one of the K angle vectors and one of the at least one delay vector, and the P angle-delay pairs and the P weighting coefficients corresponding to the P angle-delay pairs are used to determine a precoding matrix, where both P and K are positive integers; and sending the first indication information.

According to a second aspect, a channel measurement method is provided. The method may be performed by a network device, or may be performed by a chip disposed in the network device.

Specifically, the method includes: sending precoded reference signals, where the precoded reference signals are obtained by precoding reference signals based on K angle vectors; receiving first indication information, where the first indication information is used to indicate at least one delay vector and P weighting coefficients corresponding to P angle-delay pairs, the at least one delay vector and the P weighting coefficients are determined based on the precoded reference signals, each of the P angle-delay pairs includes one of the K angle vectors and one of the at least one delay vector, and the P angle-delay pairs and the P weighting coefficients corresponding to the P angle-delay pairs are used to determine a precoding matrix, where both P and K are positive integers; and determining the precoding matrix based on the first indication information.

According to the foregoing technical solutions, the network device may precode a downlink reference signal based on a predetermined angle vector so that the terminal device can perform downlink channel measurement based on a precoded reference signal. Because the network device precodes the reference signal based on the predetermined angle vector, the terminal device may not need to determine and feed back a space domain vector (for example, the foregoing angle vector), but only needs to determine and feed back a delay vector corresponding to each angle vector and a weighting coefficient corresponding to each angle-delay pair. Therefore, a downlink channel measurement process performed by the terminal device is simplified, calculation complexity of the terminal device in the channel measurement process is reduced, and feedback overheads of the terminal device are reduced. In addition, a precoding matrix is constructed based on a plurality of space domain vectors and a plurality of frequency domain vectors so that the precoding matrix determined by the network device can adapt to a downlink channel, thereby still ensuring feedback precision while reducing the feedback overheads. Moreover, precoding a downlink reference signal based on an angle vector can reduce a quantity of reference signal ports, thereby reducing pilot overheads.

With reference to the first aspect or the second aspect, in some implementations, the K angle vectors are determined through uplink channel measurement.

Based on reciprocity between uplink and downlink channels, the network device loads a reciprocal angle vector to a downlink reference signal for downlink channel pre-compensation so that the terminal device determines, based on a received precoded reference signal, information about a downlink channel that does not have complete reciprocity. Therefore, a downlink channel measurement process performed by the terminal device is simplified, calculation complexity of the terminal device in the channel measurement process is reduced, and feedback precision can be ensured.

With reference to the first aspect or the second aspect, in some implementations, the P weighting coefficients include one or more weighting coefficients fed back for each of the K angle vectors; and for a $k^{th}$ angle vector in the K angle vectors, the first indication information is used to indicate $L_k$ weighting coefficients, the $L_k$ weighting coefficients correspond to $L_k$ angle-delay pairs in the P angle-delay pairs, and each of the $L_k$ angle-delay pairs includes the $k^{th}$ angle vector and one of $L_k$ delay vectors corresponding to the $k^{th}$ angle vector, where $L_k \geq 1$, and $L_k$ is an integer.

Regardless of whether delay vectors corresponding to any two of the K angle vectors are the same, each of the P angle-delay pairs may correspond to one weighting coefficient. The terminal device may determine, based on a received precoded reference signal obtained through precoding based on each angle vector, one or more weighting coefficients corresponding to each angle vector. When the angle vectors correspond to same delay vectors, the angle vectors correspond to a same quantity of weighting coefficients.

With reference to the first aspect or the second aspect, in some implementations, the $L_k$ weighting coefficients are determined based on a plurality of channel estimation values obtained by performing channel estimation on a plurality of RBs based on a precoded reference signal obtained through precoding based on the $k^{th}$ angle vector.

A precoded reference signal obtained through precoding based on one angle vector may correspond to one port. One or more weighting coefficients fed back by the terminal device for one angle vector may be obtained by performing channel estimation based on a precoded reference signal corresponding to one port. Therefore, the P weighting coefficients corresponding to the P angle-delay pairs may be determined based on a plurality of channel estimation values obtained by performing channel estimation on a plurality of RBs based on the precoded reference signals obtained through precoding based on the K angle vectors.

With reference to the first aspect or the second aspect, in some implementations, the at least one delay vector includes one or more delay vectors fed back for each of the K angle vectors; and for a $k^{th}$ angle vector in the K angle vectors, the first indication information is used to indicate $L_k$ delay vectors, and the $k^{th}$ angle vector and the $L_k$ delay vectors are used to determine $L_k$ angle-delay pairs in the P angle-delay pairs, where $L_k \geq 1$, and $L_k$ is an integer.

The terminal device may feed back the one or more delay vectors for each of the K angle vectors. One or more delay vectors fed back for one angle vector and the angle vector may constitute one or more angle-delay pairs used for precoding matrix determining.

Optionally, the method further includes: receiving second indication information, where the second indication information is used to indicate a quantity of delay vectors fed back for each of the K angle vectors.

Optionally, the method further includes: sending second indication information, where the second indication information is used to indicate a quantity of delay vectors fed back for each of the K angle vectors.

Optionally, a quantity of delay vectors fed back for each of the K angle vectors is a predefined value.

In other words, the quantity of delay vectors fed back for each angle vector may be indicated by the network device to reduce feedback overheads of the terminal device; or may be determined by the terminal device and reported to the network device to implement better downlink channel adaptation; or may be predefined, for example, defined in a protocol to reduce signaling overheads.

With reference to the first aspect or the second aspect, in some implementations, the $L_k$ delay vectors are determined based on a plurality of channel estimation values obtained by performing channel estimation on a plurality of RBs based on the precoded reference signal obtained through precoding based on the $k^{th}$ angle vector.

A precoded reference signal obtained through precoding based on one angle vector may correspond to one port. One or more delay vectors fed back by the terminal device for one angle vector may be obtained by performing channel estimation based on a precoded reference signal corresponding to one port.

With reference to the first aspect or the second aspect, in some implementations, in the K angle vectors, a delay vector fed back for a first angle vector is the same as a delay vector fed back for a second angle vector, the first angle vector and the second angle vector are any two angle vectors in the K angle vectors, and the first indication information is used to indicate L delay vectors.

In other words, the L delay vectors may be shared by the K angle vectors, and the L delay vectors and the K angle vectors may be combined in pairs, to obtain K×L angle-delay pairs that can be used to construct a precoding matrix.

Optionally, the method further includes: receiving second indication information, where the second indication information is used to indicate a value of L.

Optionally, the method further includes: sending second indication information, where the second indication information is used to indicate a value of L.

Optionally, L is a predefined value.

In other words, the value of L may be indicated by the network device to reduce feedback overheads of the terminal device; or may be determined by the terminal device and reported to the network device to implement better downlink channel adaptation; or may be predefined, for example, defined in a protocol, to reduce signaling overheads.

With reference to the first aspect or the second aspect, in some implementations, the L delay vectors are determined based on a plurality of channel estimation values obtained by performing channel estimation on a plurality of RBs based on the precoded reference signals obtained through precoding based on the K angle vectors.

The terminal device may determine, based on the precoded reference signals corresponding to K ports, the L delay vectors that can be shared by the K angle vectors.

According to a third aspect, a channel measurement method is provided. The method may be performed by a terminal device, or may be performed by a chip disposed in the terminal device.

Specifically, the method includes: receiving precoded reference signals, where the precoded reference signals are obtained by precoding reference signals based on K delay vectors; generating third indication information, where the third indication information is used to indicate at least one angle vector and P weighting coefficients corresponding to P angle-delay pairs, the at least one angle vector and the P weighting coefficients are determined based on the precoded reference signals, each of the P angle-delay pairs includes one of the K delay vectors and one of the at least one angle vector, and the P angle-delay pairs and the P weighting coefficients corresponding to the P angle-delay pairs are used to determine a precoding matrix, where both P and K are positive integers; and sending the third indication information.

According to a fourth aspect, a channel measurement method is provided. The method may be performed by a network device, or may be performed by a chip disposed in the network device.

Specifically, the method includes: sending precoded reference signals, where the precoded reference signals are obtained by precoding reference signals based on K delay vectors; receiving third indication information, where the third indication information is used to indicate at least one angle vector and P weighting coefficients corresponding to P angle-delay pairs, the at least one angle vector and the P weighting coefficients are determined based on the precoded reference signals, each of the P angle-delay pairs includes one of the K delay vectors and one of the at least one angle vector, and the P angle-delay pairs and the P weighting coefficients corresponding to the P angle-delay pairs are used to determine a precoding matrix, where both P and K are positive integers; and determining the precoding matrix based on the third indication information.

According to the foregoing technical solutions, the network device may precode a downlink reference signal based on a predetermined delay vector so that the terminal device can perform downlink channel measurement based on a precoded reference signal. Because the network device precodes the reference signal based on the predetermined delay vector, the terminal device may not need to determine and feed back a frequency domain vector (for example, the foregoing delay vector), but only needs to determine and feed back an angle vector corresponding to each delay vector and a weighting coefficient corresponding to each angle-delay pair. Therefore, a downlink channel measurement process performed by the terminal device is simplified, calculation complexity of the terminal device in the channel measurement process is reduced, and feedback overheads of the terminal device are reduced. In addition, a precoding matrix is constructed based on a plurality of space domain vectors and a plurality of frequency domain vectors so that the precoding matrix determined by the network device can adapt to a downlink channel, thereby still ensuring feedback precision while reducing the feedback overheads.

With reference to the third aspect or the fourth aspect, in some implementations, the L delay vectors are determined through uplink channel measurement.

Based on reciprocity between uplink and downlink channels, the network device loads a reciprocal delay vector to a downlink reference signal for downlink channel pre-compensation so that the terminal device determines, based on a received precoded reference signal, information about a downlink channel that does not have complete reciprocity. Therefore, a downlink channel measurement process performed by the terminal device is simplified, calculation complexity of the terminal device in the channel measurement process is reduced, and feedback precision can be ensured.

With reference to the third aspect or the fourth aspect, in some implementations, the P weighting coefficients include one or more weighting coefficients fed back for each of the L delay vectors; and for an $l^{th}$ weighting coefficient in the L delay vectors, the third indication information is used to indicate $K_l$ weighting coefficients, the $K_l$ weighting coefficients correspond to $K_l$ angle-delay pairs in the P angle-delay pairs, and each of the $K_l$ angle-delay pairs includes the $l^{th}$ delay vector and one of $K_l$ angle vectors corresponding to the $l^{th}$ delay vector, where $K_l \geq 1$, and $K_l$ is an integer.

Regardless of whether angle vectors corresponding to any two of the L delay vectors are the same, each of the P angle-delay pairs may correspond to one weighting coefficient. The terminal device may determine, based on a received precoded reference signal obtained through precoding based on each delay vector, the one or more weighting coefficients corresponding to each delay vector. When the delay vectors correspond to same angle vectors, the delay vectors correspond to a same quantity of weighting coefficients.

With reference to the third aspect or the fourth aspect, in some implementations, the $K_l$ weighting coefficients are determined based on a plurality of channel estimation values obtained by performing channel estimation on a plurality of RBs based on a precoded reference signal obtained through precoding based on the $l^{th}$ delay vector.

A precoded reference signal obtained through precoding based on one delay vector may correspond to one port. One or more weighting coefficients fed back by the terminal device for one delay vector may be obtained by performing channel estimation based on a precoded reference signal corresponding to one port. Therefore, the P weighting coefficients corresponding to the P angle-delay pairs may be determined based on a plurality of channel estimation values obtained by performing channel estimation on a plurality of RBs based on the precoded reference signals obtained through precoding based on the L delay vectors.

With reference to the third aspect or the fourth aspect, in some implementations, the at least one angle vector includes one or more angle vectors fed back for each of the L delay vectors; and for the $l^{th}$ delay vector in the L delay vectors, the third indication information is used to indicate the $K_l$ angle vectors, and the $l^{th}$ delay vector and the $K_l$ angle vectors are used to determine the $K_l$ angle-delay pairs in the P angle-delay pairs, where $K_l \geq 1$, and $K_l$ is an integer.

The terminal device may feed back the one or more angle vectors for each of the L delay vectors. One or more angle vectors fed back for one angle vector and the delay vector may constitute one or more angle-delay pairs used for precoding matrix determining.

Optionally, the method further includes: receiving fourth indication information, where the fourth indication information is used to indicate a quantity of angle vectors fed back for each of the L delay vectors.

Optionally, the method further includes: sending fourth indication information, where the fourth indication information is used to indicate a quantity of angle vectors fed back for each of the L delay vectors.

Optionally, a quantity of angle vectors fed back for each of the L delay vectors is a predefined value.

In other words, the quantity of angle vectors fed back for each delay vector may be indicated by the network device, to reduce feedback overheads of the terminal device; or may be determined by the terminal device and reported to the network device, to implement better downlink channel adaptation; or may be predefined, for example, defined in a protocol, to reduce signaling overheads. With reference to the third aspect or the fourth aspect, in some implementations, the $K_l$ angle vectors are determined based on a plurality of channel estimation values obtained by performing channel estimation on a plurality of RBs based on the precoded reference signal obtained through precoding based on the $l^{th}$ delay vector.

A precoded reference signal obtained through precoding based on one delay vector may correspond to one group of ports. One or more angle vectors fed back by the terminal device for one delay vector may be obtained by performing channel estimation based on a precoded reference signal corresponding to one group of ports.

With reference to the third aspect or the fourth aspect, in some implementations, in the K angle vectors, a delay vector fed back for a first angle vector is the same as a delay vector fed back for a second angle vector, the first angle vector and the second angle vector are any two angle vectors in the K angle vectors, and the third indication information is used to indicate K angle vectors.

In other words, the K angle vectors may be shared by the L delay vectors, and the L delay vectors and the K angle vectors may be combined in pairs, to obtain K×L angle-delay pairs that can be used to construct a precoding matrix.

Optionally, the method further includes: receiving fourth indication information, where the fourth indication information is used to indicate a value of K.

Optionally, the method further includes: sending fourth indication information, where the fourth indication information is used to indicate a value of K.

Optionally, K is a predefined value.

In other words, the value of K may be indicated by the network device, to reduce feedback overheads of the terminal device; or may be determined by the terminal device and reported to the network device, to implement better downlink channel adaptation; or may be predefined, for example, defined in a protocol, to reduce signaling overheads.

With reference to any one of the first aspect to the fourth aspect, in some implementations, the P angle-delay pairs correspond to one receive antenna.

In other words, the first indication information and the third indication information may be used for feedback based on the receive antenna. In this case, the terminal device may feed back, based on the received precoded reference signals, the P weighting coefficients corresponding to each receive antenna. The network device may reconstruct a downlink channel based on the weighting coefficients corresponding to each receive antenna, to further determine the precoding matrix.

With reference to any one of the first aspect to the fourth aspect, in some implementations, the P angle-delay pairs correspond to one transport layer.

In other words, the first indication information and the third indication information may be used for feedback based on the transport layer. In this case, the terminal device may determine a quantity of transport layers based on the received precoded reference signals, and feed back the P weighting coefficients based on each transport layer. The network device may directly determine the precoding matrix based on the weighting coefficients corresponding to each transport layer.

According to a fifth aspect, a communications apparatus is provided. The communications apparatus includes modules or units configured to perform the method according to any one of the first aspect or the third aspect and the possible implementations of the first aspect or the third aspect.

According to a sixth aspect, a communications apparatus is provided. The communications apparatus includes a processor. The processor is coupled to a memory, and may be configured to execute instructions in the memory, to implement the method according to any one of the first aspect or the third aspect and the possible implementations of the first aspect or the third aspect. Optionally, the communications apparatus further includes the memory. Optionally, the communications apparatus further includes a communications interface, and the processor is coupled to the communications interface.

In an implementation, the communications apparatus is a terminal device. When the communications apparatus is the terminal device, the communications interface may be a transceiver or an input/output interface.

In another implementation, the communications apparatus is a chip disposed in a terminal device. When the communications apparatus is the chip disposed in the terminal device, the communications interface may be an input/output interface.

Optionally, the transceiver may be a transceiver circuit. Optionally, the input/output interface may be an input/output circuit.

According to a seventh aspect, a communications apparatus is provided. The communications apparatus includes modules or units configured to perform the method according to any one of the second aspect or the fourth aspect and the possible implementations of the second aspect or the fourth aspect.

According to an eighth aspect, a communications apparatus is provided. The communications apparatus includes a processor. The processor is coupled to a memory, and may be configured to execute instructions in the memory, to implement the method according to any one of the second aspect or the fourth aspect and the possible implementations of the second aspect or the fourth aspect. Optionally, the communications apparatus further includes the memory. Optionally, the communications apparatus further includes a communications interface, and the processor is coupled to the communications interface.

In an implementation, the communications apparatus is a network device. When the communications apparatus is the network device, the communications interface may be a transceiver or an input/output interface.

In another implementation, the communications apparatus is a chip disposed in a network device. When the communications apparatus is the chip disposed in the network device, the communications interface may be an input/output interface.

Optionally, the transceiver may be a transceiver circuit. Optionally, the input/output interface may be an input/output circuit.

According to a ninth aspect, a processor is provided. The processor includes an input circuit, an output circuit, and a processing circuit. The processing circuit is configured to: receive a signal through the input circuit, and transmit a signal through the output circuit so that the processor is enabled to perform the methods according to any one of the first aspect to the fourth aspect and the possible implementations of the first aspect to the fourth aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, and a signal that is output by the output circuit may be output to, for example, but not limited to, a transmitter and transmitted by the transmitter. In addition, the input circuit and the output circuit may be a same circuit, and the circuit is used as the input circuit and the output circuit at different moments. Specific implementations of the processor and the circuits are not limited in this embodiment of this application.

According to a tenth aspect, a processing apparatus is provided. The processing apparatus includes a processor and a memory. The processor is configured to: read instructions stored in the memory, receive a signal through a receiver, and transmit a signal through a transmitter, to perform the methods according to any one of the first aspect to the fourth aspect and the possible implementations of the first aspect to the fourth aspect.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into one chip, or may be disposed in different chips. A type of the memory and a manner in which the memory and the processor are disposed are not limited in this embodiment of this application.

It should be understood that a related data exchange process, for example, sending of indication information, may be a process of outputting the indication information from the processor, and receiving of capability information, may be a process of receiving the input capability information by the processor. Specifically, data that is output by the processor may be output to the transmitter, and input data received by the processor may be from the receiver. The transmitter and the receiver may be collectively referred to as a transceiver.

The processing apparatus according to the tenth aspect may be one or more chips. The processor may be implemented by using hardware or software. When the processor is implemented by using the hardware, the processor may be a logic circuit, an integrated circuit, or the like. When the processor is implemented by using the software, the processor may be a general purpose processor implemented by reading software code stored in a memory, where the memory may be integrated into the processor, or may be located outside the processor and exist independently.

According to an eleventh aspect, a computer program product is provided. The computer program product includes a computer program (or referred to as code or instructions), and when the computer program is run, a computer is enabled to perform the methods according to any one of the first aspect to the fourth aspect and the possible implementations of the first aspect to the fourth aspect.

According to a twelfth aspect, a computer-readable medium is provided. The computer-readable medium stores a computer program (or referred to as code or instructions), and when the computer program is run on a computer, the computer is enabled to perform the methods according to any one of the first aspect to the fourth aspect and the possible implementations of the first aspect to the fourth aspect.

According to a thirteenth aspect, a communications system is provided. The communications system includes the foregoing network device and the foregoing terminal device.

DESCRIPTION OF EMBODIMENTS

The following describes technical solutions of this application with reference to the accompanying drawings.

The technical solutions in some or all of the embodiments of this application may be applied to various communications systems, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, or a new radio (NR) system.

Figure 1:
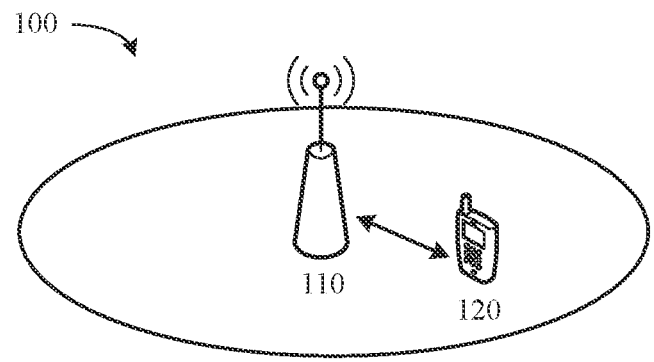
FIG. 1 is a schematic diagram of a communications system to which a channel measurement method according to an embodiment of this application is applicable.

For ease of understanding the embodiments of this application, a communications system shown in FIG. 1 is first used as an example to describe in detail a communications system to which the embodiments of this application are applicable. FIG. 1 is a schematic diagram of the communications system 100 to which a precoding vector indication method according to an embodiment of this application is applicable. As shown in FIG. 1, the communications system 100 may include at least one network device, for example, a network device 110 shown in FIG. 1. The communications system 100 may further include at least one terminal device, for example, a terminal device 120 shown in FIG. 1. The network device 110 may communicate with the terminal device 120 through a radio link. A plurality of antennas may be configured for each communications device such as the network device 110 or the terminal device 120. For each communications device in the communications system 100, the plurality of configured antennas may include at least one transmit antenna for signal sending and at least one receive antenna for signal receiving. Therefore, the communications devices in the communications system 100, for example, the network device 110 and the terminal device 120, may communicate with each other by using a multi-antenna technology.

It should be understood that the network device in the communications system may be any device having a wireless transceiver function or a chip that may be disposed in the device. The device includes but is not limited to an evolved NodeB (eNB), a radio network controller (RNC), a NodeB (NB), a base station controller (BSC), a base transceiver station (BTS), a home evolved NodeB (for example, home evolved NodeB or Home Node B, HNB), a baseband unit (BBU), an access point (AP) in a wireless fidelity (WIFI) system, a wireless relay node, a wireless backhaul node, a transmission point (TP), a transmission reception point (TRP), and the like. Alternatively, the device may be a gNB or a transmission point (TRP or TP) in a 5G system such as an NR system, or may be one antenna panel or a group of antenna panels (including a plurality of antenna panels) of a base station in a 5G system, or may be a network node such as a baseband unit (BBU) or a distributed unit (DU) that constitutes a gNB or a transmission point.

In some deployments, the gNB may include a centralized unit (CU) and a DU. The gNB may further include a radio frequency unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or is converted from information at the PHY layer. Therefore, in such an architecture, higher layer signaling such as RRC layer signaling or PDCP layer signaling may also be considered as being sent by the DU or sent by the DU and the RU. It can be understood that the network device may be a CU node, a DU node, or a device including a CU node and a DU node. In addition, the CU may be classified as a network device in an access network RAN, or the CU may be classified as a network device in a core network (CN). This is not limited herein.

It should be further understood that the terminal device in the communications system may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone, a tablet computer (pad), a computer having a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application.

It should be further understood that FIG. 1 is merely a simplified schematic diagram used as an example for ease of understanding. The communications system 100 may further include another network device or another terminal device, which is not shown in FIG. 1.

For ease of understanding the embodiments of this application, the following briefly describes a process of processing a downlink signal at a physical layer before the downlink signal is sent. It should be understood that the process of processing a downlink signal described below may be performed by the network device, or may be performed by a chip disposed in the network device. For ease of description, the network device and the chip disposed in the network device are collectively referred to as a network device below.

The network device may process a codeword on a physical channel. The codeword may be a coded bit obtained through coding (for example, including channel coding). The codeword is scrambled to generate a scrambled bit. Modulation mapping is performed on the scrambled bit, to obtain a modulated symbol. The modulated symbol is mapped to a plurality of layers or transport layers through layer mapping. The modulated symbol that undergoes the layer mapping is precoded, to obtain a precoded signal. The precoded signal is mapped to a plurality of resource elements (RE) through RE mapping. Then, these REs are transmitted through an antenna port after orthogonal multiplexing (OFDM) modulation.

It should be understood that the process of processing a downlink signal described above is merely an example for description and shall not constitute any limitation on this application. For a specific process of processing a downlink signal, refer to the conventional technology. For brevity, detailed descriptions of the specific process are omitted herein.

For ease of understanding the embodiments of this application, the following briefly describes several terms used in this application.

1. Precoding technology: When a channel state is known, the network device may process a to-be-sent signal by using a precoding matrix that matches the channel state so that a precoded to-be-sent signal adapts to a channel, thereby reducing complexity of eliminating inter-channel impact by a receiving device, and improving received signal quality (for example, a signal to interference plus noise ratio (SINR)) by precoding the to-be-sent signal. Therefore, the precoding technology can implement transmission between a sending device and a plurality of receiving devices on a same time-frequency resource, in other words, implement multi-user multiple-input multiple-output (MU-MIMO). It should be understood that related descriptions of the precoding technology in this specification are merely examples for ease of understanding, and are not intended to limit the protection scope of the embodiments of this application. In a specific implementation process, the sending device may alternatively perform precoding in another manner. For example, when channel information (for example, but not limited to a channel matrix) cannot be learned of, precoding is performed by using a preset precoding matrix or through weighting. For brevity, specific content thereof is not described in this specification.

2. Channel reciprocity: In a time division duplex (TDD) mode, signals are transmitted between uplink and downlink channels on a same frequency domain resource but different time domain resources. Within a relatively short time (for example, a channel propagation coherence time), it may be considered that the signals on the uplink and downlink channels experience same channel fading. This is reciprocity between the uplink and downlink channels. For example, the uplink channel $H_{UL}$ and the downlink channel $H_{DL}$ may satisfy: $H_{DL}=H_{UL}^{H}$. Based on the reciprocity between the uplink and downlink channels, the network device may measure the uplink channel based on an uplink reference signal such as a sounding reference signal (SRS) and may estimate the downlink channel based on the uplink channel so that a precoding matrix used for downlink transmission can be determined.

However, in a frequency division duplex (FDD) mode, because a band interval between the uplink and downlink channels is far greater than a coherence bandwidth, and the uplink and downlink channels do not have complete reciprocity, the precoding matrix that is used for downlink transmission and that is determined based on the uplink channel may not adapt to the downlink channel. However, in the FDD mode, the uplink and downlink channels still have partial reciprocity, for example, angle reciprocity and delay reciprocity. Therefore, an angle and a delay may also be referred to as reciprocity parameters.

When a signal is transmitted through a radio channel, the signal may arrive at a receive antenna from a transmit antenna through a plurality of paths. A multipath delay causes frequency selective fading, that is, a frequency domain channel change. The delay is a transmission time of a radio signal on different transmission paths, is determined based on a distance and a speed, and is unrelated to frequency domain of the radio signal. When a signal is transmitted on different transmission paths, there are different transmission delays due to different distances. Therefore, delays on the uplink and downlink channels in the FDD mode may be considered to be the same, in other words, reciprocal.

In addition, the angle may be an angle of arrival (AOA) at which a signal arrives at a receive antenna through a radio channel, or may be an angle of departure (AOD) at which a signal is transmitted through a transmit antenna. In the embodiments of this application, the angle may be an angle of arrival at which an uplink signal arrives at the network device, or may be an angle of departure at which the network device transmits a downlink signal. The angle of arrival of the uplink reference signal and the angle of departure of the downlink reference signal may be considered to be the same, in other words, reciprocal.

Therefore, it may be considered that, there are delay reciprocity and angle reciprocity between the uplink and downlink channels in the FDD mode. In the embodiments of this application, each angle may be represented by using one angle vector, and each delay may be represented by using one delay vector.

3. Reference signal (RS) and precoded reference signal: The reference signal may also be referred to as a pilot, a reference sequence, or the like. In the embodiments of this application, the reference signal may be a reference signal used for channel measurement. For example, the reference signal may be a channel state information reference signal (CSI-RS) used for downlink channel measurement, or may be a sounding reference signal (SRS) used for uplink channel measurement. It should be understood that the foregoing enumerated reference signals are merely examples and shall not constitute any limitation on this application. This application does not exclude a possibility that another reference signal is defined in a future protocol to implement a same or similar function.

The precoded reference signal may be a reference signal obtained by precoding a reference signal. The precoding may specifically include beamforming and/or phase rotation. The beamforming may be implemented, for example, by precoding a downlink reference signal based on one or more angle vectors, and the phase rotation may be implemented, for example, by precoding a downlink reference signal based on one or more delay vectors.

In the embodiments of this application, for ease of distinguishing and description, a reference signal obtained through precoding such as beamforming and/or phase rotation is referred to as a precoded reference signal, and a reference signal that is not precoded is referred to as a reference signal for short.

In the embodiments of this application, precoding a downlink reference signal based on one or more angle vectors may also mean loading the one or more angle vectors to the downlink reference signal to implement beamforming and precoding a downlink reference signal based on one or more delay vectors may also mean loading the one or more delay vectors to the downlink reference signal to implement phase rotation.

4. Port: The port may be understood as a virtual antenna identified by the receiving device. In the embodiments of this application, the port may be a transmit antenna port. For example, a reference signal corresponding to each port may be a reference signal that is not precoded, or may be a precoded reference signal obtained by precoding a reference signal based on one delay vector. Alternatively, the port may be a reference signal port obtained after beamforming. For example, a reference signal corresponding to each port may be a precoded reference signal obtained by precoding a reference signal based on one angle vector, or may be a precoded reference signal obtained by precoding a reference signal based on one angle vector and one delay vector. The signal corresponding to each port may be transmitted through one or more RBs.

The transmit antenna port may be an actually independent sending unit (transceiver unit, TxRU). It can be understood that, if space domain precoding is performed on a reference signal, a quantity of ports may be a quantity of reference signal ports, and the quantity of reference signal ports may be less than a quantity of transmit antenna ports.

In the following embodiments, when the transmit antenna port is involved, the quantity of transmit antenna ports may be a quantity of ports on which no space domain precoding is performed, that is, a quantity of actually independent sending units. When the port is involved, in different embodiments, the port may be a transmit antenna port, or may be a reference signal port. A specific meaning expressed by the port may be determined according to a specific embodiment.

5. Angle vector: The angle vector may be understood as a precoding vector used to perform beamforming on a reference signal. A transmitted reference signal may have specific space directivity through beamforming. Therefore, a process of precoding a reference signal based on an angle vector may also be considered as a process of performing space domain (or space domain for short) precoding.

A quantity of ports corresponding to precoded reference signals obtained by precoding reference signals based on one or more angle vectors is the same as a quantity of angle vectors. When a quantity K of angle vectors is less than a quantity T of transmit antennas, antenna port dimension reduction may be implemented through space domain precoding, thereby reducing pilot overheads.

An angle vector length may be T, where T is a quantity of transmit antenna ports in one polarization direction, $T \geq 1$, and T is an integer.

Optionally, the angle vector is obtained from a discrete Fourier transform (DFT) matrix, for example, $$v_{i_1,i_2} = \begin{bmatrix} u_{i_2} & e^{j\frac{2\pi i_1}{O_1 I_1}} u_{i_2} & \cdots & e^{j\frac{2\pi i_1 (I_1-1)}{O_1 I_1}} u_{i_2} \end{bmatrix}^T$$

$$u_{i_2} = \begin{cases} \begin{bmatrix} 1 & e^{j\frac{2\pi i_2}{O_2 I_2}} u_{i_2} & \cdots & e^{j\frac{2\pi i_2 (I_2-1)}{O_2 I_2}} \end{bmatrix} & I_2 > 1 \\ 1 & I_2 = 1 \end{cases}$$

Herein, $I_1$ is a quantity of antenna ports in a same polarization direction that are included in each column (or row) in an antenna array, and $I_2$ is a quantity of antenna ports in the same polarization direction that are included in each row (or column) in the antenna array. In this embodiment, $T=I_1 \times I_2$. In addition, $O_1$ and $O_2$ are oversampling factors; and $i_1$ and $i_2$ satisfy:

$0 \leq i_1 \leq (O_1 \times I_1 - 1)$, and $0 \leq i_2 \leq (O_2 \times I_2 - 1)$.

Optionally, the angle vector is a steering vector in a uniform linear array (ULA), for example, $$a(\theta_k) = \begin{bmatrix} 1 \\ e^{j\frac{2\pi}{\lambda}\cos\theta_k d} \\ \vdots \\ e^{j\frac{2\pi}{\lambda}\cos\theta_k (T-1)d} \end{bmatrix}.$$

Herein, $\theta_k$ is an angle, where k=1, 2, . . . , or K, and K represents a quantity of angle vectors; $\lambda$ is a wavelength; and d is an antenna spacing.

The steering vector may represent a phase difference between responses of angles of arrival of one path on different antennas. The steering vector $a(\theta_k)$ and the vector $v_{i_1,i_2}$ in the DFT matrix satisfy:

$$\cos\theta_k d = \frac{i_1}{O_1 I_1}.$$

Optionally, the angle vector is a steering vector in a uniform plane array (UPA). The steering vector may be, for example, a steering vector including information about a horizontal angle and a pitch angle, for example, $$a(\theta_k, \varphi_k) = \begin{bmatrix} e^{\frac{j2\pi}{\lambda}u_k p_1} \\ e^{\frac{j2\pi}{\lambda}u_k p_2} \\ \vdots \\ e^{\frac{j2\pi}{\lambda}u_k p_T} \end{bmatrix}.$$

Herein, $\theta_k$ is a horizontal angle; $\varphi_k$ is a pitch angle; $\rho_r$ is three-dimensional coordinates of a $t^{th}$ transmit antenna port, where t=1, 2, . . . , or T; and $u_k$ is a unit spherical basis vector corresponding to a $k^{th}$ angle: $u_k$=[sin $\varphi_k$ cos $\theta_k$ sin $\varphi_k$ sin $\theta_k$ . . . cos $\varphi_k$].

For ease of description below, the angle vector is denoted as $a(\theta_k)$.

It is assumed that a transmit antenna is a single-polarized antenna, a quantity of transmit antennas is T, and a quantity of frequency domain units is N, where N≥1 and N is an integer. In this case, for one receive antenna, a channel may be a matrix whose dimension is N×T. If space domain precoding is performed on a reference signal based on one angle vector, for one receive antenna, a dimension of a channel on which precoding is performed may be N×1, in other words, a received precoded reference signal may be represented as a matrix whose dimension is N×1.

Further, for each frequency domain unit on each receive antenna, a channel may be a matrix whose dimension is 1×T. If space domain precoding is performed on a reference signal based on one angle vector, the angle vector may be loaded to the reference signal. Because a dimension of the angle vector is T×1, for one receive antenna, a dimension of a channel on which precoding is performed may be N×1, in other words, a received precoded reference signal may be represented as a matrix whose dimension is N×1.

Because the reference signal to which the angle vector is loaded may be transmitted to the terminal device through the downlink channel, a channel measured by the terminal device based on the received precoded reference signal may be equivalent to a channel to which the angle vector is loaded. For example, the angle vector $a(\theta_k)$ is loaded to the downlink channel V, which may be expressed as $V(a(\theta_k))^*$.

6. Delay vector: The delay vector is a vector proposed in this application to indicate a change rule of a channel in frequency domain. As described above, the multipath delay causes frequency selective fading. It can be learned from Fourier transform that a time delay of a signal in time domain may be equivalent to a phase gradient in frequency domain.

For example, for a signal g(t), the signal may be transformed in frequency domain through Fourier transform: $F(g(t))=\int_{-\infty}^{+\infty}g(t)e^{j\omega t}dt$; and for a signal g(t-$t_0$), the signal may be transformed in frequency domain through Fourier transform: $F(g(t-t_0))=\int_{-\infty}^{+\infty}g(t-t_0)e^{j\omega t}dt=e^{j\omega t_0}F(g(t))$. Herein, $\omega$ is a frequency variable, where different frequencies correspond to different phase rotations; and t and t-$t_0$ indicate delays.

A signal having the two delays may be represented as x(t)=g(t)+g(t-$t_0$). Therefore, the following frequency variable function may be obtained: $X(\omega)=g(\omega)(1+e^{j\omega t_0})$. If $g(\omega)=1$, $X(\omega)=1+e^{j\omega t_0}$. Therefore, two signals of different delays cause frequency domain selective fading Because a phase change of a channel on each frequency domain unit is related to a delay, a phase change rule of the channel on each frequency domain unit may be represented by using a delay vector, in other words, the delay vector may be used to represent a channel delay characteristic.

Precoding a reference signal based on a delay vector may essentially mean performing phase rotation on each frequency domain unit in frequency domain based on an element in the delay vector, to use a precoded reference signal to pre-compensate for a frequency selective characteristic caused by the multipath delay. Therefore, a process of precoding a reference signal based on a delay vector may be considered as a process of performing frequency domain precoding.

Precoding reference signals based on different delay vectors is equivalent to performing phase rotation on each frequency domain unit of a channel based on the different delay vectors. In addition, phase rotation angles may be different for a same frequency domain unit. To distinguish between different delays, the network device may precode a reference signal based on each of L delay vectors.

In the embodiments of this application, for ease of understanding, an example in which an RB is used as a frequency domain unit is used to describe a specific process of performing frequency domain precoding on a reference signal. For example, when an RB is used as a frequency domain unit, it may be considered that each frequency domain unit includes only one RB used to carry a reference signal. Actually, each frequency domain unit may include one or more RBs used to carry a reference signal. When each frequency domain unit includes a plurality of RBs used to carry a reference signal, the network device may load delay vectors to the plurality of RBs used to carry a reference signal in each frequency domain unit.

Optionally, a delay vector length is N, where N is a quantity of RBs that are in a frequency domain bandwidth occupied by a CSI measurement resource and that are used to carry a reference signal (for example, the precoded reference signal in the embodiments), N≥1, and N is an integer.

Optionally, an $l^{th}$ delay vector in the L delay vectors may be represented as $b(\tau_l)$ and $$b(\tau_l) = \begin{bmatrix} e^{-j2\pi f_1 \tau_l} \\ e^{-j2\pi f_2 \tau_l} \\ \vdots \\ e^{-j2\pi f_N \tau_l} \end{bmatrix}$$

Herein, l=1, 2, . . . , or L, where L may represent a quantity of delay vectors; and $f_1, f_2, \ldots,$ and $f_N$ respectively represent carrier frequencies of a first RB to an $N^{th}$ RB.

Optionally, the delay vector is obtained from the DFT matrix, for example, $$u_k = \begin{bmatrix} 1 & e^{j\frac{2\pi k}{O_f N}} & \cdots & e^{j\frac{2\pi k(N-1)}{O_f N}} \end{bmatrix}^T.$$

Each vector in the DFT matrix may be referred to as a DFT vector.

Herein, $O_f$ is an oversampling factor, and $O_f \geq 1$, and k is a DFT vector index, and satisfies: $0 \leq k \leq O_f \times N - 1$ or $1 - O_f \times N \leq k \leq 0$.

For example, when k<0, $b(\tau_l)$ and the vector $u_k$ in the DFT matrix may satisfy:

$b(\tau_l) = u_k \beta_l$, and $$\Delta f \tau_l = \frac{k}{O_f N},$$

where $\beta_l = e^{-j2\pi f_1 r_1}$, and $1 \leq n \leq N-1$.

For ease of description below, the delay vector is denoted as $b(\tau_l)$.

The frequency domain bandwidth occupied by the CSI measurement resource may be understood as a bandwidth used to transmit a reference signal, and the reference signal may be a reference signal used for channel measurement, for example, a CSI-RS. Signaling used to indicate the frequency domain bandwidth occupied by the CSI measurement resource may be, for example, a CSI-bandwidth occupation range (CSI-Frequency Occupation). The frequency domain bandwidth occupied by the CSI measurement resource may also be referred to as a measurement bandwidth, a pilot transmission bandwidth, or the like. For ease of description below, the frequency domain bandwidth occupied by the CSI measurement resource is referred to as a measurement bandwidth for short.

It should be understood that the delay vector length N is merely a possible design, and shall not constitute any limitation on this application. Different delay vector lengths are defined below with reference to different embodiments. Detailed descriptions are omitted herein.

It is assumed that a transmit antenna is a single-polarized antenna, a quantity of transmit antennas is T, and a quantity of RBs is N. In this case, for one receive antenna, a downlink channel may be a matrix whose dimension is N×T. If frequency domain precoding is performed on a reference signal based on a delay vector, N elements in the delay vector may be respectively loaded to reference signals carried on the N RBs. and an $n^{th}$ element in the delay vector may be loaded to a reference signal carried on an $n^{th}$ RB in the N RBs.

Because the reference signal to which the delay vector is loaded may be transmitted to the terminal device through the downlink channel, a channel measured by the terminal device based on the received precoded reference signal may be equivalent to a channel to which the delay vector is loaded. For example, the $n^{th}$ element in the delay vector is loaded to a channel $V^{(n)}$ on the $n^{th}$ RB, which may be represented as $V^{(n)} e^{-j2\pi f_n r_l}$.

It should be noted that frequency domain precoding may be performed on a reference signal based on a delay vector before resource mapping or after resource mapping. This is not limited in this application.

It should be understood that the delay vector is a form proposed in this application to indicate a delay. The delay vector is named only for ease of distinguishing from the angle and shall not constitute any limitation on this application. This application does not exclude a possibility that another name is defined in a future protocol to represent a same or similar meaning.

7. Frequency domain unit: The frequency domain unit is a unit of a frequency domain resource, and may represent different frequency domain resource granularities. The frequency domain unit may include, for example, but is not limited to a subband, a resource block (RB), a resource block group (RBG), and a precoding resource block group (PRG).

8. Angle-delay pair: The angle-delay pair may include one angle vector and one delay vector. Angle vectors and/or delay vectors included in any two angle-delay pairs are different. In other words, each angle-delay pair may be uniquely determined based on one angle vector and one delay vector. It should be understood that the angle-delay pair may be understood as a representation form of a space-frequency basic unit determined based on one angle vector and one delay vector, but the angle-delay pair does not necessarily have a unique representation form. For example, the angle-delay pair may alternatively be represented as a space-frequency component matrix or a space-frequency component vector described below.

9. Space-frequency component matrix: One space-frequency component matrix may be determined based on one angle-delay pair. In other words, one space-frequency component matrix may be uniquely determined based on one angle vector and one delay vector. One space-frequency component matrix and one angle-delay pair may be mutually converted.

For example, one space-frequency component matrix may be determined based on a conjugate transpose of a product of one angle vector and one delay vector, for example, $a(\theta_k) \times b(\tau_l)^H$, and a dimension of the space-frequency component matrix may be T×N.

It should be understood that the space-frequency component matrix may be understood as another representation form of a space-frequency basic unit determined based on one angle vector and one delay vector. The space-frequency basic unit may alternatively be represented as, for example, a space-frequency component vector, and the space-frequency component vector is determined, for example, based on a Kronecker product of one angle vector and one delay vector.

It should be further understood that a specific form of the space-time basic unit is not limited in this application. Various possible forms determined by a person skilled in the art based on a same concept by using one angle vector and one delay vector shall all fall within the protection scope of this application. In addition, if definitions of the angle vector and the delay vector are different from the forms enumerated above, an operation relationship among a space-frequency component matrix, an angle vector, and a delay vector and an operation relationship among a space-frequency component vector, an angle vector, and a delay vector may also be different. For example, the space-frequency component matrix may alternatively be determined based on a product of a conjugate of a delay vector and a transpose of an angle vector, for example, $b(\tau_l)^* \times a(\theta_k)^T$. The operation relationship among a space-frequency component matrix, an angle vector, and a delay vector and the operation relationship among a space-frequency component vector, an angle vector, and a delay vector are not limited in this application.

10. Space-frequency matrix: In the embodiments of this application, the space-frequency matrix is an intermediate quantity used to determine a precoding matrix. For each RB, the precoding matrix may be usually a matrix whose dimension is T×Z, where Z represents a quantity of transport layers. Z≥1 and Z is an integer.

In the embodiments of this application, the space-frequency matrix may be determined based on each receive antenna, or may be determined based on each transport layer.

If the space-frequency matrix is determined based on a receive antenna, the space-frequency matrix may be referred to as a space-frequency matrix corresponding to the receive antenna. The space-frequency matrix corresponding to the receive antenna may be used to construct a downlink channel matrix of each RB to further determine a precoding matrix corresponding to each RB. A channel matrix corresponding to an RB may be, for example, a transpose of a matrix constructed by column vectors that correspond to a same RB and that are in space-frequency matrices corresponding to receive antennas. For example, $n^{th}$ column vectors in the space-frequency matrices corresponding to the receive antennas are extracted, and a matrix whose dimension is T×R may be obtained through arrangement from left to right in an order of the receive antennas, where R represents a quantity of the receive antennas, R≥1, and R is an integer. A channel matrix $V^{(n)}$ of an $n^{th}$ frequency domain unit may be obtained by transposing the matrix. A relationship between a channel matrix and a space-frequency matrix is described in detail below. Detailed descriptions of the relationship between a channel matrix and a space-frequency matrix are omitted herein.

If the space-frequency matrix is determined based on a transport layer, the space-frequency matrix may be referred to as a space-frequency matrix corresponding to the transport layer. The space-frequency matrix corresponding to the transport layer may be directly used to determine a precoding matrix corresponding to each RB. A precoding matrix corresponding to an RB may be, for example, a conjugate of a matrix constructed by column vectors that correspond to a same RB and that are in space-frequency matrices corresponding to transport layers. For example, $n^{th}$ column vectors in the space-frequency matrices corresponding to the transport layers are extracted, and a matrix whose dimension is T×Z may be obtained through arrangement from left to right in an order of the transport layers, where Z represents a quantity of the transport layers, Z≥1 and Z is an integer. A conjugate of the matrix may be used as a precoding matrix $W^{(n)}$ of an $n^{th}$ frequency domain unit.

A specific process of determining a precoding matrix based on a space-frequency matrix is described in detail in the following embodiments. Detailed descriptions of the specific process are omitted herein.

It should be noted that a precoding matrix determined according to a channel measurement method provided in the embodiments of this application may be a precoding matrix directly used for downlink data transmission. Alternatively, a precoding matrix finally used for downlink data transmission may be obtained according to some beamforming methods, for example, including zero forcing (ZF), regularized zero-forcing (RZF), a minimum mean square error (MMSE), and a maximum signal-to-leakage-and-noise ratio (SLNR). This is not limited in this application. All the following precoding matrices may be precoding matrices determined according to the channel measurement method provided in this application. In the embodiments of this application, the space-frequency matrix may be determined based on one or more angle-delay pairs. For example, the space-frequency matrix may be a weighted sum of one or more space-frequency component matrices. The space-frequency matrix may alternatively be converted into a form of a space-frequency vector, and the space-frequency vector may alternatively be a weighted sum of one or more space-frequency component vectors.

A type II codebook feedback mode is defined in the NR protocol TS38.214. The following shows an example of providing a feedback in the type II codebook feedback mode when a rank is 1.

$$W = W_1 W_2 = \begin{bmatrix} a_0 v_0 & a_1 v_1 & a_2 v_2 & a_3 v_3 & & & & \\ & & & & a_4 v_0 & a_5 v_1 & a_6 v_2 & a_7 v_3 \end{bmatrix}$$
$$[c_0 \ c_1 \ c_2 \ c_3 \ c_4 \ c_5 \ c_6 \ c_7]^T =$$
$$\begin{bmatrix} a_0 c_0 v_0 + a_1 c_1 v_1 + a_2 c_2 v_2 + a_3 c_3 v_3 \\ a_4 c_4 v_0 + a_5 c_5 v_1 + a_6 c_6 v_2 + a_7 c_7 v_3 \end{bmatrix}.$$

Herein, W represents a to-be-fed-back precoding matrix in two polarization directions in one subband at one transport layer; $W_1$ may be fed back by using a wideband; $W_2$ may be fed back by using a subband; and $v_0$ to $v_3$ are beam vectors included in $W_1$, where the plurality of beam vectors may be indicated, for example, by using an index of a combination of the plurality of beam vectors. In the precoding matrix shown above, beam vectors in the two polarization directions are the same and the beam vectors $v_0$ to $v_3$ are all used. In addition, $a_0$ to $a_7$ are wideband amplitude coefficients included in $W_1$ and may be indicated by using quantized values of the wideband amplitude coefficients; and $c_0$ to $c_7$ are subband coefficients included in $W_2$. Each subband coefficient may include a subband amplitude coefficient and a subband phase coefficient. For example, $c_0$ to $c_7$ may respectively include subband amplitude coefficients $\alpha_0$ to $\alpha_7$ and subband phase coefficients $p_0$ to $p_7$ and may be respectively indicated by using quantized values of the subband amplitude coefficients $\alpha_0$ to $\alpha_7$ and quantized values of the subband phase coefficients $\varphi_0$ to $\varphi_7$.

The terminal device feeds back the amplitude coefficient and the phase coefficient based on each subband. Consequently, relatively high feedback overheads are caused. Therefore, a feedback mode that is based on frequency domain continuity for frequency selective fading caused by a multipath delay and in which a delay vector is used to describe a frequency domain change rule is proposed. The delay vector may also be understood as a vector used to indicate a channel delay characteristic.

The space-frequency matrix described above is an intermediate quantity that is proposed based on the frequency domain continuity and that is used to construct a precoding matrix. The space-frequency matrix H may satisfy: $H=SCF^H$, where S represents a matrix constructed by one or more (for example, K) angle vectors, for example, $S=[a(\theta_1) \ a(\theta_2) \ldots a(\theta_K)]$; F represents a matrix constructed by one or more (for example, L) delay vectors, for example, $F=[b(\tau_1) \ b(\tau_2) \ldots b(\tau_L)]$; and C represents a weighting coefficient corresponding to one angle vector and one delay vector.

In the FDD mode, because of the delay reciprocity and the angle reciprocity between the uplink and downlink channels, a space-frequency matrix $H_{UL}$ obtained through uplink channel measurement may be expressed as $H_{UL}=SC_{UL}F^H$, and a space-frequency matrix $H_{DL}$ obtained through downlink channel measurement may be expressed as $H_{DL}=SC_{DL}F^H$. Therefore, in the embodiments of this application, a coefficient matrix $C_{DL}$ of a downlink channel is determined and fed back through downlink channel measurement to determine a precoding matrix that adapts to the downlink channel.

In an implementation, $S^H H_{DL} = C_{DL} F^H$ may be obtained by transforming the foregoing formula $H_{DL} = SC_{DL} F^H$ so that $(H_{DL}^T S^*)^T = C_{DL} F^H$ can be further obtained through transform. Herein, $H_{DL}^T$ is a space-frequency matrix determined based on a real channel; and $H_{DL}^T S^*$ is a real channel on which space domain precoding is performed, that is, a channel observed by the terminal device when only an angle vector is loaded to a downlink reference signal. The terminal device may further determine, based on a received precoded reference signal, a delay vector used to construct a downlink channel and a weighting coefficient corresponding to each angle-delay pair.

In another implementation. $H_{DL} F = SC_{DL}$ may be obtained by transforming the foregoing formula $H_{DL} = SC_{DL} F^H$ so that $(F^T H_{DL}^T)^T = SC_{DL}$ can be further obtained through transform. Herein, $H_{DL}^T$ is a space-frequency matrix determined based on a real channel; and $F^T H_{DL}^T$ represents a sum of channel estimation values obtained by the terminal device through measurement by loading delay vectors to downlink channels.

Specifically, when the network device loads the delay vectors to the downlink channel, $SC_{DL}$ may be obtained by multiplying each row in $F^T$ by each column in $H_{DL}^T$. In this embodiment, both a quantity of elements included in each row vector in $F^T$ and a quantity of elements included in each column vector in $H_{DL}^T$ may be N. When a row vector is multiplied by a column vector, each element (for example, an $n^{th}$ element, where n is a value traversed from 1 to N) in the row vector needs to be multiplied by a corresponding element (for example, an $n^{th}$ element, where n is a value traversed from 1 to N) in the column vector, and then a sum is obtained. However, because the network device loads the delay vectors without using the downlink channel and consequently a correlation between RBs of the downlink channel cannot be obtained, an operation of $F^T H_{DL}^T$ cannot be completed. Therefore, when loading the delay vectors to each RB, the network device only multiplies an element in each row vector in $F^T$ by an element in each column vector in $H_{DL}^T$, but does not complete the summation operation.

After performing channel estimation based on the received precoded reference signals to obtain the channel estimation values on all the RBs, the terminal device sums up the channel estimation values on the N RBs that are obtained through estimation based on the precoded reference signals obtained through precoding based on a same delay vector, to obtain $F^T H_{DL}^T$, in other words, to obtain $SC_{DL}$ so that the angle vectors used to construct the downlink channel and the weighting coefficient corresponding to each angle-delay pair can be determined.

It can be learned from the foregoing two implementations that the space-frequency matrix $H_{DL}$ determined based on the weighting coefficient in the coefficient matrix $C_{DL}$ that is fed back by the terminal device may be obtained by transposing the real channel V. On the contrary, the channel matrix V may also be obtained by transposing the space-frequency matrix $H_{DL}$ in the embodiments of this application.

Further, the precoding matrix may be determined based on the space-frequency matrix $H_{DL}$. The precoding matrix of the $n^{th}$ frequency domain unit may be the conjugate of the matrix constructed by the $n^{th}$ column vectors in the space-frequency matrices corresponding to the transport layers.

An example of performing SVD on a channel matrix is used. In this case, a conjugate transpose of a precoding matrix may be obtained by performing SVD on the channel matrix V. However, if SVD is performed on the transpose of the channel matrix, in other words, if SVD is performed on $V^T$, the conjugate of the precoding matrix may be exactly obtained. Therefore, in the embodiments of this application, the conjugate of the precoding matrix corresponding to each frequency domain unit may be determined based on the space-frequency matrix $H_{DL}$ determined based on the transpose of the real channel. On the contrary, the precoding matrix W may be obtained by conjugating the space-frequency matrix $H_{DL}$ in the embodiments of this application.

11: Reference signal resource: The reference signal resource may be used to configure a transmission attribute of a reference signal, for example, a time-frequency resource location, a port mapping relationship, a power factor, and a scrambling code. For details, refer to the conventional technology. A transmit end device may send a reference signal based on a reference signal resource, and a receive end device may receive a reference signal based on a reference signal resource. One reference signal resource may include one or more RBs.

In the embodiments of this application, the reference signal resource may be, for example, a CSI-RS resource. In addition, for ease of understanding the embodiments of this application, the following descriptions are provided.

First, for ease of understanding, the following briefly describes main parameters in this application.

P: P is a quantity of angle-delay pairs, $P \geq 1$, and P is an integer.

N: N is a quantity of frequency domain units, $N \geq 1$, and N is an integer.

T: T is a quantity of transmit antenna ports in one polarization direction, $T \geq 1$, and T is an integer.

K: K is a quantity of angle vectors, $K \geq 1$, and K is an integer.

L: L is a quantity of delay vectors, $L \geq 1$, and L is an integer.

R: R is a quantity of receive antennas, $R \geq 1$, and R is an integer.

Z: Z is a quantity of transport layers, $Z \geq 1$, and Z is an integer.

J: J is a quantity of polarization directions of a transmit antenna, $J \geq 1$, and J is an integer.

M: M is a quantity of frequency domain groups, $M > 1$, and M is an integer.

Second, in this application, for ease of description, when numbering is involved, numbers may be consecutive and start from 1. For example, the L angle vectors may include a first angle vector to an $L^{th}$ angle vector, and the K delay vectors may include a first delay vector to a $K^{th}$ delay vector. Certainly, a specific implementation is not limited thereto. For example, numbers may alternatively be consecutive and start from 0. For example, the L angle vectors may include a $0^{th}$ angle vector to an $(L-1)^{th}$ angle vector, and the K delay vectors may include a e delay vector to a $(K-1)^{th}$ delay vector.

It should be understood that the foregoing descriptions are all provided for ease of describing the technical solutions provided in the embodiments of this application, but are not intended to limit the scope of this application.

Third, in this application, transformation of a matrix and a vector is involved in many places. For ease of understanding, unified descriptions are provided herein. A superscript T represents a transpose. For example, $A^T$ represents a transpose of a matrix (or a vector) A. A superscript * represents a conjugate. For example, A* represents a conjugate of the matrix (or the vector) A. A superscript H represents a conjugate transpose. For example, $A^H$ represents a conjugate transpose of the matrix (or the vector) A. For brevity, descriptions of a same or similar case are omitted below.

Fourth, in the following embodiments, an example in which both an angle vector and a delay vector are column vectors is used to describe the embodiments provided in this application. However, this shall not constitute any limitation on this application. Based on a same concept, a person skilled in the art may further figure out more other possible representations.

Fifth, in this application, "used to indicate" may include "used to directly indicate" and "used to indirectly indicate". When a piece of indication information is used to indicate A, the indication information may directly indicate A or indirectly indicate A, but it does not necessarily indicate that the indication information carries A.

Information indicated by the indication information is referred to as to-be-indicated information. In a specific implementation process, the to-be-indicated information may be indicated in a plurality of manners, for example, but not limited to a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already learned of or pre-agreed on. For example, specific information may alternatively be indicated by using an arrangement order of a plurality of pieces of information that are pre-agreed on (for example, stipulated in a protocol) to reduce indication overheads to some extent. In addition, a common part of all pieces of information may be further identified and indicated in a unified manner, to reduce indication overheads caused by separately indicating same information. For example, a person skilled in the art should understand that a precoding matrix includes precoding vectors, and each precoding vector in the precoding matrix may have a same part in terms of composition or another attribute.

In addition, a specific indication manner may alternatively be various existing indication manners, for example, but not limited to the foregoing indication manners and various combinations thereof. For details of various indication manners, refer to the conventional technology. Details are not described in this specification. It can be learned from the foregoing descriptions that, for example, when a plurality of pieces of information of a same type need to be indicated, manners of indicating different information may be different. In a specific implementation process, a required indication manner may be selected according to a specific requirement. The selected indication manner is not limited in the embodiments of this application. In this way, the indication manner involved in the embodiments of this application should be understood as covering various methods that can enable a to-be-indicated party to learn of the to-be-indicated information.

In addition, the to-be-indicated information may have another equivalent form. For example, a row vector may be represented as a column vector; a matrix may be represented by using a transposed matrix of the matrix, or a matrix may be represented in a form of a vector or an array; and the vector or the array may be formed by connecting row vectors or column vectors in the matrix. The technical solutions provided in the embodiments of this application should be understood as covering various forms. For example, some or all features in the embodiments of this application should be understood as covering various representations of the features.

The to-be-indicated information may be sent as a whole, or may be divided into a plurality of pieces of sub-information for separate sending. In addition, sending periods and/or sending occasions of the sub-information may be the same or may be different. A specific sending method is not limited in this application. The sending periods and/or the sending occasions of the sub-information may be predefined, for example, predefined according to a protocol; or may be configured by a transmit end device by sending configuration information to a receive end device. The configuration information may include, for example, but not limited to, one or a combination of at least two of radio resource control signaling such as RRC signaling, MAC layer signaling such as MAC-CE signaling, and physical layer signaling such as downlink control information (DCI).

Sixth, definitions listed in this application for many features (for example, a Kronecker product, CSI, an RB, an angle, and a delay) are merely used to explain functions of the features by using an example. For detailed content thereof, refer to the conventional technology.

Seventh, the terms "first". "second", and various numbers in the following embodiments are merely used for distinguishing for ease of description and are not used to limit the scope of the embodiments of this application. For example, the terms are used to distinguish between different indication information.

Eighth, in the following embodiments, "being pre-obtained" may include "being indicated by the network device by using signaling" or "being predefined", for example, "being defined in a protocol". The "being predefined" may be implemented in a manner in which corresponding code, a table, or other related indication information may be prestored in a device (for example, including the terminal device and the network device). A specific implementation thereof is not limited in this application.

Ninth, "being stored" in the embodiments of this application may be "being stored in one or more memories". The one or more memories may be separately disposed, or may be integrated into an encoder or a decoder, a processor, or a communications apparatus. Alternatively, a part of the one or more memories may be separately disposed, or a part of the one or more memories may be integrated into a decoder, a processor, or a communications apparatus. A type of the memory may be a storage medium in any form, and this is not limited in this application.

Tenth, a "protocol" in the embodiments of this application may be a standard protocol in the communications field, for example, may include an LTE protocol, an NR protocol, and a related protocol applied to a future communications system. This is not limited in this application.

Eleventh, "at least one" indicates one or more, and "a plurality of" indicates two or more. The term "and/or" describes an association relationship between associated objects and represents that three relationships may exist. For example, A and/or B may represent the following cases: Only A exists, both A and B exist, and only B exists, where A and B may be singular or plural. The character "/" usually indicates an "or" relationship between the associated objects. "at least one item (one) of the following" or a similar expression thereof indicates any combination of these items, including a single item or any combination of a plurality of items. For example, at least one of a b, and c may represent: a, b, c, a and b, a and c, b and c, or a, b, and c, where a, b, and c each may be singular or plural.

The following describes in detail the channel measurement method provided in the embodiments of this application with reference to the accompanying drawings.

It should be understood that the method provided in the embodiments of this application may be applied to a system in which communication is performed by using a multi-antenna technology, for example, the communications system 100 shown in FIG. 1. The communications system may include at least one network device and at least one terminal device. The network device and the terminal device may communicate with each other by using the multi-antenna technology.

It should be further understood that a specific structure of an execution body of the method provided in the embodiments of this application is not particularly limited in the following embodiments, provided that a program that records code of the method provided in the embodiments of this application can be run to perform communication according to the method provided in the embodiments of this application. For example, the method provided in the embodiments of this application may be performed by the terminal device or the network device, or a function module that is in the terminal device or the network device and that can invoke and execute the program.

Without loss of generality, interaction between the network device and the terminal device is used as an example below to describe in detail the channel measurement method provided in the embodiments of this application.

In an implementation, the network device may precode a downlink reference signal based on a predetermined angle. Therefore, based on a received precoded reference signal, the terminal device performs estimation and feeds back a delay of a downlink channel and a weighting coefficient corresponding to the downlink channel. The network device may determine, based on the delay of the downlink channel that is fed back by the terminal device, the weighting coefficient that corresponds to the downlink channel and that is fed back by the terminal device, and the predetermined angle, a precoding matrix that adapts to the downlink channel.

In another implementation, the network device may alternatively precode a downlink reference signal based on a predetermined delay. Therefore, based on a received precoded reference signal, the terminal device performs estimation and feeds back an angle of a downlink channel and a weighting coefficient corresponding to the downlink channel. The network device may determine, based on the angle of the downlink channel that is fed back by the terminal device, the weighting coefficient that corresponds to the downlink channel and that is fed back by the terminal device, and the predetermined delay, a precoding matrix that adapts to the downlink channel.

For ease of understanding, in the following embodiments, a polarization direction is first used as an example to describe in detail a channel measurement method 200 provided in an embodiment of this application. It should be understood that the polarization direction may be any one of one or more polarization directions of the transmit antenna that are configured by the network device. In other words, for a precoded reference signal transmitted by a transmit antenna in any polarization direction, the terminal device may perform channel measurement according to the method 200 provided in the embodiment of this application. It should be further understood that a quantity of polarization directions of the transmit antenna is not limited in this application. For example, there may be one polarization direction, that is, a single polarization direction; or there may be a plurality of polarization directions, for example, dual polarization directions.

Figure 2:
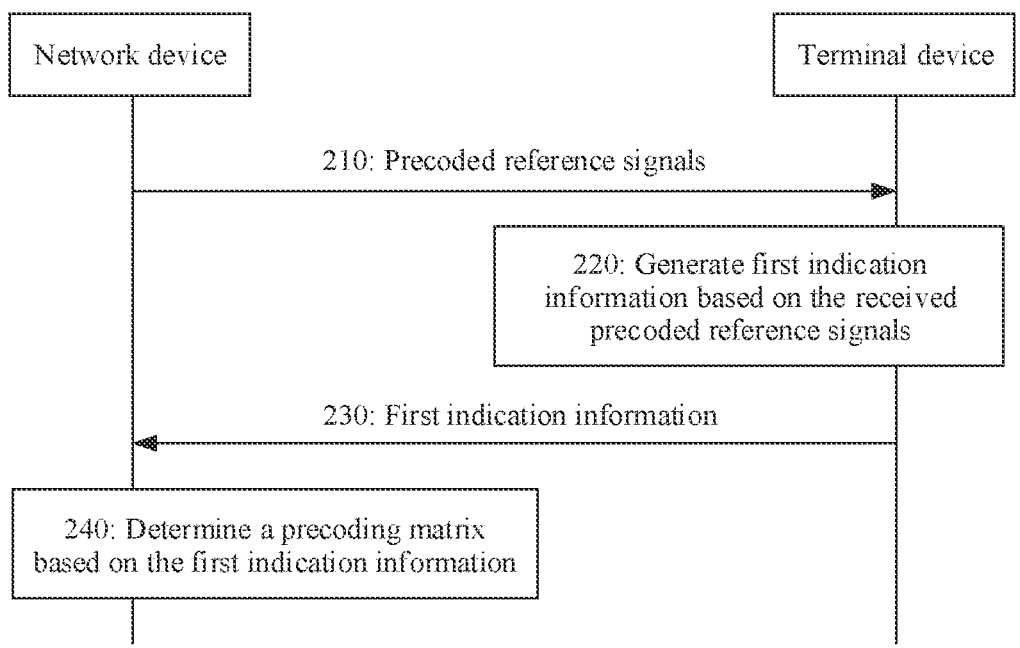
FIG. 2 is a schematic flowchart of a channel measurement method according to an embodiment of this application.

FIG. 2 is a schematic flowchart of the channel measurement method 200 from the perspective of device interaction according to the embodiment of this application. As shown in the figure, the method 200 may include step 210 to step 240. The following describes the steps in the method 200 in detail.

Step 210: A terminal device receives precoded reference signals, where the precoded reference signals are obtained by precoding reference signals based on K angle vectors. Correspondingly, a network device sends the precoded reference signals, where K≥1, and K is an integer.

In this embodiment of this application, the network device may precode the reference signals based on the K angle vectors, to obtain the precoded reference signals corresponding to K ports. A precoded reference signal corresponding to each port is obtained through precoding based on one of the K angle vectors.

Because of angle reciprocity between uplink and downlink channels, the K angle vectors may be determined through uplink channel measurement. It should be understood that the K angle vectors are not necessarily determined through uplink channel measurement. For example, the K angle vectors may be predefined, for example, defined in a protocol; or the K angle vectors may be determined by performing statistics collection based on one or more previous downlink channel measurements. A manner of determining the K angle vectors is not limited in this application. Because each angle may have a plurality of delays, the plurality of delays may correspond to a plurality of paths that have a same angle but different delays. The network device may select K angles and determine a quantity of delays that needs to be estimated by the terminal device at each angle.

In an embodiment, the K angle vectors and a quantity of delay vectors corresponding to each angle vector may be determined through uplink channel measurement.

Specifically, the network device may determine K relatively strong angles based on an uplink channel matrix obtained through pre-estimation, where the K angles may be represented by using K angle vectors. The K angle vectors may be obtained, for example, from a predefined angle vector set. Optionally, each angle vector in the angle vector set is obtained from a DFT matrix. The K angle vectors may be determined, for example, by performing DFT on the uplink channel matrix. Optionally, each angle vector in the angle vector set is a steering vector.

The network device may determine, for example, by using a joint angle and delay estimation (JADE) algorithm in the conventional technology, the K angle vectors and one or more relatively strong delay vectors corresponding to each angle vector. Specifically, the estimation algorithm may be, for example, a multiple signal classification algorithm (MUSIC), a Bartlett algorithm, or an estimation of signal parameters by rotational invariance technique algorithm (ESPRIT). A specific method in which the network device determines the K angle vectors and the quantity of delays corresponding to each angle vector is not limited in this application.

It is assumed that both the angle vector and the delay vector are obtained from the DFT matrix. The predefined angle vector set may be, for example, a vector set including a plurality of vectors in a space domain DFT matrix. For ease of distinguishing, the vector set is referred to as a space domain vector set $U_s$ and $U_s=[u_{s,1}\ u_{s,2}\ \ldots\ u_{s,T}]$. The predefined delay vector set may be, for example, a vector set including a plurality of vectors in a frequency domain DFT matrix. For ease of distinguishing, the vector set is referred to as a delay vector set $U_f$ and $U_f=[u_{f,1}\ u_{f,2}\ \ldots\ u_{f,N}]$.

The network device may perform space domain DFT transform and frequency domain DFT transform on a space-frequency matrix $H_{UL}$ obtained through uplink channel estimation, to obtain the following coefficient matrix $C_{UL}$: $C_{UL}=U_s^H H_{UL} U_f$. A dimension of the space-frequency matrix $H_{UL}$ may be T×N.

In an implementation, the network device may predefine a quantity K of angle vectors. The network device may determine, based on a sum of squares of moduli of elements in each row in the coefficient matrix, K rows with relatively large sums of squares of moduli. Positions of the K rows in the coefficient matrix $C_{UL}$ may be used to determine the K angle vectors. For example, the positions of the K rows in the coefficient matrix $C_{UL}$ may be positions of the K angle vectors in the foregoing space domain vector set. The network device may further determine, based on the K rows with relatively large sums of squares of moduli in the coefficient matrix $C_{UL}$, the quantity of delay vectors corresponding to each angle vector. For example, the network device may determine, based on a sum of squares of moduli of elements in a $k^{th}$ (1≤k≤K, and k is an integer) row in the K rows, a quantity of elements whose sum of squares of moduli is greater than a preset value. The preset value may be, for example, 80% of the sum of squares of moduli of the elements in this row. The quantity of elements whose sum of squares of moduli in the k row is greater than the preset value may be a quantity $L_s$ ($L_k$≥1, and $L_k$ is an integer) of delay vectors corresponding to a $k^{th}$ angle vector.

In another implementation, the network device may predefine a quantity P (P≥1, and P is an integer) of angle-delay pairs. The network device may determine, based on a modulus value of each element in the coefficient matrix $C_{UL}$, P elements with relatively large modulus values, and further determine rows in which the P elements are located. There may be K rows in which the P elements with relatively large modulus values are located. The rows in which the P elements are located in the coefficient matrix $C_U$ may be used to determine the K angle vectors. The network device may further determine, based on a quantity of elements in each of the K rows in the P elements, the quantity of delay vectors corresponding to each angle vector. A quantity of elements in a $k^{th}$ row in the P elements may be a quantity $L_k$ of delay vectors corresponding to a $k^{th}$ angle vector.

In the foregoing two implementations, quantities of delay vectors corresponding to at least two angle vectors may be different. In other words, quantities of delay vectors corresponding to some or all of the K angle vectors may be the same.

Each angle vector and the one or more delay vectors corresponding to each angle vector may be combined to obtain one or more angle-delay pairs, and angle-delay pairs obtained by combining the K angle vectors with delay vectors corresponding to the K angle vectors may be used to determine a precoding matrix. A specific process of determining a precoding matrix is described in detail in step 240. Detailed descriptions of the specific process of determining a precoding matrix based on an angle-delay pair are omitted herein.

In still another implementation, the network device predefines a quantity K of angle vectors. The network device may determine, based on a sum of squares of moduli of elements in each row in the coefficient matrix $C_{UL}$, K rows with relatively large sums of squares of moduli. Positions of the K rows in the coefficient matrix $C_{UL}$ may be used to determine the K angle vectors. The network device may further determine the quantity of delay vectors based on a square of a modulus of each element in the K rows. For example, the network device may determine, based on squares of moduli of elements in each of the K rows, specific columns in which elements whose squares of moduli each are greater than a preset value are located. The preset value may be, for example, 80% of a sum of squares of moduli of elements in the K rows. The network device may use, as a quantity L of delay vectors, a quantity of the columns in which elements whose modulus values each are greater than the preset value are located.

In this implementation, the angle vectors may correspond to L same delay vectors. In other words, the L delay vectors may be shared by the K angle vectors. In other words, the L delay vectors and any one of the K angle vectors may constitute L angle-delay pairs. K×L angle-delay pairs may be obtained by traversing the L delay vectors and the K angle vectors, and the K×L angle-delay pairs may be used to determine a precoding matrix. A specific process of determining a precoding matrix is described in detail in step 240. Detailed descriptions of the specific process of determining a precoding matrix based on an angle-delay pair are omitted herein.

It should be understood that several possible methods in which the network device determines the K angle vectors and the quantity of delay vectors corresponding to each angle vector are enumerated above only for ease of understanding. However, this shall not constitute any limitation on this application. For example, the quantity of delay vectors corresponding to each angle vector may alternatively be predefined, for example, defined in a protocol. A specific implementation in which the network device determines the K angle vectors and the quantity of delay vectors is not limited in this application.

It should be further understood that the quantity of delay vectors corresponding to each angle vector may be determined by the network device through uplink channel measurement, or may be determined by the terminal device through downlink channel measurement. This is not limited in this application.

In addition, the uplink channel matrix may be, for example, obtained by the network device through estimation based on a pre-received uplink reference signal such as an SRS, or obtained based on a correctly decoded data signal. This is not limited in this application. For a specific method in which the network device estimates an uplink channel matrix, refer to the conventional technology. For brevity, detailed descriptions of the specific method are omitted herein.

Because there is angle reciprocity between uplink and downlink channels in an FDD mode, the K angle vectors obtained through uplink channel measurement may be loaded to downlink reference signals to perform downlink channel measurement. Certainly, the L delay vectors obtained through uplink channel measurement may also be loaded to the downlink reference signals. In this embodiment, a case of loading the K angle vectors to the downlink reference signals is mainly described in detail. This manner may be applied to the FDD mode, and in particular, may be applied to a scenario in which uplink-downlink delay reciprocity is not very good in the FDD mode.

The network device may precode the downlink reference signals such as CSI-RSs based on the K angle vectors, to obtain the precoded reference signals, and may transmit the precoded reference signals by using a preconfigured reference signal resource.

Optionally, the method 200 further includes: The terminal device receives fifth indication information, where the fifth indication information is used to configure one reference signal resource. Correspondingly, the network device sends the fifth indication information.

The reference signal resource configured by using the fifth indication information may be used to carry precoded reference signals. The precoded reference signals carried on the reference signal resource may correspond to one or more same ports.

The fifth indication information may be, for example, higher layer signaling such as an RRC message. This is not limited in this application.

In a possible design, the fifth indication information may be used to configure a CSI-RS resource (CSI-RS resource, that is, an example of the reference signal resource) by using a higher layer parameter. The higher layer parameter may include, for example, a CSI resource configuration (CSI-ResourceConfig) and a non-zero power (NZP) CSI-RS resource set (NZP-CSI-RS-ResourceSet). The higher layer parameter may be a quantity of ports, a time-frequency resource, a pilot density, and the like configured for each CSI-RS resource. Therefore, the terminal device may determine, based on the higher layer parameter, a quantity of ports corresponding to precoded reference signals carried on each RB.

It should be noted that, in a current protocol, for example, in an NR protocol, the quantity of ports may be a quantity of ports corresponding to precoded reference signals carried on one RB. As described above, when a quantity of angle vectors is K, a quantity of ports corresponding to precoded reference signals obtained by precoding downlink reference signals may be K. Each port may correspond to one angle vector. In other words, a precoded reference signal corresponding to each port is obtained by precoding a reference signal based on one angle vector. That the network device sends the precoded reference signals corresponding to the K ports may mean that the network device may map the precoded reference signals corresponding to the K ports to a same RB. That the terminal device receives the precoded reference signals corresponding to the K ports may mean that precoded reference signals that can be received by the terminal device on one RB correspond to the K ports.

It should be understood that precoded reference signals carried on one RB may correspond to the K ports, but it does not indicate that the reference signals are carried on only one RB. The network device may map the precoded reference signals corresponding to the K ports to a plurality of RBs in a measurement bandwidth, where precoded reference signals carried on each RB correspond to the K ports. The terminal device may receive, on each of the plurality of RBs in the measurement bandwidth, the precoded reference signals corresponding to the K ports.

The network device may precode a reference signal based on the $k^{th}$ angle vector in the K angle vectors, to obtain a precoded reference signal corresponding to a $k^{th}$ port, where k=1, 2, ..., or K, and k is an integer. In other words, the K ports may be in a one-to-one correspondence with the K angle vectors.

Figure 3:
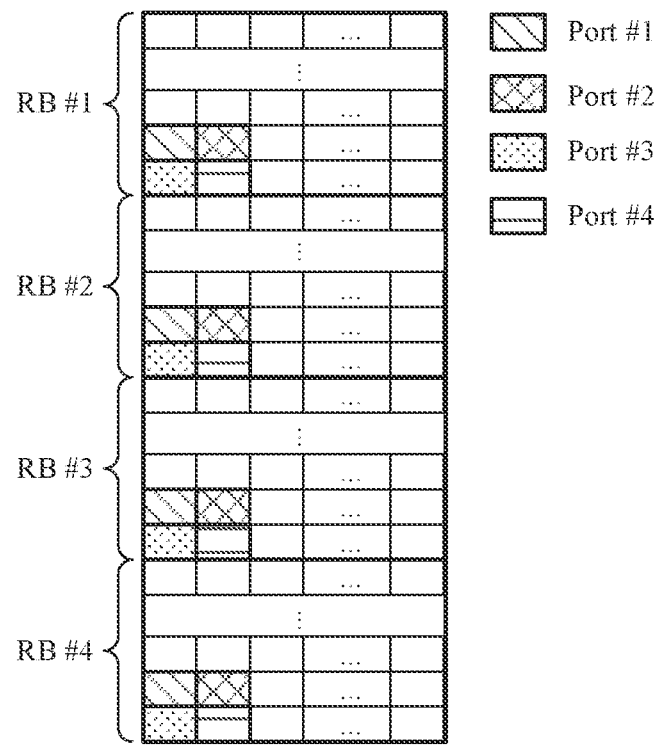
FIG. 3 is a schematic diagram in which a plurality of RBs carry precoded reference signals corresponding to a plurality of ports according to an embodiment of this application.

For ease of understanding, FIG. 3 shows an example in which a plurality of RBs carry precoded reference signals corresponding to a plurality of ports.

Figure 5:
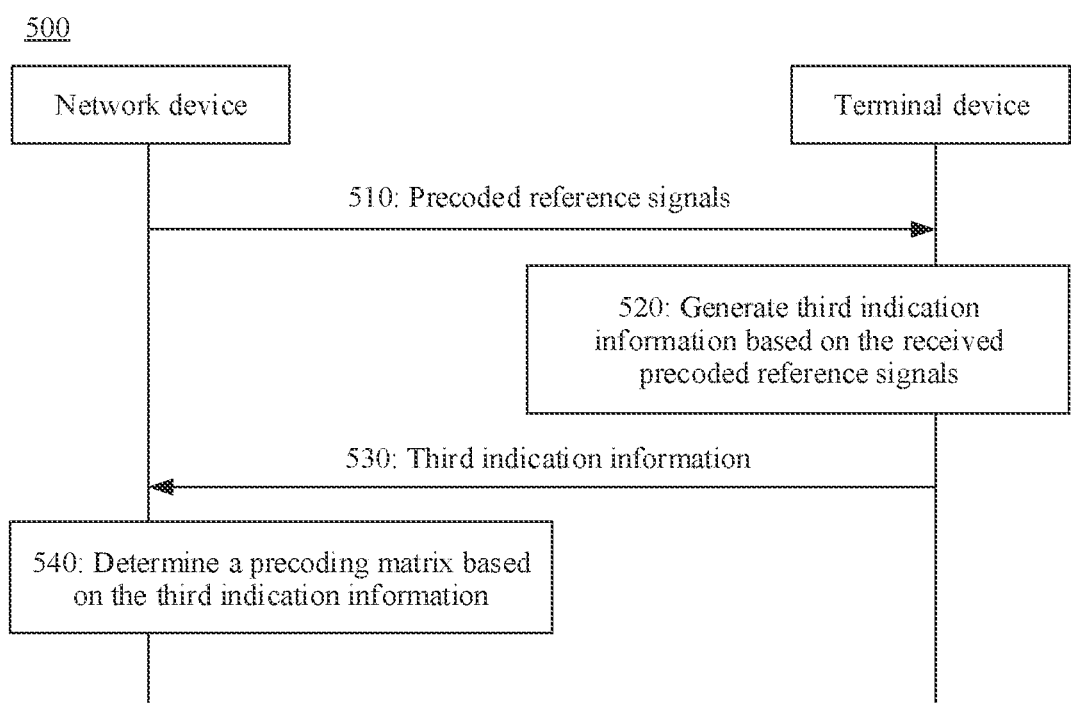
FIG. 5 is a schematic flowchart of a channel measurement method according to another embodiment of this application.
Figure 6:
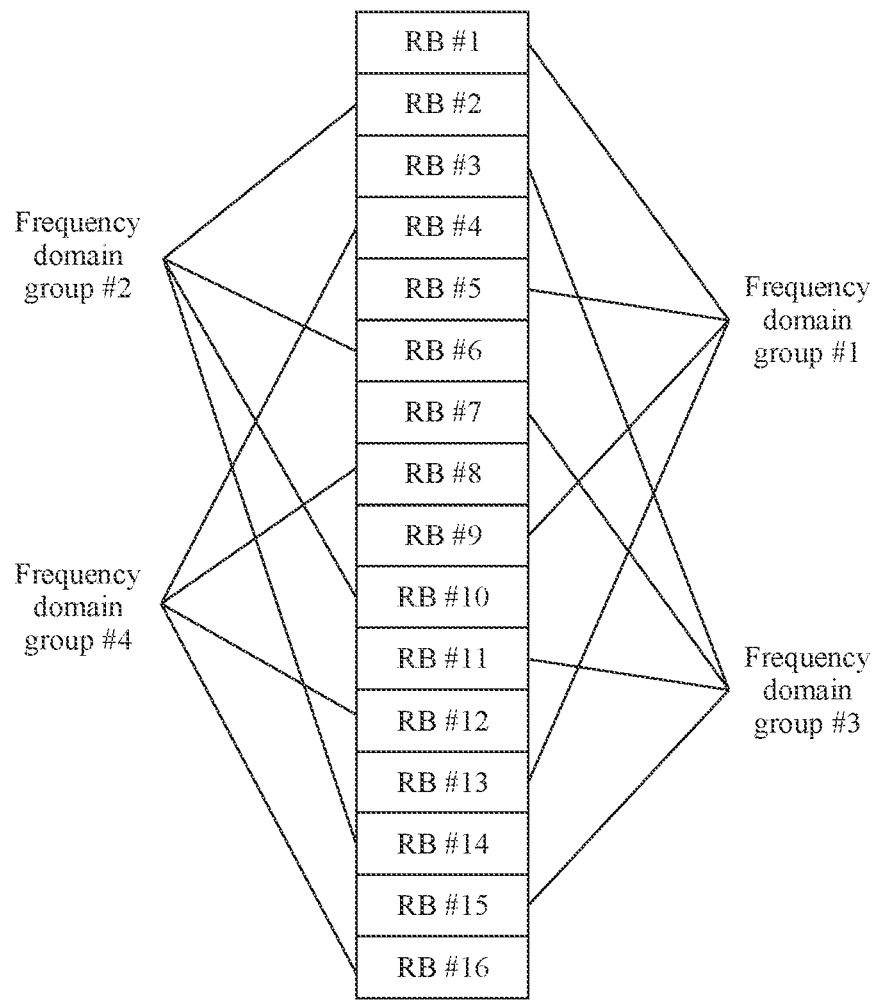
FIG. 6 is another schematic diagram in which a plurality of RBs carry precoded reference signals corresponding to a plurality of ports according to an embodiment of this application.

It should be understood that FIG. 3 and FIG. 6 are merely examples to describe in detail, when an angle vector and a delay vector are loaded to a reference signal, a correspondence between a port and a precoded reference signal carried on each RB. It should be understood that an RB is merely a possible form of a frequency domain unit. The frequency domain unit may further be, for example, a subband, a PRB, or an RBG. This is not limited in this application. A frequency domain unit in any form may include one or more RBs. In other words, the RB shown in FIG. 3 and FIG. 5 may be a frequency domain unit, or may be an RB that is in a frequency domain unit and that is used to carry a precoded reference signal. This is not limited in this application.

Therefore, a precoded reference signal is not necessarily carried on each RB in the measurement bandwidth and is not necessarily carried on a plurality of consecutive RBs either. In other words, the terminal device does not necessarily receive, on each RB in the measurement bandwidth, the precoded reference signals corresponding to the plurality of ports. In other words, the network device does not necessarily map the precoded reference signals to each RB in the measurement bandwidth. RBs used to carry downlink reference signals may be discretely distributed in the measurement bandwidth. For example, there is one RB for carrying a downlink reference signal at an interval of several RBs. This is not limited in this application.

For example, an RB #1, an RB #2, an RB #3, and an RB #4 in FIG. 3 are not necessarily consecutive in frequency domain. For example, the RB #1, the RB #2, the RB #3, and the RB #4 may be respectively located in four consecutive to-be-measured subbands, but there may be one or more RBs between every two RBs, for example, between the RB #1 and the RB #2, between the RB #2 and the RB #3, and between the RB #3 and the RB #4.

In addition, this application imposes no limitation either on a quantity of RBs that are in each frequency domain unit and that are used to carry a precoded reference signal. For example, each frequency domain unit may include one RB used to carry a precoded reference signal, or may include a plurality of RBs used to carry a precoded reference signal. Regardless of whether one or more RBs in a frequency domain unit carry precoded reference signals, a quantity of ports corresponding to precoded reference signals carried on each RB remains unchanged. It can be understood that, when each frequency domain unit includes a plurality of RBs used to carry precoded reference signals, angle-delay pairs corresponding to precoded reference signals carried on RBs in a same frequency domain unit may be the same or may be different, or port numbers corresponding to precoded reference signals carried on RBs in a same frequency domain unit may be the same or may be different. This is not limited in this application.

An example in which an RB is used as a frequency domain unit is used below to describe in detail a correspondence between ports and precoded reference signals carried on a plurality of RBs with reference to the accompanying drawings. That an RB is used as a frequency domain unit may also be understood as that each frequency domain unit includes only one RB used to carry a reference signal.

FIG. 3 shows the example in which a plurality of RBs carry precoded reference signals corresponding to a plurality of ports. The figure shows an example in which a quantity of RBs is 4. In the four RBs shown in the figure, precoded reference signals carried on each RB may correspond to four ports, in other words, K=4. The precoded reference signals corresponding to the four ports may be obtained through precoding based on four different angle vectors. For example, a precoded reference signal corresponding to a port #1 may be obtained through precoding based on an angle vector $a(\theta_1)$, a precoded reference signal corresponding to a port #2 may be obtained through precoding based on an angle vector $a(\theta_2)$, a precoded reference signal corresponding to a port #3 may be obtained through precoding based on an angle vector $a(\theta_1)$, and a precoded reference signal corresponding to a port #4 may be obtained through precoding based on an angle vector $a(\theta_4)$.

As shown in the figure, precoded reference signals corresponding to a same port occupy a same RE in all the RBs, in other words, relative positions of resources occupied by the precoded reference signals corresponding to the same port in all the RBs are the same. REs occupied by precoded reference signals corresponding to different ports in a same RB may be different, for example, may be distinguished in a frequency division multiplexing (FDM) or time division multiplexing (TDM) manner. Alternatively, REs occupied by precoded reference signals corresponding to different ports in a same RB may be the same, for example, may be distinguished in a code division multiplexing (CDM) manner. The figure is merely an example and shows an example in which the port #1 and the port #2 are distinguished from the port #3 and the port #4 through FDM, and the port #1 and the port #3 are distinguished from the port #2 and the port #4 through TDM.

It should be understood that FIG. 3 is merely an example for ease of understanding, and does not show all REs in one RB. A quantity of REs in each RB is not limited in this application. In addition, a quantity of ports corresponding to precoded reference signals carried on each RB and a specific manner of multiplexing a resource between the reference signals corresponding to the ports are not limited in this application.

The four RBs shown in the figure may be an example of the reference signal resource described above. The four RBs may belong to a same reference signal resource. It should be understood that the figure is merely an example, and shows an example in which the four RBs are used as the reference signal resource. This shall not constitute any limitation on this application. The reference signal resource may include more or fewer RBs. A quantity of RBs included in the reference signal resource is not limited in this application.

As described above, precoding the reference signals based on the K angle vectors to obtain the precoded reference signals means enabling the transmitted precoded reference signals to have K different space directivity through beamforming. The K different space directivity may be K different ports that can be identified by the terminal device.

Step 220: The terminal device generates first indication information based on the received precoded reference signals, where the first indication information may be used to indicate at least one delay vector and P weighting coefficients.

When the precoded reference signals are sent to the terminal device through a radio channel, the precoded reference signals pass through a downlink channel. Therefore, the terminal device may detect information about a downlink channel that does not have complete reciprocity. The terminal device may determine, based on the received precoded reference signals corresponding to the K ports, a delay vector that can be used to construct a precoding matrix that adapts to the downlink channel, and a weighting coefficient corresponding to the delay vector. The terminal device may generate the first indication information based on the determined delay vector and the determined weighting coefficient.

As described above, the space-frequency matrix $H_{DL}$ satisfies: $H_{DL}=SC_{DL}F^H$. In this embodiment, a dimension of $H_{DL}$ may be T×N. There may be K angle vectors, and a length of each angle vector may be T. In this case, a dimension of S may be T×K. There may be L delay vectors, and a length of each delay vector may be N. In this case, a dimension of F may be N×L. The following formula may be obtained by transforming the foregoing formula: $(H_{DL}{}^T S^*)^T = C_{DL}F^H$. Herein, $H_{DL}{}^T$ is a space-frequency matrix determined based on a real channel; and $H_{DL}{}^T S^*$ is a real channel (or referred to as an equivalent channel) on which space domain precoding is performed, and a dimension of the real channel may be K×N. Each column in the matrix may represent a channel estimation value obtained by performing estimation on one RB based on a received precoded reference signal. Each row in the matrix may represent a channel estimation value that is received on N RBs and that corresponds to one port.

The terminal device may further determine, based on a received precoded reference signal, a delay vector used to construct a downlink channel and a weighting coefficient corresponding to each angle-delay pair.

First, the terminal device may perform downlink channel estimation based on the precoded reference signals corresponding to the K ports.

As described above, the precoded reference signal corresponding to each of the K ports is obtained by precoding a reference signal based on one of the K angle vectors. The K ports may be in a one-to-one correspondence with the K angle vectors. Therefore, the terminal device performs downlink channel estimation based on the precoded reference signals corresponding to the K ports, in other words, performs downlink channel estimation based on the precoded reference signals obtained through precoding based on the K angle vectors.

If precoding on a reference signal is not considered, for each receive antenna, a dimension of a downlink channel may be N×T. A dimension of a downlink channel received on one receive antenna and one RB may be 1×T. Because the network device precodes a reference signal based on an angle vector, and a dimension of each angle vector may be T×1, a dimension of a channel estimation value obtained by the terminal device by performing channel estimation based on a precoded reference signal that is received on each receive antenna and each RB and that corresponds to one port may be 1×1. Because the network device precodes the reference signals based on the K angle vectors, the precoded reference signals carried on each RB may correspond to the K ports. The precoded reference signal corresponding to the $k^{th}$ port in the K ports may be obtained, for example, by precoding the reference signal based on the $k^{th}$ angle vector in the K angle vectors. In other words, the precoded reference signal corresponding to the $k^{th}$ port may be used to determine one or more delay vectors corresponding to the $k^{th}$ angle vector and one or more weighting coefficients. The one or more weighting coefficients are weighting coefficients corresponding to one or more angle-delay pairs determined based on the $k^{th}$ angle vector and the one or more delay vectors.

Specifically, the terminal device may estimate a corresponding downlink channel based on the precoded reference signal corresponding to each port. For example, for the $k^{th}$ port in the K ports, the terminal device may estimate, based on the precoded reference signal corresponding to the $k^{th}$ port, a downlink channel corresponding to the $k^{th}$ port. The precoded reference signals are carried in the N frequency domain units, and for the precoded reference signal corresponding to each port, a signal received by the terminal device on each receive antenna may be represented as a matrix whose dimension is 1×N or a row vector whose length is N. In this case, a dimension of the downlink channel $y^{(k)}$ obtained by the terminal device through estimation based on the precoded reference signal corresponding to the $k^{th}$ port is also 1×N. The 1×N downlink channel $y^{(k)}$ is a channel estimation value obtained by performing channel estimation based on the precoded reference signal obtained through precoding based on the $k^{th}$ angle vector. N elements in the channel estimation value are in a one-to-one correspondence with the N RBs. Each element may be obtained by performing channel estimation based on a precoded reference signal received on a corresponding RB element.

It should be understood that, for a specific method in which the terminal device performs channel matrix estimation based on a precoded reference signal, refer to a channel estimation method in the conventional technology. For brevity, detailed descriptions of the specific method are omitted herein.

Then, the terminal device may determine, based on the downlink channel estimation values, the at least one delay vector used to constitute the P angle-delay pairs and the P weighting coefficients corresponding to the P angle-delay pairs. The at least one delay vector and the P weighting coefficients may be fed back to the network device by using the first indication information.

The at least one delay vector and the P weighting coefficients may be determined by the terminal device based on the downlink channel estimation values. Therefore, the at least one delay vector and the P weighting coefficients may be determined based on the precoded reference signals corresponding to the K ports.

In an implementation, the terminal device may determine at least one delay vector based on the precoded reference signal corresponding to each port, in other words, the terminal device may determine at least one delay vector for each angle vector. The delay vectors determined for the angle vectors may be different from each other, or the delay vectors determined for the angle vectors may be partially different. When delay vectors determined for at least two angle vectors are different, the terminal device may determine one or more corresponding delay vectors based on each angle vector.

For example, for the $k^{th}$ angle vector, or based on the precoded reference signal corresponding to the $k^{th}$ port, $L_k$ delay vectors are determined, where $L_k \geq 1$, and $L_k$ is an integer. Because the $L_k$ delay vectors are determined based on the precoded reference signal corresponding to the $k^{th}$ port, the $L_k$ delay vectors may be considered as delay vectors corresponding to the $k^{th}$ port. The angle vectors and the delay vectors that correspond to the K ports may be used to constitute the P angle-delay pairs. In other words, a quantity of delay vectors determined by the terminal device is P, where $$P = \sum_{k=1}^{K} L_k,$$

$1 \leq k \leq K$, and k is an integer.

That delay vectors determined for at least two angle vectors are different may mean that the delay vectors corresponding to the at least two angle vectors are different, but delay vectors corresponding to other angle vectors may be the same or may be different. This is not limited in this application. In other words, the delay vectors corresponding to the angle vectors may be partially or all different.

That delay vectors corresponding to two angle vectors are different may mean that the delay vectors corresponding to the two angle vectors are all different, in other words, are not repeated or have no intersection; or may mean that the delay vectors corresponding to the two angle vectors are partially different, in other words, are partially repeated but are not all the same, or have an intersection but are not all the same. In addition, when the delay vectors corresponding to the two angle vectors are different, quantities of delay vectors corresponding to the two angle vectors may be the same or may be different. This is not limited in this application. It can be understood that the P delay vectors may include one or more repeated delay vectors. However, the P delay vectors are combined with different angle vectors to constitute P angle-delay pairs that are different from each other. The terminal device still needs to determine and feed back the one or more corresponding delay vectors for each angle vector, that is, a total of P delay vectors.

Because the K angle vectors may be in a one-to-one correspondence with the K ports, that the terminal device determines the one or more delay vectors based on the precoded reference signal corresponding to each port may also mean that the terminal device determines the one or more delay vectors for each angle vector.

Optionally, the P delay vectors may include the one or more delay vectors determined for each of the K angle vectors. The $L_k$ delay vectors determined based on the $k^{th}$ angle vector may be determined based on a plurality of channel estimation values obtained by performing channel estimation on a plurality of RBs based on the precoded reference signal obtained through precoding based on the $k^{th}$ angle vector.

The quantity of delay vectors determined based on each angle vector may be indicated by the network device. Because of delay reciprocity between the uplink and downlink channels, the network device may indicate to the terminal device based on a quantity of delays determined through uplink channel measurement, a quantity of delays that need to be fed back during downlink channel measurement. Each delay may be represented by using one delay vector. Optionally, before step 220, the method further includes: The terminal device receives second indication information, where the second indication information is used to indicate a quantity of delay vectors fed back for each angle vector. Correspondingly, the network device sends the second indication information.

For example, the network device may add the second indication information to physical layer signaling such as DCI, or the network device may add the second indication information to higher layer signaling such as a MAC CE message or an RRC message. This is not limited in this application.

The network device determines, through uplink channel measurement, the quantity of delays corresponding to each angle vector so that reciprocity between the uplink and downlink channels is fully utilized, and feedback overheads of the terminal device can be reduced.

The quantity of delay vectors determined based on each angle vector may alternatively be determined by the terminal device and reported to the network device. The terminal device may determine, based on the received precoded reference signal corresponding to each port, the one or more delay vectors corresponding to each angle vector. When determining the delay vector, the terminal device may determine the quantity of delay vectors corresponding to each angle vector. Optionally, the method further includes: The terminal device sends second indication information, where the second indication information is used to indicate a quantity of delay vectors fed back for each angle vector. Correspondingly, the network device receives the second indication information.

When the terminal device voluntarily determines the quantity of delay vectors corresponding to each angle vector, the terminal device may determine the quantity of delay vectors based on the downlink channel estimation value. A specific process in which the terminal device determines, based on a downlink channel estimation value, a delay vector corresponding to each angle vector is described in detail in step 220. Detailed descriptions of the specific process are omitted herein.

For example, the terminal device may indicate, in the first indication information, the quantity of delay vectors corresponding to each angle vector. In other words, the second indication information and the first indication information may be same indication information, or the second indication information may be independent of the first indication information. The terminal device may add the second indication information, for example, to CSI.

The terminal device determines, through downlink channel measurement, the quantity of delays corresponding to each angle vector so that feedback can be more accurately performed based on a downlink channel state. This is particularly applicable to a scenario in which uplink-downlink delay reciprocity is not very good.

Optionally, the quantity of delay vectors determined based on each angle vector may alternatively be predefined, for example, predefined in a protocol.

The quantity of delay vectors fed back for each angle vector and a manner of obtaining the quantity are not limited in this application.

The terminal device may determine, based on the downlink channel estimation value obtained through estimation based on the precoded reference signal corresponding to the $k^{th}$ port, the $L_k$ delay vectors corresponding to the $k^{th}$ port, in other words, the $L_k$ delay vectors corresponding to the $k^{th}$ angle vector.

It should be noted that, when determining the $L_k$ delay vectors corresponding to the $k^{th}$ port, the terminal device may determine a value of $L_k$ based on the second indication information that is defined in a protocol or that is pre-received, or may voluntarily determine a value of $L_k$, and report the value of $L_k$ to the network device by using the second indication information. This is not limited in this application. Herein, only for ease of description, introduction of $L_k$ does not mean that the terminal device has learned of the value of $L_k$ in advance.

For example, the terminal device may determine the $L_k$ delay vectors and $L_k$ weighting coefficients through DFT. Specifically, the terminal device may project, onto each delay vector in the predefined delay vector set, the downlink channel estimation value $y^{(k)}$ obtained through estimation based on the precoded reference signal corresponding to the $k^{th}$ port, to obtain a plurality of projection values.

If the terminal device learns of the value of $L_k$ in advance, the terminal device may determine $L_k$ relatively strong delay vectors based on moduli of the projection values. The $L_k$ relatively strong delay vectors may be delay vectors corresponding to $L_k$ projection values with relatively large moduli in the plurality of projection values.

If the terminal device does not learn of the value of $L_k$ in advance, the terminal device may determine, for example, based on squares of moduli of the projection values, a quantity of elements whose squares of moduli each are greater than a preset value. The quantity of elements whose squares of moduli each are greater than the preset value is a quantity $L_k$ of delay vectors corresponding to the $k^{th}$ angle vector. The terminal device may further determine the $L_k$ delay vectors from the delay vector set. The $L_k$ delay vectors that are obtained through delay vector projection in the delay vector set and that correspond to the $L_k$ projection values whose squares of moduli each are greater than the preset value may be determined as delay vectors corresponding to the $k^{th}$ angle vector. The $L_k$ projection values with relatively large moduli may be $L_k$ weighting coefficients corresponding to the $L_k$ delay vectors. In other words, the $L_k$ weighting coefficients may be determined by the terminal device based on a plurality of channel estimation values obtained by performing channel estimation on a plurality of RBs based on the precoded reference signal corresponding to the $k^{th}$ port.

For example, the $L_k$ weighting coefficients corresponding to the $k^{th}$ angle vector may be obtained by performing the following matrix operation: $[c_1^{(k)}\ c_2^{(k)} \ldots c_N^{(k)}]=y^{(k)}U_r$. The $L_k$ projection values with relatively large moduli in the vector $[c_1^{(k)}\ c_2^{(k)} \ldots c_N^{(k)}]$ are the $L_k$ weighting coefficients $[\alpha_{l_1}^{(k)}\ \alpha_{l_2}^{(k)} \ldots \alpha_{l_k}^{(k)}]$ corresponding to the $k^{th}$ angle vector. It can be understood that the $L_k$ weighting coefficients are all obtained from the N elements in $[c_1^{(k)}\ c_2^{(k)} \ldots c_N^{(k)}]$. Herein, different symbols are used only for ease of distinguishing.

It should be noted that the $L_k$ weighting coefficients may be the weighting coefficients corresponding to $L_k$ angle-delay pairs corresponding to the $k^{th}$ angle vector (or the $k^{th}$ port) in the P angle-delay pairs. Each of the $L_k$ angle-delay pairs may be determined based on the $k^{th}$ angle vector and each of the $L_k$ delay vectors corresponding to the $k^{th}$ angle vector. Therefore, the $L_k$ weighting coefficients may be referred to as weighting coefficients corresponding to the $L_k$ delay vectors or weighting coefficients corresponding to the $k^{th}$ angle vector.

It should be understood that the specific method in which the terminal device determines the quantity $L_k$ of delay vectors, the $L_k$ delay vectors, and the $L_k$ weighting coefficients based on the downlink channel estimation values $y^{(k)}$ is merely an example for ease of understanding and shall not constitute any limitation on this application. The terminal device may obtain, for example, by using a JADE algorithm in the conventional technology or through DFT, the quantity $L_k$ of corresponding delay vectors, the $L_k$ delay vectors, and the $L_k$ weighting coefficients through estimation based on the precoded reference signal corresponding to the $k^{th}$ port. For brevity, examples are not described one by one herein.

It should be further understood that, according to different implementations and algorithms, the terminal device may simultaneously determine, by using a same processing step, a delay vector and a weighting coefficient corresponding to a same angle vector, or may separately determine, by using different processing steps, a delay vector and a weighting coefficient corresponding to a same angle vector. This is not limited in this application.

Based on the $L_k$ delay vectors and the weighting coefficients corresponding to the delay vectors that are determined through channel estimation, the downlink channel estimation value $y^{(k)}$ may be approximately as follows:

$$y^{(k)} \approx \sum_{l_k=1}^{L_k} \alpha_{l_k}^{(k)} b(\tau_{l_k}^{(k)})^H.$$

Herein, $b(\tau_{i_k}^{(k)})$ represents an $l_k^{th}$ delay vector in the $L_k$ delay vectors corresponding to the $k^{th}$ port, and $\alpha_{i_k}^{(k)}$ represents a weighting coefficient corresponding to the delay vector $b(\tau_{i_k}^{(k)})$.

According to the foregoing method, the terminal device may obtain K groups of delay vectors and K groups of weighting coefficients through estimation based on the received precoded reference signals corresponding to the K ports. Each group of delay vectors may correspond to one group of weighting coefficients. A $k^{th}$ group of delay vectors may include $L_k$ delay vectors, and a $k^{th}$ group of weighting coefficients may include $L_k$ weighting coefficients.

It can be understood that quantities of delay vectors included in at least two of the K groups of delay vectors may be different from each other, or quantities of delay vectors included in the groups of delay vectors may be the same in pairs. Because the quantities of delay vectors included in the groups of delay vectors may be the same or different, quantities of weighting coefficients included in the groups of weighting coefficients may also be the same or different. This is not limited in this application.

In another implementation, the terminal device may determine at least one delay vector based on the precoded reference signals corresponding to the K ports, for example, L delay vectors, where L≥1, and L is an integer. The L delay vectors may be delay vectors shared by the K angle vectors, and are used to constitute P angle delay pairs, in other words, P=K×L.

Optionally, the first indication information is used to indicate L delay vectors, and the L delay vectors are fed back based on the K angle vectors. Any two of the K angle vectors correspond to L same delay vectors. In other words, in the K angle vectors, one or more delay vectors fed back for a first angle vector are the same as at least one delay vector fed back for a second angle vector. The first angle vector and the second angle vector are any two angle vectors in the K angle vectors. In other words, the L delay vectors may be shared by the K angle vectors. When indicating the L delay vectors by using the first indication information, the terminal device may generate only one piece of information used to indicate the L delay vectors.

A value of L may be indicated by the network device in advance by using signaling. Because of delay reciprocity between the uplink and downlink channels, the network device may indicate, to the terminal device based on a quantity of delays determined through uplink channel measurement, a quantity of delays that need to be fed back during downlink channel measurement. Each delay may be represented by using one delay vector. Optionally, before step 220, the method further includes: The terminal device receives second indication information, where the second indication information is used to indicate a value of L. Correspondingly, the network device sends the second indication information.

For example, the terminal device may add the second indication information to physical layer signaling such as DCI, or the terminal device may add the second indication information to higher layer signaling such as a MAC CE message or an RRC message. This is not limited in this application.

The network device determines, through uplink channel measurement, the quantity of delays corresponding to each angle vector so that reciprocity between the uplink and downlink channels is fully utilized, and feedback overheads of the terminal device can be reduced.

Alternatively, L may be determined by the terminal device and reported to the network device. The terminal device may determine a quantity of relatively strong delay vectors based on the received precoded reference signals. Optionally, the method further includes: The terminal device sends second indication information, where the second indication information is used to indicate a value of L. Correspondingly, the network device receives the second indication information.

For example, the terminal device may indicate the value of L in the first indication information. In other words, the second indication information and the first indication information may be same indication information, or the second indication information may be independent of the first indication information. The terminal device may add the second indication information, for example, to CSI.

The terminal device determines, through downlink channel measurement, the quantity of delays corresponding to each angle vector so that feedback can be more accurately performed based on a downlink channel state. This is particularly applicable to a scenario in which uplink-downlink delay reciprocity is not very good.

Optionally, L may alternatively be predefined, for example, predefined in a protocol.

The value of L and a manner of obtaining the value of L are not limited in this application.

The L delay vectors may be determined based on the precoded reference signals corresponding to the K ports, or may be determined based on a precoded reference signal corresponding to a specific port. This is not limited in this application.

In an implementation, the terminal device may project, onto each delay vector in the predefined delay vector set, the downlink channel estimation value obtained through estimation based on the precoded reference signal corresponding to each of the K ports, to determine, based on moduli of projection values, L relatively large projection values corresponding to each port. To be specific, based on the channel estimation values of the K ports, K groups of projection values may be obtained through projection, and each group of projection values includes L projection values. The terminal device may further determine L delay vectors based on a sum of square of moduli of the L projection values in each group of projection values. For example, the terminal device may sum up squares of moduli of each of the K groups of projection values, and determine that L delay vectors corresponding to a group of projection values with a largest sum of squares of moduli in the K groups of projection values are L to-be-fed-back delay vectors.

The L projection values in each of the K groups of projection values may be L weighting coefficients corresponding to each of the K ports. For example, L projection values in a $k^{th}$ group of projection values are L weighting coefficients corresponding to the $k^{th}$ port. In other words, the L weighting coefficients corresponding to the $k^{th}$ port may be determined based on the precoded reference signal corresponding to the $k^{th}$ port. The L weighting coefficients corresponding to the $k^{th}$ port are L weighting coefficients corresponding to the $k^{th}$ angle vector. More specifically, the L projection values in the $k^{th}$ group of projection values may be weighting coefficients corresponding to L angle-delay pairs formed by the $k^{th}$ angle vector and the L delay vectors. Therefore, the L weighting coefficients corresponding to the $k^{th}$ angle vector may be determined by the terminal device based on a plurality of channel estimation values obtained by performing channel estimation on a plurality of RBs based on the precoded reference signal corresponding to the $k^{th}$ port.

It should be understood that a specific method in which the terminal device determines the L delay vectors and the P weighting coefficients based on the downlink channels of the K ports is merely an example for ease of understanding, and shall not constitute any limitation on this application. The terminal device may obtain, for example, by using a JADE algorithm in the conventional technology or through DFT, the $L_k$ corresponding delay vectors and the weighting coefficients corresponding to the delay vectors through estimation based on the precoded reference signal corresponding to the $k^{th}$ port. For brevity, detailed descriptions of the specific method in which the terminal device determines a delay vector and a weighting coefficient are omitted in this specification.

It should be further understood that, according to different implementations and algorithms, the terminal device may simultaneously determine, by using a same processing step, L delay vectors and L weighting coefficients (that is, a total of P weighting coefficients) corresponding to different ports, or may separately determine L delay vectors and P weighting coefficients by using different processing steps. This is not limited in this application.

According to the foregoing method, the terminal device may obtain one group of delay vectors and K groups of weighting coefficients through estimation based on the received precoded reference signals corresponding to the K ports. The group of delay vectors may include L delay vectors, and each group of weighting coefficients may include L weighting coefficients. It can be understood that, because the L delay vectors in the group of delay vectors may be shared by the K angle vectors, a quantity of weighting coefficients included in each group of weighting coefficients may be L.

In the foregoing two implementations, the terminal device may feed back one or more delay vectors for each angle vector, or may feed back one or more delay vectors for all the K angle vectors. Whether the terminal device performs feedback based on each angle vector or based on a plurality of angle vectors may be predefined in a protocol, or may be indicated by the network device in advance by using signaling, for example, may be explicitly indicated by using signaling or may be implicitly indicated by using the second indication information. For example, if a quantity of delay vectors fed back for each angle vector is indicated, it indicates that feedback is performed based on each angle vector. If only a quantity of one type of delay vectors is indicated, it indicates that feedback is performed based on a plurality of angle vectors. This is not limited in this application.

It should be noted that an example in which precoded reference signals carried on each RB correspond to K ports is shown above only for ease of understanding. Actually, the precoded reference signals carried on each RB may alternatively be obtained through precoding based on different angle vectors. In other words, angle vectors corresponding to the precoded reference signals carried on each RB may be at least partially different. In this case, quantities of ports corresponding to the precoded reference signals carried on each RB may be the same or may be different, and port numbers corresponding to the precoded reference signals carried on each RB may be the same or may be different.

For example, the network device may group a plurality of RBs in the measurement bandwidth to obtain a plurality of frequency domain groups. Precoded reference signals carried on RBs in a same frequency domain group may correspond to a same angle vector, and precoded reference signals carried on RBs in different frequency domain groups may correspond to different angle vectors. When the network device groups the RBs, the terminal device may still perform, according to the foregoing method, channel estimation on the plurality of RBs based on the precoded reference signal corresponding to each port to obtain a plurality of channel estimation values and further determine one or more to-be-fed-back delay vectors and P weighting coefficients.

After determining the at least one delay vector and the P weighting coefficients, the terminal device may generate the first indication information to indicate the at least one delay vector and the P weighting coefficients.

When the terminal device determines the one or more delay vectors for each angle vector, the terminal device may generate, based on the precoded reference signal obtained through precoding based on each angle vector or based on the precoded reference signal corresponding to each port, information used to indicate the one or more corresponding delay vectors.

For the $k^{th}$ port, the terminal device may generate, based on the $L_k$ delay vectors and the weighting coefficients corresponding to the delay vectors that are obtained through estimation, quantization information corresponding to the $k^{th}$ port, to indicate the $L_k$ delay vectors and the weighting coefficients corresponding to the delay vectors. It can be understood that the quantization information corresponding to the $k^{th}$ port belongs to the first indication information, or the quantization information corresponding to the $k^{th}$ port may be at least a part of the first indication information.

The terminal device may indicate a delay vector, for example, by using a bitmap or an index. Several possible implementations are enumerated as examples below.

Manner 1: The terminal device indicates one or more selected delay vectors in a delay vector set by using a bitmap.

Optionally, the first indication information includes K bitmaps, and a $k^{th}$ bitmap in the K bitmaps is used to indicate $L_k$ delay vectors in the delay vector set.

A quantity of bits included in each bitmap or a length of each bitmap may be, for example, a quantity of delay vectors included in the delay vector set.

When delay vectors corresponding to at least two angle vectors are different, the network device may indicate one or more corresponding delay vectors based on each angle vector. The network device may indicate, by using each of the K bitmaps, one or more delay vectors corresponding to each of the K angle vectors.

In other words, the K bitmaps may be in a one-to-one correspondence with the K angle vectors (or the K ports). Each bitmap may be used to indicate several delay vectors corresponding to one angle vector. The several delay vectors corresponding to each angle vector may be determined from the predefined delay vector set. For example, for the $k^{th}$ angle vector in the K angle vectors, the terminal device may indicate, by using the $k^{th}$ bitmap, the $L_k$ delay vectors corresponding to the $k^{th}$ angle vector.

Each bitmap may include a plurality of bits, and each bit corresponds to one delay vector in the predefined delay vector set. When a bit indicates "0", it may be considered that a delay vector corresponding to the bit is not selected. Alternatively, when a bit indicates "1", it may be considered that a delay vector corresponding to the bit is selected, in other words, the delay vector corresponding to the bit is a delay vector indicated by the terminal device to the network device, or is one of delay vectors indicated by the terminal device to the network device. It should be understood that a meaning expressed by a value of the indicator bit enumerated herein is merely an example and shall not constitute any limitation on this application.

In addition, when the delay vectors corresponding to the at least two angle vectors are different, the terminal device may further indicate a correspondence between each angle vector and a delay vector. The terminal device may indicate the one or more delay vectors corresponding to each of the K angle vectors to the network device in a predefined order by using each of the K bitmaps. Because the precoded reference signals obtained through precoding based on the K angle vectors correspond to the K ports, the terminal device may indicate the K bitmaps respectively corresponding to the K angle vectors, for example, in descending or ascending order of port numbers, and the network device may also determine, in a predefined order, one or more delay vectors corresponding to each port. Alternatively, when indicating the K bitmaps respectively corresponding to the K angle vectors, the terminal device may indicate, by using an additional indicator bit, a port number corresponding to each bitmap so that the network device determines one or more delay vectors corresponding to each port.

When any two of the K angle vectors correspond to L same delay vectors, the terminal device may generate indication information to indicate the L delay vectors only once. The terminal device may indicate the L delay vectors by using one bitmap. The bitmap may be used to indicate the L delay vectors that are in the delay vector set and that correspond to the K angle vectors.

Optionally, the second indication information includes a bitmap, and the bitmap is used to indicate the $L_k$ delay vectors that are in the delay vector set and that correspond to the $k^{th}$ angle vector in the K angle vectors.

A length of the bitmap may be K times the quantity of delay vectors included in the delay vector set.

The bitmap is also equivalent to a bitmap that is obtained by splicing the K bitmaps and whose length is the quantity of delay vectors in the delay vector set. In other words, the bitmap may include K groups of indicator bits, and each group of indicator bits may be used to indicate one or more delay vectors corresponding to one angle vector.

The terminal device may arrange the K groups of indicator bits in a predefined order so that the network device determines, in the predefined order, the one or more delay vectors corresponding to each angle vector (or each port).

Figure 4:
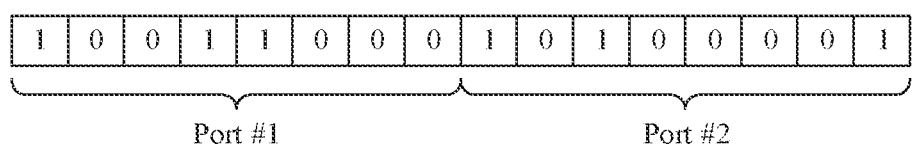
FIG. 4 is a schematic diagram of a bitmap according to an embodiment of this application.

FIG. 4 is a schematic diagram of a bitmap according to an embodiment of this application. The figure shows an example in which a quantity of ports is 2 (in other words, a quantity of angle vectors is: K=2) and a delay vector set includes eight delay vectors. The terminal device may indicate, by using a bitmap whose length is 16 bits, a delay vector corresponding to each angle vector. As shown in the figure, for an angle vector corresponding to a port #1, the terminal device selects a first delay vector, a fourth delay vector, and a fifth delay vector in the delay vector set; and for an angle vector corresponding to a port #2, the network device selects the first delay vector, a third delay vector, and an eighth delay vector in the delay vector set. Therefore, the network device may also determine, in a port number arrangement order, a delay vector corresponding to each port.

When any two of the K angle vectors correspond to L same delay vectors, the bitmap may be evolved into a bitmap whose length is the quantity of delay vectors in the delay vector set. The bitmap may be used to indicate the L delay vectors that are in the delay vector set and that correspond to the K angle vectors.

Manner 2: The terminal device may indicate one or more selected delay vectors by using an index of a delay vector combination.

Optionally, the first indication information includes K indexes, and a $k^{th}$ index in the K indexes is used to indicate $L_k$ delay vectors in the delay vector set.

In other words, the K indexes may be in a one-to-one correspondence with the K ports. Each index may be used to indicate a position, in the predefined delay vector set, of a combination of one or more delay vectors corresponding to one port. For example, the network device and the terminal device may predefine a one-to-one correspondence between a plurality of delay vector combinations and a plurality of indexes. Each index may be used to indicate one delay vector combination. Each combination may include a plurality of delay vectors. In this case, the $k^{th}$ index may be an index of a combination of the $L_k$ delay vectors.

In an implementation, the foregoing predefined one-to-one correspondence between a plurality of delay vector combinations and a plurality of indexes may be defined based on combinations of different quantities of delay vectors. For example, for a combination of four delay vectors, a one-to-one correspondence between a plurality of combinations and a plurality of indexes may be predefined. For another example, for a combination of eight delay vectors, a one-to-one correspondence between a plurality of combinations and a plurality of indexes may be predefined. For the combinations of different quantities of delay vectors, indexes may be repeated.

In other words, the terminal device may determine an index based on to-be-fed-back delay vectors and a quantity, and the network device may determine the $L_k$ delay vectors based on the quantity of delay vectors and the index. For example, the terminal device may determine, based on the $L_k$ to-be-fed-back delay vectors and the quantity $L_k$, an index of a combination of the $L_k$ delay vectors in the delay vector set. Because $L_k$ is indicated by the network device or is a predefined value, the network device may learn of $L_k$ in advance. Therefore, the $L_k$ delay vectors may be determined based on the index indicated by the terminal device.

It should be understood that the foregoing enumerated one-to-one correspondence between a plurality of delay vector combinations and a plurality of indexes is merely an example and shall not constitute any limitation on this application. For example, for the combinations of different quantities of delay vectors, indexes are alternatively not be repeated. This is not limited in this application.

In addition, when the delay vectors corresponding to the at least two angle vectors are different, the terminal device may further indicate a correspondence between each angle vector and a delay vector. The terminal device may indicate the one or more delay vectors corresponding to each of the K angle vectors to the network device in a predefined order by using each of the K indexes. Because the precoded reference signals obtained through precoding based on the K angle vectors correspond to the K ports, the terminal device may indicate the K indexes respectively corresponding to the K angle vectors, for example, in descending or ascending order of port numbers, and the network device may also determine, in a predefined order, one or more delay vectors corresponding to each port. Alternatively, when indicating the K indexes respectively corresponding to the K angle vectors, the terminal device may indicate, by using an additional indicator bit, a port number corresponding to each index so that the network device determines one or more delay vectors corresponding to each port.

When any two of the K angle vectors correspond to L same delay vectors, the terminal device may generate indication information to indicate the L delay vectors only once. The terminal device may indicate the L delay vectors by using one index. The index may be an index of a combination of the L delay vectors in the delay vector set.

Manner 3: The terminal device may indicate one or more selected delay vectors by using a delay vector index.

Optionally, the first indication information includes K groups of indexes, and $k^{th}$ group of indexes in the K groups of indexes is used to indicate $L_k$ delay vectors in the delay vector set.

When delay vectors corresponding to at least two angle vectors are different, the network device may indicate one or more corresponding delay vectors based on each angle vector. The network device may indicate, by using each of the K groups of indexes, one or more delay vectors corresponding to each of the K angle vectors. Each group of indexes may include one or more indexes respectively used to indicate one or more delay vectors in the delay vector set.

In other words, the K groups of indexes may be in a one-to-one correspondence with the K ports. Each group of indexes may be used to indicate positions, in the predefined delay vector set, of several delay vectors corresponding to one port. For example, the network device and the terminal device may predefine an index of each delay vector in the delay vector set. Each index corresponds to one delay vector. In this case, the km group of indexes may include an index of each of the LU delay vectors in the delay vector set.

When delay vectors corresponding to at least two angle vectors are different, the terminal device may indicate one or more corresponding delay vectors based on each angle vector. The terminal device may indicate, by using each of the K groups of indexes, one or more delay vectors corresponding to each of the K angle vectors. Each group of indexes may include one or more indexes respectively used to indicate one or more delay vectors in the delay vector set. Therefore, the network device may also determine, in a predefined order, the one or more delay vectors corresponding to each angle vector.

Manner 4: The network device may indicate, by using an index of an angle-delay pair combination, one or more delay vectors corresponding to each angle vector.

Because the one or more delay vectors corresponding to each angle vector are from a same delay vector set, the terminal device may combine each of the K angle vectors corresponding to the K ports with the delay vector set in a predefined order, to obtain an angle-delay pair set. It should be understood that the combination of each of the K angle vectors and the delay vector set herein may be a logical combination, and is not necessarily a combination of an angle vector set and a delay vector set. Therefore, the angle-delay pair set may be a logical set, and the network device and the terminal device do not necessarily pre-store the angle-delay pair set.

After the terminal device repeatedly uses the delay vector set for K times in a predefined order, K delay vector sets that are in a one-to-one correspondence with the K angle vectors may be obtained. The K delay vector sets are the same in pairs, and each delay vector set includes a plurality of delay vectors. The K delay vector sets may be combined with the K angle vectors to construct K angle-delay pair sets. Each angle-delay pair set may correspond to one of the K angle vectors and all delay vectors in the delay vector set.

During specific implementation, the terminal device may combine the one or more delay vectors corresponding to each of the K angle vectors, and indicate, by using the first indication information, an index, in a vector set formed by the K delay vector sets, of a combination of a plurality of delay vectors corresponding to the K angle vectors. The K delay vector sets may be obtained by repeatedly using a same delay vector set for K times. Delay vectors included in any two delay vector sets are the same, and each delay vector set may include a plurality of delay vectors. It can be understood that some of the plurality of delay vectors corresponding to the K angle vectors may be repeated. However, because the repeated delay vectors are combined with different angle vectors to constitute different angle-delay pairs, the index implicitly indicates the plurality of angle-delay pairs.

For example, when delay vectors corresponding to at least two angle vectors are different, the network device may indicate a combination of $$\sum_{k=1}^{K} L_k$$

delay vectors by using the index.

For the $k^{th}$ angle vector in the K angle vectors, the terminal device may determine $L_k$ delay vectors from the delay vector set. For the K angle vectors, it may be considered that the terminal device separately determines K groups of delay vectors from the delay vector set, where a quantity of delay vectors in a $k^{th}$ group is $L_k$. Therefore, the terminal device may feed back the index of the combination of the $$\sum_{k=1}^{K} L_k$$

delay vectors in the K delay vector sets to the network device. The index may be used to indicate positions of the $$\sum_{k=1}^{K} L_k$$

delay vectors in the K delay vector sets. In addition, the K groups of delay vectors may be arranged in a predefined order. For example, the K groups of delay vectors respectively corresponding to the K ports are arranged in ascending or descending order of port numbers. Therefore, the index may implicitly indicate a correspondence between each port and a delay vector. This is equivalent to indicating a correspondence between each angle vector and a delay vector and, therefore, is equivalent to implicitly indicating a plurality of angle-delay pairs.

For ease of understanding, descriptions are provided herein with reference to the bitmap shown in FIG. 4. The index may be used, for example, to indicate positions of the six selected delay vectors shown in FIG. 4 in the 16 delay vectors (that is, the delay vector set is reused twice).

When any two of the K angle vectors correspond to L same delay vectors, the terminal device may indicate positions of the L delay vectors in the delay vector set by using an index of a combination of the L delay vectors. In this case, the index is the same as the index described in Manner 2.

It should be understood that, when indicating the one or more delay vectors corresponding to each angle vector to the network device, the terminal device may implicitly or explicitly indicate the correspondence between each angle vector and a delay vector. The foregoing enumerated implementations show possible implementations that may be used to indicate the correspondence between each angle vector and a delay vector. However, this shall not constitute any limitation on this application. A specific implementation in which the terminal device indicates the correspondence between each angle vector and a delay vector is not limited in this application.

It should be further understood that, in the plurality of manners enumerated above, if the delay vector set is extended to a plurality of subsets by using an oversampling factor, the terminal device may select, from one or more subsets, a delay vector corresponding to each angle vector. In this case, the terminal device may further indicate, by using the first indication information or additional signaling, a subset to which the selected delay vector belongs. A specific method in which the network device selects, from one or more subsets, a delay vector corresponding to each angle vector may be implemented by using a method in the conventional technology. For brevity, detailed descriptions of the specific process are omitted herein.

It should be further understood that several possible implementations of indicating $L_k$ delay vectors are shown above only for ease of understanding. However, this shall not constitute any limitation on this application. A specific manner in which the terminal device indicates a delay vector is not limited in this application.

For example, the terminal device may indicate, through normalization, the P weighting coefficients corresponding to the P angle-delay pairs.

For example, the terminal device may determine a weighting coefficient with a largest modulus (for example, denoted as a largest weighting coefficient) from the P weighting coefficients, and indicate a position of the largest weighting coefficient in the P weighting coefficients. The terminal device may further indicate relative values of the remaining P−1 weighting coefficients relative to the largest weighting coefficient. The terminal device may indicate the P−1 weighting coefficients by using quantized value indexes of the relative values. For example, the network device and the terminal device may predefine a one-to-one correspondence between a plurality of quantized values and a plurality of indexes, and the terminal device may feed back the relative values of the weighting coefficients relative to the largest weighting coefficient to the network device based on the one-to-one correspondence. Because the terminal device quantizes each weighting coefficient, and a quantized value may be the same as or approximate to an actual value, the quantized value is referred to as a quantized value of the weighting coefficient.

The terminal device may indicate the P weighting coefficients in a pre-agreed order by using the first indication information. For example, the P weighting coefficients are grouped into K groups based on the K angle vectors, and the K groups of weighting coefficients are arranged into an ordered array in an order of the K angle vectors. The first indication information may be used to indicate a position of a normalized coefficient in the ordered array and sequentially indicate the remaining P−1 weighting coefficients based on positions of the weighting coefficients in the ordered array other than the normalized coefficient. Therefore, the network device determines the P weighting coefficients corresponding to the P angle-delay pairs.

It should be understood that the foregoing enumerated manner of indicating each weighting coefficient through normalization is merely a possible implementation and shall not constitute any limitation on this application. A specific manner in which the terminal device indicates a weighting coefficient is not limited in this application. For example, a quantized value index of each of the P weighting coefficients may also be indicated.

When the terminal device determines one or more delay vectors based on all of the K ports, in other words, w % ben the terminal device determines one or more delay vectors for all of the K angle vectors, the terminal device may indicate the one or more delay vectors only once, or the first indication information may include only indication information for one group of delay vectors. For example, the terminal device may indicate the group of delay vectors by using only one bitmap, one index, or one group of indexes, namely, the foregoing L delay vectors that can be shared.

Because the K angle vectors may be in a one-to-one correspondence with the K ports, that the terminal device determines the one or more delay vectors based on all of the K ports may also mean that the terminal device determines the one or more delay vectors for all of the K angle vectors.

Optionally, the first indication information includes a bitmap, and the bitmap is used to indicate L delay vectors in the delay vector set.

Optionally, the first indication information includes an index of a combination of L delay vectors in the delay vector set.

Optionally, the first indication information includes L indexes, and each index is used to indicate an index of one of L delay vectors in the delay vector set.

It should be understood that the foregoing enumerated method for indicating L delay vectors is merely an example, and shall not constitute any limitation on this application. A specific method in which the terminal device indicates a delay vector is not limited in this application.

For example, the terminal device may indicate the $L_k$ weighting coefficients through normalization.

For example, the terminal device may determine a weighting coefficient with a largest modulus (for example, denoted as a largest weighting coefficient) from the $L_k$ weighting coefficients, and indicate a position of the largest weighting coefficient in the $L_k$ weighting coefficients. The terminal device may further indicate relative values of the remaining $L_k-1$ weighting coefficients relative to the largest weighting coefficient. The terminal device may indicate the $L_k-1$ weighting coefficients by using quantized value indexes of the relative values. For example, the network device and the terminal device may predefine a one-to-one correspondence between a plurality of quantized values and a plurality of indexes, and the terminal device may feed back the relative values of the weighting coefficients relative to the largest weighting coefficient to the network device based on the one-to-one correspondence. Because the terminal device quantizes each weighting coefficient, and a quantized value may be the same as or approximate to an actual value, the quantized value is referred to as a quantized value of the weighting coefficient.

When indicating the P weighting coefficients by using the first indication information, the terminal device may construct, based on the K angle vectors and the L delay vectors, a matrix whose dimension is K×L. An element in a $k^{th}$ row and an $l^{th}$ column in the matrix may be a weighting coefficient corresponding to the $k^{th}$ angle vector and the $l^{th}$ delay vector, that is, a weighting coefficient corresponding to an angle-delay pair formed by the $k^{th}$ angle vector and the $l^{th}$ delay vector. The network device may restore, in a same manner, the P weighting coefficients corresponding to the P angle-delay pairs.

Certainly, the terminal device may alternatively construct, based on the L delay vectors and the K angle vectors, a matrix whose dimension is L×K. A correspondence between each element in a matrix and an angle-delay pair is similar to that described above. An element in an $l^{th}$ row and a et column in the matrix may be a weighting coefficient corresponding to the $l^{th}$ delay vector and the $k^{th}$ angle vector, that is, a weighting coefficient corresponding to an angle-delay pair formed by the $l^{th}$ delay vector and the $k^{th}$ angle vector. The network device may restore, in a same manner, the P weighting coefficients corresponding to the P angle-delay pairs.

It should be understood that the P weighting coefficients are indicated by constructing a matrix, to indicate a correspondence among each weighting coefficient, an angle vector, and a delay vector. This is merely a possible implementation and shall not constitute any limitation on this application. For example, the terminal device may alternatively indicate the P weighting coefficients in a pre-agreed order. For example, the terminal device sequentially arranges the P weighting coefficients corresponding to the P angle-delay pairs into an ordered array in a manner of first traversing the L delay vectors and then traversing the K angle vectors or in a manner of first traversing the K angle vectors and then traversing the L delay vectors so that the network device determines positions of the weighting coefficients in the ordered array. The network device may restore, in a same manner, the P weighting coefficients corresponding to the P angle-delay pairs.

It should be further understood that the foregoing enumerated manner of indicating each weighting coefficient through normalization is merely a possible implementation and shall not constitute any limitation on this application. A specific manner in which the terminal device indicates a weighting coefficient is not limited in this application. For example, a quantized value index of each of the $L_k$ weighting coefficients may also be indicated.

It should be noted that the normalization mentioned above may mean determining a largest weighting coefficient by using each receive antenna as a unit to perform normalization within a range of quantization information corresponding to each receive antenna. However, this shall not constitute any limitation on this application. For example, in this embodiment, the terminal device may alternatively determine a largest weighting coefficient by using a plurality of receive antennas, one polarization direction, a plurality of polarization directions, or one port as a unit, to perform normalization within a range of quantization information corresponding to the plurality of receive antennas, each polarization direction, the plurality of polarization directions, or the one port.

It should be further understood that the first indication information may be used to directly or indirectly indicate the P weighting coefficients. For example, for the largest weighting coefficient, a position of the largest weighting coefficient in the P weighting coefficients may be indicated. For another example, for a weighting coefficient whose quantized value is zero, a position of the weighting coefficient in the P weighting coefficients may also be indicated. In other words, the first indication information does not necessarily indicate each of the P weighting coefficients, provided that the network device can restore the P weighting coefficients based on the first indication information.

It should be further understood that the terminal device may sequentially indicate, for example, based on one or more weighting coefficients determined based on each of the K angle vectors, the P weighting coefficients by using the first indication information. When indicating the one or more weighting coefficients corresponding to each angle vector, the terminal device may indicate the L weighting coefficients in an order of arranging, in the delay vector set, the one or more delay vectors corresponding to the angle vector. Alternatively, the terminal device may indicate the $L_k$ delay vectors and the $L_k$ weighting coefficients in a predefined order, provided that the network device can restore, based on the first indication information, the $L_k$ delay vectors and the L weighting coefficients corresponding to the $L_k$ delay vectors.

It should be further understood that, when indicating the K groups of delay vectors and the K groups of weighting coefficients by using the first indication information, the terminal device may indicate, in a predefined order of indicating the K ports, a group of delay vectors and a group of weighting coefficients corresponding to each port; or in a predefined order of the K ports, may first indicate the K groups of delay vectors and then indicate the K groups of weighting coefficients, or may first indicate the K groups of weighting coefficients and then indicate the K groups of delay vectors, provided that the network device can restore, based on the first indication information, the K groups of delay vectors and the K groups of weighting coefficients corresponding to the K ports.

It should be noted that a specific process in which the terminal device generates the first indication information is described in detail above by using one polarization direction and one receive antenna as an example. In other words, the P weighting coefficients may be determined based on a precoded reference signal that is sent on a transmit antenna in one polarization direction and that is received on one receive antenna. However, this shall not constitute any limitation on this application.

When a plurality of receive antennas are configured for the terminal device, one receive antenna described above as an example may be any one of the plurality of receive antennas configured for the terminal device. In other words, the terminal device may determine a delay vector and a weighting coefficient for each receive antenna according to the foregoing method.

When transmit antennas in a plurality of polarization directions are configured for the network device, the polarization direction described above as an example may be any one of the plurality of polarization directions. In other words, the terminal device may determine, according to the foregoing method, a delay vector and a weighting coefficient based on a precoded reference signal sent for a transmit antenna in each polarization direction.

If a quantity of polarization directions is 1 and a quantity of receive antennas is R, where R>1, and R is an integer, the first indication information may be used to indicate R groups of delay vectors and R groups of weighting coefficients corresponding to the R receive antennas. Each group of delay vectors may include one or more delay vectors determined based on the K angle vectors, for example, P delay vectors (in other words, delay vectors corresponding to the angle vectors are different from each other), or L delay vectors (in other words, the K angle vectors share L same delay vectors). Each group of weighting coefficients may include P weighting coefficients.

Herein, the R groups of delay vectors and the R groups of weighting coefficients corresponding to the R receive antennas are R groups of delay vectors and R groups of weighting coefficients that are determined based on precoded reference signals received on each of the R receive antennas.

Optionally, the first indication information includes R groups of indication information fed back based on a receive antenna, and each group of indication information fed back based on a receive antenna corresponds to one receive antenna. Each group of indication information fed back based on a receive antenna may be used to indicate one or more delay vectors corresponding to one receive antenna and one or more weighting coefficients corresponding to the one receive antenna.

For an $r^{th}$ (r is any value in 1 to R, and r is an integer) receive antenna in the R receive antennas, the terminal device may generate, based on a delay vector and a weighting coefficient that are obtained through estimation, an $r^{th}$ group of indication information fed back based on the receive antenna, where the $r^{th}$ group of indication information fed back based on the receive antenna may be used to indicate a delay vector and a weighting coefficient that are determined based on a precoded reference signal received on the $r^{th}$ receive antenna. It can be understood that, because indication information fed back based on a receive antenna corresponds to the receive antenna, the $r^{th}$ group of indication information fed back based on the receive antenna may belong to the first indication information, or the $r^{th}$ group of indication information fed back based on the receive antenna may be at least a part of the first indication information. When there is one receive antenna, indication information fed back based on the receive antenna is the first indication information.

It can be understood that, in the foregoing embodiment shown with reference to FIG. 2, one receive antenna is used as an example to describe information included in the first indication information. When there are a plurality of receive antennas, the information included in the first indication information may be doubled accordingly. For example, in the first indication information, information used to indicate a weighting coefficient is doubled, or information used to indicate a delay vector and a weighting coefficient is doubled.

Optionally, at least two of the plurality of receive antennas correspond to different delay vectors.

In other words, the terminal device may determine and indicate a delay vector based on a precoded reference signal received on each receive antenna. Therefore, when indicating, by using the first indication information, the delay vectors corresponding to the R receive antennas, the terminal device may indicate the delay vector based on each receive antenna. A specific indication manner may be, for example, the bitmap or the index enumerated above.

For example, if a bitmap is used to indicate a delay vector corresponding to each receive antenna, the first indication information may include one bitmap, where the bitmap is used to sequentially indicate one or more delay vectors fed back based on each of the R receive antennas and each of the K angle vectors; or the first indication information may include R bitmaps, where each bitmap is used to indicate one or more delay vectors shared by K angle vectors on one receive antenna; or the first indication information may include R×K bitmaps, where each bitmap is used to indicate one or more delay vectors fed back for each receive antenna and each angle vector.

Optionally, in the plurality of receive antennas, one or more delay vectors corresponding to a first receive antenna are the same as one or more delay vectors corresponding to a second receive antenna.

In other words, the plurality of receive antennas may also share one or more same delay vectors, for example, L delay vectors. For example, the L delay vectors may be determined based on a downlink channel estimation value obtained through estimation based on a precoded reference signal received on one receive antenna, or may be determined based on downlink channel estimation values obtained through estimation based on precoded reference signals received on a plurality of receive antennas. This is not limited in this application. A specific method in which the terminal device determines L shared delay vectors based on precoded reference signals received on a plurality of receive antennas is similar to the foregoing specific method in which the terminal device determines L shared delay vectors based on precoded reference signals corresponding to a plurality of ports. For brevity, details are not described herein again.

Therefore, when indicating, by using the first indication information, the delay vectors corresponding to the R receive antennas, the terminal device may indicate only the L delay vectors. In other words, in the foregoing R groups of indication information fed back based on a receive antenna, the information used to indicate a delay vector may be generated and indicated only once. To be specific, the R groups of information used to indicate a delay vector may be combined into one group. In other words, when the first indication information is used to indicate a delay vector, the first indication information may include only one group of indication information used to indicate a delay vector. For example, only one bitmap is used to indicate a delay vector shared by the R receive antennas, or only one index (for example, an index of a delay vector combination or an index of an angle-delay pair combination) or one group of indexes (for example, including an index of each delay vector) is used to indicate a delay vector shared by the R receive antennas.

When indicating, by using the first indication information, the weighting coefficients corresponding to the R receive antennas, the terminal device may determine and indicate one group of weighting coefficients based on the precoded reference signal received on each receive antenna. Each group of weighting coefficients may include the P weighting coefficients corresponding to the P angle-delay pairs. To be specific, when the first indication information is used to indicate a weighting coefficient, the first indication information may include indication information used to indicate R×P weighting coefficients.

Optionally, when the first indication information is used to indicate the R×P weighting coefficients corresponding to the R receive antennas, the P weighting coefficients corresponding to each receive antenna may be indicated through normalization by using each receive antenna as a unit.

A specific implementation in which the terminal device performs normalization within a quantization range of one receive antenna to indicate P weighting coefficients has been described in detail above. For brevity, details are not described herein again.

Optionally, when the first indication information is used to indicate the R×P weighting coefficients corresponding to the R receive antennas, the R×P weighting coefficients may be indicated through normalization by using a plurality of receive antennas as a unit.

To be specific, a largest weighting coefficient may be determined from the R×P weighting coefficients corresponding to the plurality of receive antennas to indicate a position of the largest weighting coefficient. The terminal device may further determine relative values of the remaining R×P−1 weighting coefficients relative to the largest weighting coefficient, to indicate the R×P−1 weighting coefficients by using quantized value indexes of the relative values.

It should be understood that a specific method in which the terminal device performs normalization within a range of quantization information of a plurality of receive antennas is the same as a specific method for performing normalization within a range of quantization information of one receive antenna. For brevity, details are not described herein again.

It should be further understood that the terminal device may indicate, in a pre-agreed order through normalization, the weighting coefficients corresponding to the plurality of receive antennas. For example, the terminal device may indicate the weighting coefficients other than the normalized coefficient in the predefined order of indicating the R receive antennas. The order in which the terminal device indicates weighting coefficients is not limited in this application, provided that the network device can restore, based on the first indication information, the R P weighting coefficients corresponding to the R receive antennas.

Optionally, in the plurality of receive antennas, a quantity of weighting coefficients corresponding to the first receive antenna is the same as a quantity of weighting coefficients corresponding to the second receive antenna.

In other words, in the plurality of receive antennas, a quantity of angle-delay pairs corresponding to the first receive antenna is the same as a quantity of angle-delay pairs corresponding to the second receive antenna. For each receive antenna, a quantity of weighting coefficients may be the same as a quantity of angle-delay pairs. Therefore, the quantities of weighting coefficients corresponding to the receive antennas are the same in pairs, in other words, the quantities of angle-delay pairs corresponding to the receive antennas are the same in pairs. For example, the quantity of weighting coefficients or the quantity of angle-delay pairs corresponding to each receive antenna may be P enumerated above.

Optionally, in the plurality of receive antennas, a quantity of weighting coefficients corresponding to the first receive antenna is different from a quantity of weighting coefficients corresponding to the second receive antenna.

In other words, in the plurality of receive antennas, a quantity of angle-delay pairs corresponding to the first receive antenna is different from a quantity of angle-delay pairs corresponding to the second receive antenna. For each receive antenna, a quantity of weighting coefficients may be the same as a quantity of angle-delay pairs. Therefore, the quantities of weighting coefficients corresponding to the receive antennas are different from each other, in other words, the quantities of angle-delay pairs corresponding to the receive antennas are different from each other. For example, for the $r^{th}$ receive antenna, a quantity of weighting coefficients or a quantity of angle-delay pairs may be $P_r$, where $P_r \geq 1$, and $P_r$ is an integer.

It can be understood that regardless of whether the quantity of weighting coefficients is P or $P_r$, the terminal device may determine and indicate the weighting coefficients according to the foregoing method. In other words, $P_r$ may be understood as an example of P.

It should be understood that, when indicating, by using the first indication information, the delay vectors and the weighting coefficients corresponding to the plurality of receive antennas, the terminal device may indicate, in a predefined order of indicating the plurality of receive antennas, K groups of delay vectors and K groups of weighting coefficients corresponding to each receive antenna; or in a predefined order of the plurality of receive antennas, may first indicate the delay vectors corresponding to the plurality of receive antennas and then indicate the weighting coefficients corresponding to the plurality of receive antennas, or may first indicate the weighting coefficients corresponding to the plurality of receive antennas and then indicate the delay vectors corresponding to the plurality of receive antennas, provided that the network device can restore, based on the first indication information, the delay vectors and the weighting coefficients corresponding to the plurality of receive antennas.

If a quantity of receive antennas is 1 and a quantity of polarization directions is J, where J>1, and J is an integer, the first indication information may be used to indicate J groups of delay vectors and J groups of weighting coefficients corresponding to the J polarization directions. Each group of delay vectors may include one or more delay vectors determined based on the K angle vectors, for example, P delay vectors (in other words, delay vectors corresponding to the angle vectors are different from each other), or L delay vectors (in other words, the K angle vectors share L same delay vectors). Each group of weighting coefficients may include P weighting coefficients.

Herein, the J groups of delay vectors and the J groups of weighting coefficients corresponding to the J polarization directions are J groups of delay vectors and J groups of weighting coefficients that are determined based on a precoded reference signal transmitted on a transmit antenna in each of the J polarization directions.

Optionally, the first indication information includes J groups of indication information fed back based on a polarization direction, and each group of indication information fed back based on a polarization direction may correspond to one polarization direction. Each group of indication information fed back based on a polarization direction is used to indicate one or more delay vectors corresponding to one polarization direction and one or more weighting coefficients corresponding to the one polarization direction.

For a $j^{th}$ (j is any value in 1 to J, and j is an integer) polarization direction in the J polarization directions, the terminal device may generate, based on a delay vector and a weighting coefficient that are obtained through estimation, $j^{th}$ group of indication information fed back based on the polarization direction, where the $j^{th}$ group of indication information fed back based on the polarization direction may be used to indicate a delay vector and a weighting coefficient that are determined based on a precoded reference signal transmitted on a transmit antenna in the $j^{th}$ polarization direction. It can be understood that, because indication information fed back based on a polarization direction corresponds to the polarization direction, the $j^{th}$ group of indication information fed back based on the polarization direction may belong to the first indication information, or the $j^{th}$ group of indication information fed back based on the polarization direction may be at least a part of the first indication information. When there is one polarization direction, indication information fed back based on the polarization direction is the first indication information.

It can be understood that, in the foregoing embodiment shown with reference to FIG. 2, one polarization direction is used as an example to describe information included in the first indication information. When there are a plurality of polarization directions, the information included in the first indication information may be doubled accordingly. For example, in the first indication information, information used to indicate a weighting coefficient is doubled, or information used to indicate a delay vector and a weighting coefficient is doubled.

Optionally, at least two of the plurality of polarization directions correspond to different delay vectors.

In other words, the terminal device may determine and indicate a delay vector based on a precoded reference signal transmitted on a transmit antenna in each polarization direction. Therefore, when indicating, by using the first indication information, the delay vectors corresponding to the J polarization directions, the terminal device may indicate the delay vector based on each polarization direction. A specific indication manner may be, for example, the bitmap or the index enumerated above.

For example, if a bitmap is used to indicate a delay vector corresponding to each polarization direction, the first indication information may include J bitmaps, where each bitmap is used to indicate one or more delay vectors shared by K angle vectors on one receive antenna; or the first indication information may include J×K bitmaps, where each bitmap is used to indicate one or more delay vectors fed back for each polarization direction and each angle vector.

Optionally, in the plurality of polarization directions, a delay vector corresponding to a first polarization direction is the same as a delay vector corresponding to a second polarization direction.

In other words, the plurality of polarization directions may share one or more same delay vectors, for example, L delay vectors. For example, the L delay vectors may be determined based on a downlink channel estimation value obtained through estimation based on a precoded reference signal transmitted on a transmit antenna in one polarization direction, or may be determined based on downlink channel estimation values obtained through estimation based on precoded reference signals transmitted on transmit antennas in a plurality of polarization directions. This is not limited in this application. A specific method in which the terminal device determines L shared delay vectors based on precoded reference signals transmitted on transmit antennas in a plurality of polarization directions is similar to the foregoing specific method in which the terminal device determines L shared delay vectors based on precoded reference signals corresponding to a plurality of ports. For brevity, details are not described herein again.

Therefore, when indicating, by using the first indication information, the delay vectors corresponding to the J polarization directions, the terminal device may indicate only the L delay vectors. In other words, in the first indication information, the information used to indicate a delay vector may be generated and indicated only once. To be specific, the J groups of indication information used to indicate a delay vector may be combined into one group. In other words, when the first indication information is used to indicate a delay vector, the first indication information may include only one group of indication information used to indicate a delay vector. For example, only one bitmap is used to indicate a delay vector shared by the J polarization directions, or only one index (for example, an index of a delay vector combination or an index of an angle-delay pair combination) or one group of indexes (for example, including an index of each delay vector) is used to indicate a delay vector shared by the J polarization directions.

When indicating, by using the first indication information, the weighting coefficients corresponding to the J polarization directions, the terminal device may determine and indicate one group of weighting coefficients based on the precoded reference signal corresponding to each polarization direction and each port. Each group of weighting coefficients may include the P weighting coefficients corresponding to the P angle-delay pairs. To be specific, when the first indication information is used to indicate a weighting coefficient, the first indication information may include indication information used to indicate J×P weighting coefficients.

Optionally, when the first indication information is used to indicate the J×P weighting coefficients corresponding to the J polarization directions, the P weighting coefficients corresponding to each polarization direction may be indicated through normalization by using each polarization direction as a unit.

A specific implementation in which the terminal device performs normalization within a quantization range in one polarization direction to indicate P weighting coefficients is the same as the foregoing specific implementation of performing normalization within a quantization range of one receive antenna. For brevity, detailed descriptions of the specific implementation are omitted herein.

Optionally, when the first indication information is used to indicate the J×P weighting coefficients in the J polarization directions, the J×P weighting coefficients may be indicated through normalization by using the J polarization directions as a unit.

To be specific, a largest weighting coefficient may be determined from the J×P weighting coefficients corresponding to the plurality of polarization directions, to indicate a position of the largest weighting coefficient. The terminal device may further determine relative values of the remaining J×P−1 weighting coefficients relative to the largest weighting coefficient, to indicate the J×P−1 weighting coefficients by using quantized value indexes of the relative values.

It should be understood that a specific method in which the terminal device performs normalization within a range of quantization information of a plurality of polarization directions is the same as a specific method for performing normalization within a range of quantization information in one polarization direction. For brevity, details are not described herein again.

It should be further understood that the terminal device may indicate, in a pre-agreed order through normalization, weighting coefficients corresponding to a plurality of polarization directions. For example, the terminal device may indicate the weighting coefficients other than the normalized coefficient in the predefined order of indicating the J polarization directions. The order in which the terminal device indicates weighting coefficients is not limited in this application, provided that the network device can restore, based on the first indication information, the J×P weighting coefficients corresponding to the J polarization directions.

If a quantity of receive antennas is R and a quantity of polarization directions is J, the first indication information may be used to indicate J×R groups of delay vectors and J×R groups of weighting coefficients corresponding to the J polarization directions and the R receive antennas. Each group of delay vectors may include one or more delay vectors determined based on precoded reference signals that are transmitted on a transmit antenna in one polarization direction and received on one receive antenna and that correspond to K ports, for example, P delay vectors (in other words, delay vectors corresponding to the angle vectors are different from each other), or L delay vectors (in other words, the K angle vectors share L same delay vectors). Each group of weighting coefficients may include P weighting coefficients.

A delay vector corresponding to one polarization direction and one receive antenna may be a delay vector determined based on a precoded reference signal sent on a transmit antenna in one polarization direction and received on one receive antenna.

When a quantity of receive antennas is R and a quantity of polarization directions is J, the indication information used to indicate a delay vector in the first indication information may be J×R groups of indication information corresponding to the J polarization directions and the R receive antennas, where each group of indication information may be used to indicate one or more delay vectors corresponding to one polarization direction and one receive antenna, delay vectors corresponding to at least two polarization directions may be different, and delay vectors corresponding to at least two receive antennas may also be different; or the indication information used to indicate a delay vector in the first indication information may be J groups of indication information corresponding to the J polarization directions, where each group of indication information may be used to indicate one or more delay vectors corresponding to one polarization direction, delay vectors corresponding to at least two polarization directions may be different, and all the receive antennas may share one or more same delay vectors; or the indication information used to indicate a delay vector in the first indication information may be one or more delay vectors corresponding to the R receive antennas, where each group of indication information may be used to indicate one or more delay vectors corresponding to one receive antenna, delay vectors corresponding to at least two receive antennas may be different, and all the polarization directions may share one or more same delay vectors; or the indication information used to indicate a delay vector in the first indication information may be one or more delay vectors corresponding to the R receive antennas and the J polarization directions, where all the polarization directions and all the receive antennas may share one or more same delay vectors.

The foregoing has described in detail a specific manner in which the first indication information is used to indicate a delay vector corresponding to a polarization direction and a delay vector corresponding to a receive antenna. For brevity, details are not described herein again.

Optionally, the first indication information may be used to indicate J×R×P weighting coefficients corresponding to the J polarization directions and the R receive antennas, through normalization by using the J polarization directions and the R receive antennas as a unit, or through normalization by using one polarization direction and the R receive antennas as a unit, or through normalization by using the J polarization directions and one receive antenna as a unit. This is not limited in this application.

It should be understood that a specific method in which the terminal device indicates a plurality of weighting coefficients through normalization has been described in detail above. For brevity, details are not described herein again.

It should be further understood that the terminal device may indicate, in a pre-agreed order through normalization, weighting coefficients corresponding to a plurality of polarization directions and a plurality of receive antennas. For example, the terminal device may indicate the weighting coefficients other than the normalized coefficient in the predefined order of indicating the J polarization directions and the R receive antennas. The order in which the terminal device indicates weighting coefficients is not limited in this application, provided that the network device can restore, based on the first indication information, the J×R×P weighting coefficients corresponding to the J polarization directions and the R receive antennas.

It should be further understood that the foregoing manner of indicating a weighting coefficient through normalization is merely a possible implementation, and shall not constitute any limitation on this application. A specific manner in which the first indication information indicates a weighting coefficient is not limited in this application.

When a weighting coefficient is fed back based on a receive antenna, the terminal device may further indicate a quantity of receive antennas. Optionally, the method 200 further includes: The terminal device sends eighth indication information, where the eighth indication information is used to indicate a quantity of receive antennas. Correspondingly, the network device receives the eighth indication information.

The eighth indication information and the first indication information may be sent through same signaling such as a PMI or CSI, or may be sent through different signaling. This is not limited in this application.

It should be understood that the quantity of receive antennas of the terminal device may alternatively be predefined, for example, defined in a protocol. In this case, the terminal device may not indicate the quantity of receive antennas by using additional signaling.

Actually, the terminal device may feed back a downlink channel measurement result based on each receive antenna, or the terminal device may feed back a downlink channel measurement result based on a transport layer.

There may be one or more transport layers. This is not limited in this application.

When a quantity of transport layers is greater than 1, the transport layers may share one or more same delay vectors. For example, the transport layers and the polarization directions may share L same delay vectors, or delay vectors corresponding to the polarization directions are different from each other. If a quantity of delay vectors corresponding to the J polarization directions is J×L, the transport layers may share the J×L same delay vectors. The terminal device indicates, according to the foregoing method, one or more delay vectors by using the first indication information.

After determining, according to the foregoing method, a weighting coefficient corresponding to each polarization direction and each receive antenna, the terminal device may further process the weighting coefficient, to obtain a weighting coefficient fed back based on each transport layer.

That a quantity of polarization directions is J and a quantity of receive antennas is R is still used as an example. The terminal device may construct a coefficient matrix based on the J×R×P weighting coefficients corresponding to the J polarization directions and the R receive antennas. The coefficient matrix may be a matrix with J×P rows and R columns, and elements in each column may be J×P weighting coefficients corresponding to one receive antenna.

The following shows an example of the coefficient matrix.

$$\begin{bmatrix} \alpha_{1,1} & \alpha_{1,2} & \cdots & \alpha_{1,R} \\ \vdots & \vdots & \cdots & \vdots \\ \alpha_{P,1} & \alpha_{P,2} & \cdots & \alpha_{P,R} \\ \alpha_{P+1,1} & \alpha_{P+1,2} & \cdots & \alpha_{P+1,R} \\ \vdots & \vdots & \cdots & \vdots \\ \alpha_{2P,1} & \alpha_{2P,2} & \cdots & \alpha_{2P,R} \end{bmatrix}.$$

The quantity of polarization directions is: J=2. A first row to a $P^{th}$ row in the coefficient matrix may include weighting coefficients corresponding to one polarization direction, and $\alpha_{p,r}$ may represent a weighting coefficient corresponding to a $p^{th}$ angle-delay pair and an $r^{th}$ receive antenna in a first polarization direction. A $(P+1)^{th}$ row to a $2P^{th}$ row in the coefficient matrix may include weighting coefficients corresponding to another polarization direction, and $\alpha_{P+p,r}$ may represent a weighting coefficient corresponding to a $p^{th}$ angle-delay pair and an $r^{th}$ receive antenna in a second polarization direction. Herein, p=1, 2, . . . , or P; and r=1, 2, . . . , or R.

The terminal device may perform singular value decomposition (SVD) on the coefficient matrix to obtain the weighting coefficient fed back based on the transport layer.

Assuming that the quantity of transport layers is Z, the weighting coefficient fed back based on the transport layer may include Z×P weighting coefficients.

The terminal device may indicate the Z×P weighting coefficients through normalization. For example, the terminal device may indicate, through normalization by using one transport layer as a unit, P weighting coefficients corresponding to each transport layer. Alternatively, the terminal device may indicate, through normalization by using the Z transport layers as a unit, the Z×P weighting coefficients corresponding to the Z transport layers.

It should be understood that a specific method in which the terminal device indicates a plurality of weighting coefficients through normalization has been described in detail above. For brevity, details are not described herein again.

It should be further understood that the foregoing manner of indicating a weighting coefficient through normalization is merely a possible implementation, and shall not constitute any limitation on this application. A specific manner in which the first indication information indicates a weighting coefficient is not limited in this application.

When a weighting coefficient is fed back based on a transport layer, the terminal device may further indicate a quantity of transport layers. Optionally, the method 200 further includes: The terminal device sends ninth indication information, where the ninth indication information is used to indicate a quantity of transport layers. Correspondingly, the network device receives the ninth indication information.

Optionally, the ninth indication information is a rank indicator (RI).

It should be understood that the RI is merely an example of the ninth indication information, and shall not constitute any limitation on this application. A specific form of the ninth indication information is not limited in this application.

It should be further understood that the ninth indication information and the first indication information may be sent through same signaling such as CSI, or may be sent through different signaling. This is not limited in this application.

It should be further understood that the foregoing enumerated method for constructing a coefficient matrix and performing SVD on the coefficient matrix to determine a weighting coefficient corresponding to each transport layer is merely an example and shall not constitute any limitation on this application. A specific method for determining a weighting coefficient corresponding to each transport layer is not limited in this application.

Step 230: The terminal device sends the first indication information. Correspondingly, the network device receives the first indication information.

Specifically, the first indication information may be, for example, CSI, or may be some information elements in CSI, or may be other information. This is not limited in this application. The first indication information may be sent by the terminal device to the network device through one or more messages in the conventional technology, or may be sent by the terminal device to the network device through one or more newly designed messages. For example, the terminal device may send the first indication information to the network device by using a physical uplink resource such as a physical uplink shared channel (PUSCH) or a physical uplink control channel (PUCCH) so that the network device determines the precoding matrix based on the first indication information.

A specific method in which the terminal device sends the first indication information to the network device by using the physical uplink resource may be the same as that in the conventional technology. For brevity, detailed descriptions of the specific process are omitted herein.

Step 240: The network device determines the precoding matrix based on the first indication information.

As described above, the terminal device may feed back a delay vector and a weighting coefficient based on a receive antenna, or may feed back a delay vector and a weighting coefficient based on a transport layer. The network device may determine the precoding matrix based on different feedback granularities and the first indication information.

If the terminal device feeds back a delay vector and a weighting coefficient based on a receive antenna, the first indication information may indicate a delay vector corresponding to one or more receive antennas, and the first indication information may indicate a weighting coefficient corresponding to the one or more receive antennas. The network device may determine an angle-delay pair on each receive antenna based on the delay vector and the weighting coefficient corresponding to each receive antenna and the K angle vectors that are pre-determined by the network device through uplink channel measurement, reconstruct a downlink channel corresponding to each RB, and further determine a precoding matrix corresponding to each RB.

Herein, a downlink channel corresponding to an RB may be a downlink channel determined based on a precoded reference signal received on the RB, and may be used to determine a precoding matrix corresponding to the RB. A precoding matrix corresponding to an RB may be a precoding matrix determined based on a channel matrix corresponding to the RB, or a precoding matrix determined based on a precoded reference signal received on the RB, and may be used to precode data transmitted through the RB.

Specifically, because the P weighting coefficients corresponding to each receive antenna may be in a one-to-one correspondence with the P angle-delay pairs, the network device may determine, based on the P weighting coefficients, the one or more delay vectors, and the K angle vectors corresponding to each receive antenna, the P angle-delay pairs and the weighting coefficients corresponding to the angle-delay pairs to construct a space-frequency matrix corresponding to each receive antenna.

In this embodiment, a space-frequency matrix corresponding to the $r^{th}$ receive antenna may be determined based on P angle-delay pairs corresponding to the $r^{th}$ receive antenna and P weighting coefficients corresponding to the $r^{th}$ receive antenna. The P angle-delay pairs may be used to construct P space-frequency component matrices. As described above, a space-frequency component matrix $a(\theta_k) \times b(\tau_{l_k})^H$ may be constructed by using the $k^{th}$ angle vector $a(\theta_k)$ in the K angle vectors and the $l_k^{th}$ delay vector $b(\tau_{l_k})$ in the $L_k$ delay vectors corresponding to the $k^{th}$ angle vector. The space-frequency matrix $H_{DL}^{(r)}$ corresponding to the $r^{th}$ receive antenna may be a weighted sum of the P space-frequency component matrices, to be specific, $$H_{DL}^{(r)} = \sum_{l_k=1}^{L_k} \sum_{k=1}^{K} \alpha_{k,l_k}^{(r)} a(\theta_k) \times b(\tau_{l_k})^H.$$

Herein, $\alpha_{k,l_k}^{(r)}$ represents a weighting coefficient that is fed back based on the $r^{th}$ receive antenna and that corresponds to the angle-delay pair formed by the $k^{th}$ angle vector and the $l_k^{th}$ delay vector corresponding to the $k^{th}$ angle vector. A dimension of the space-frequency matrix may be T×N.

It should be noted that, for ease of understanding, the foregoing uses one polarization direction of a transmit antenna as an example to describe a specific process of determining a space-frequency matrix corresponding to a receive antenna. However, this shall not constitute any limitation on this application. When the quantity of polarization directions of the transmit antenna is greater than 1, the network device may still determine, according to the foregoing method, the space-frequency matrix corresponding to each receive antenna.

For example, if the quantity of polarization directions is 2, the space-frequency matrix corresponding to the $r^{th}$ receive antenna may be determined by using the following calculation formula:

$$H_{DL}^{(r)} = \begin{bmatrix} \sum_{l_k=1}^{L_k} \sum_{k=1}^{K} \alpha_{k,l_k,1}^{(r)} a(\theta_k) \times b(\tau_{l_k})^H \\ \sum_{l_k=1}^{L_k} \sum_{k=1}^{K} \alpha_{k,l_k,2}^{(r)} a(\theta_k) \times b(\tau_{l_k})^H \end{bmatrix}.$$

Herein, a $\alpha_{k,l_k,1}^{(r)}$ represents a weighting coefficient that is fed back based on the $r^{th}$ receive antenna and that corresponds to an angle-delay pair formed by a $k^{th}$ angle vector and an $l_k^{th}$ delay vector corresponding to the $k^{th}$ angle vector in the first polarization direction; and $\alpha_{k,l_k,2}^{(r)}$ represents a weighting coefficient that is fed back based on the $r^{th}$ receive antenna and that corresponds to an angle-delay pair formed by a $k^{th}$ angle vector and an $l_k^{th}$ delay vector corresponding to the $k^{th}$ angle vector in the second polarization direction.

It can be understood that, when any two of the K angle vectors correspond to L same delay vectors, k in subscripts $l_k$ and $L_k$ in the foregoing calculation formula may be omitted, to be specific, $$H_{DL}^{(r)} = \sum_{l=1}^{L} \sum_{k=1}^{K} \alpha_{k,l}^{(r)} a(\theta_k) \times b(\tau_l)^H,$$

$$\text{and } H_{DL}^{(r)} = \begin{bmatrix} \sum_{l=1}^{L} \sum_{k=1}^{K} \alpha_{k,l,1}^{(r)} a(\theta_k) \times b(\tau_l)^H \\ \sum_{l=1}^{L} \sum_{k=1}^{K} \alpha_{k,l,2}^{(r)} a(\theta_k) \times b(\tau_l)^H \end{bmatrix}.$$

It should be understood that the foregoing calculation formula of the space-frequency matrix $H_{DL}^{(r)}$ that is defined for the two polarization directions is merely an example, and shall not constitute any limitation on this application. For example, quantities of delay vectors and/or quantities of angle vectors loaded in different polarization directions may be the same or may be different, and delay vectors and/or angle vectors loaded in different polarization directions may be the same or may be different.

For the R receive antennas, the network device may determine space-frequency matrices $H_{DL}^{(1)}$ to $H_{DL}^{(R)}$ based on the P weighting coefficients corresponding to each receive antenna. Therefore, the network device may determine a downlink channel matrix corresponding to each RB.

For example, for an $n^{th}$ RB in the N RBs, the network device may determine a transpose $(V^{(n)})^T$ of a downlink channel matrix corresponding to the $n^{th}$ RB. The matrix $(V^{(n)})^T$ may be determined by using an $n^{th}$ column vector in each of the R space-frequency matrices $H_{DL}^{(1)}$ to $H_{DL}^{(R)}$ that are respectively determined based on the R receive antennas. For example, an $n^{th}$ column in $H_{DL}^{(1)}$ is used as a first column in the matrix $(V^{(n)})^T$, an $n^{th}$ column in $H_{DL}^{(2)}$ is used as a second column in the matrix $(V^{(n)})^T$, and by analogy, an $n^{th}$ column in $H_{DL}^{(r)}$ may be used as an $r^{th}$ column in the matrix $(V^{(n)})^T$. Therefore, the matrix $(V^{(n)})^T$ may be obtained so that the downlink channel matrix $V^{(n)}$ corresponding to the $n^{th}$ RB can be further determined.

The downlink channel matrix corresponding to each RB may be determined according to the foregoing method.

The network device may further determine the precoding matrix based on the downlink channel matrix. For example, the network device may determine the precoding matrix by performing SVD on the downlink channel matrix or a covariance matrix of the channel matrix, or by performing eigenvalue decomposition (EVD) on the covariance matrix of the downlink channel matrix.

It should be understood that, for a specific manner in which the network device determines a precoding matrix based on a channel matrix, refer to the conventional technology. The manner of determining a precoding matrix is not limited in this application.

It should be further understood that the specific process in which the network device determines a downlink channel matrix based on a space-frequency matrix to determine a precoding matrix is shown above only for ease of understanding. However, this shall not constitute any limitation on this application. The network device may alternatively directly determine the precoding matrix based on the space-frequency matrix. For example, the network device may determine a matrix $V^{(n)}$ based on a space-frequency matrix, perform SVD on $V^{(n)}$, and then determine a precoding matrix by taking a right eigenvector. For another example, the network device may directly perform SVD on $(V^{(n)})^T$, and then determine a precoding matrix based on a conjugate obtained by taking a left eigenvector.

If the terminal device feeds back a delay vector and a weighting coefficient based on a transport layer, the first indication information may indicate at least one delay vector shared by a plurality of transport layers, and the first indication information may indicate a weighting coefficient corresponding to the one or more transport layers. The network device may determine P angle-delay pairs based on the at least one delay vector and the K angle vectors determined through uplink channel measurement. The network device may determine, based on the weighting coefficients corresponding to each transport layer and the P angle-delay pairs, a space-frequency matrix corresponding to each transport layer, and further determine a precoding matrix corresponding to each RB.

Specifically, because the P weighting coefficients corresponding to each transport layer may be in a one-to-one correspondence with the P angle-delay pairs, the network device may construct, based on the P weighting coefficients corresponding to each transport layer, and an angle vector and a delay vector that are included in each of the P angle-delay pairs, the space-frequency matrix corresponding to the transport layer.

In this embodiment, a space-frequency matrix $H_{DL}^{(z)}$ corresponding to a $z^{th}$ transport layer may be determined based on P angle-delay pairs and P weighting coefficients corresponding to the $z^{th}$ transport layer. The P angle-delay pairs may be used to construct P space-frequency component matrices. As described above, a space-frequency matrix $a(\theta_k) \times b(\tau_i)^H$ may be constructed by using the $k^{th}$ angle vector $a(\theta_k)$ in the K angle vectors and the $l_k^{th}$ delay vector $b(\tau_{l_k})$ in the $L_k$ delay vectors corresponding to the $k^{th}$ angle vector. The space-frequency matrix corresponding to the $z^{th}$ transport layer may be a weighted sum of the P space-frequency component matrices, to be specific, $$H_{DL}^{(z)} = \sum_{l_k=1}^{L_k} \sum_{k=1}^{K} \alpha_{k,l_k}^{(z)} a(\theta_k) \times b(\tau_{l_k})^H.$$

Herein, $\alpha_{k,l_k}^{(z)}$ represents a weighting coefficient that is fed back based on the $z^{th}$ transport layer and that corresponds to the angle-delay pair formed by the $k^{th}$ angle vector and the $l_k^{th}$ delay vector corresponding to the $k^{th}$ angle vector. A dimension of the space-frequency matrix may be T×N.

It should be noted that, for ease of understanding, the foregoing uses one polarization direction of a transmit antenna as an example to describe a specific process of determining a space-frequency matrix corresponding to a receive antenna. However, this shall not constitute any limitation on this application. When a quantity of polarization directions of the transmit antenna is greater than 1, the network device may still determine, according to the foregoing method, the space-frequency matrix corresponding to each receive antenna.

For example, if the quantity of polarization directions is 2, the space-frequency matrix corresponding to the $r^{th}$ receive antenna may be determined by using the following calculation formula:

$$H_{DL}^{(z)} = \begin{bmatrix} \sum_{l_k=1}^{L_k} \sum_{k=1}^{K} \alpha_{k,l_k,1}^{(z)} a(\theta_k) \times b(\tau_{l_k})^H \\ \sum_{l_k=1}^{L_k} \sum_{k=1}^{K} \alpha_{k,l_k,2}^{(z)} a(\theta_k) \times b(\tau_k)^H \end{bmatrix}.$$

Herein, $\alpha_{k,l_k,1}^{(z)}$ represents a weighting coefficient that is fed back based on the $z^{th}$ transport layer and that corresponds to an angle-delay pair formed by a $k^{th}$ angle vector and an $l_k^{th}$ delay vector corresponding to the $k^{th}$ angle vector in the first polarization direction; and $\alpha_{k,l_k,2}^{(z)}$ represents a weighting coefficient that is fed back based on the $z^{th}$ transport layer and that corresponds to an angle-delay pair formed by a $k^{th}$ angle vector and an $l_k^{th}$ delay vector corresponding to the $k^{th}$ angle vector in the second polarization direction.

It can be understood that, when any two of the K angle vectors correspond to L same delay vectors, k in subscripts $l_k$ and $L_k$ in the foregoing calculation formula may be omitted, to be specific, $$H_{DL}^{(z)} = \sum_{l=1}^{L} \sum_{k=1}^{K} \alpha_{k,l}^{(z)} a(\theta_k) \times b(\tau_l)^H \text{ and } H_{DL}^{(r)} = \begin{bmatrix} \sum_{l=1}^{L} \sum_{k=1}^{K} \alpha_{k,l,1}^{(r)} a(\theta_k) \times b(\tau_l)^H \\ \sum_{l=1}^{L} \sum_{k=1}^{K} \alpha_{k,l,2}^{(r)} a(\theta_k) \times b(\tau_l)^H \end{bmatrix}.$$

It should be understood that the foregoing calculation formula of the space-frequency matrix $H_{DL}^{(z)}$ that is defined for the two polarization directions is merely an example and shall not constitute any limitation on this application. For example, quantities of delay vectors and/or quantities of angle vectors loaded in different polarization directions may be the same or may be different, and delay vectors and/or angle vectors loaded in different polarization directions may be the same or may be different.

For the Z transport layers, the network device may determine, based on the P weighting coefficients corresponding to each transport layer, space-frequency matrices $H_{DL}^{(1)}$ to $H_{DL}^{(Z)}$ corresponding to the transport layers. Therefore, the network device may determine the precoding matrix $W^{(n)}$ corresponding to each RB.

For example, for the $n^{th}$ RB in the N RBs, the network device may first determine a conjugate $(W^{(n)})^*$ of a precoding matrix $W^{(n)}$ corresponding to the $n^{th}$ RB. The conjugate of the precoding matrix corresponding to the $n^{th}$ RB may be constructed by an $n^{th}$ column vector in each of the Z space-frequency matrices $H_{DL}^{(1)}$ to $H_{DL}^{(Z)}$ that are respectively determined based on the Z transport layers. For example, an $n^{th}$ column in $H_{DL}^{(1)}$ is used as a first column in the downlink channel matrix $(W^{(n)})^*$, an $n^{th}$ column in $H_{DL}^{(2)}$ is used as a second column in the downlink channel matrix $(W^{(n)})^*$, and by analogy, an $n^{th}$ column in $H_{DL}^{(r)}$ is used as a $z^{th}$ column in the downlink channel matrix $(W^{(n)})^*$. Therefore, the matrix $(W^{(n)})^*$ may be obtained so that the precoding matrix $W^{(n)}$ corresponding to the $n^{th}$ RB can be further determined.

The precoding matrix corresponding to each RB may be determined according to the foregoing method.

It should be understood that, only for ease of understanding, the foregoing uses a space-frequency component matrix as an example to describe in detail the specific process in which the network device determines a precoding matrix. However, this shall not constitute any limitation on this application. Alternatively, the network device may determine P space-frequency component vectors based on the P angle-delay pairs to further determine the precoding matrix. A person skilled in the art may construct P space-frequency basic units in different forms based on the P angle-delay pairs, to further determine the precoding matrix. A manner of constructing the P space-frequency basic units in different forms based on the P angle-delay pairs to determine the precoding matrix based on a weighted sum of the P space-frequency basic units shall fall within the protection scope claimed in this application.

It should be further understood that the foregoing description is merely an example, and shows a possible implementation in which the network device determines the precoding matrix based on the first indication information. However, this shall not constitute any limitation on this application. A specific implementation in which the network device determines the precoding matrix based on the first indication information is not limited in this application. Based on a same concept, a person skilled in the art performs transform or equivalent replacement on the foregoing enumerated matrix operation, and a method for determining a precoding matrix shall fall within the protection scope of this application.

It should be further understood that the precoding matrix determined above is a precoding matrix corresponding to an RB. Herein, the RB is an example of a frequency domain unit. A precoding matrix corresponding to an RB may be a precoding matrix determined at a granularity of an RB based on a channel matrix corresponding to the RB, or a precoding matrix determined based on a precoded reference signal received on the RB, and may be used to precode data transmitted through the RB. A downlink channel corresponding to an RB may be a downlink channel determined based on a precoded reference signal received on the RB, and may be used to determine a precoding matrix corresponding to the RB.

When a granularity of a frequency domain unit is relatively large, for example, when the frequency domain unit is a subband, a PRG, or a PRB, the network device may determine a precoding matrix for the frequency domain unit based on a precoding matrix corresponding to each RB in each frequency domain unit.

If each frequency domain unit includes one RB used to carry a reference signal, the network device may use a precoding matrix corresponding to the RB as a precoding matrix corresponding to the frequency domain unit to which the RB belongs. If each frequency domain unit includes a plurality of RBs used to carry a reference signal, the network device may, for example, perform SVD after averaging correlation matrices of precoding matrices corresponding to a plurality of RBs in a same frequency domain unit to determine a precoding matrix corresponding to the frequency domain unit, or the network device may, for another example, use an average of precoding matrices corresponding to a plurality of RBs in a same frequency domain unit as a precoding matrix corresponding to the frequency domain unit.

It should be understood that, for a specific method in which the network device determines, based on precoding matrices corresponding to a plurality of RBs in a frequency domain unit, a precoding matrix corresponding to the frequency domain unit, refer to the technology, and the method is not limited to the foregoing enumerated method. A specific method in which the network device determines, based on precoding matrices corresponding to a plurality of RBs in a frequency domain unit, a precoding matrix corresponding to the frequency domain unit is not limited in this application.

It should be further understood that a weighting coefficient that is mentioned above and that corresponds to an angle vector and a delay vector is a weighting coefficient corresponding to an angle-delay pair formed by the angle vector and the delay vector. For example, a weighting coefficient corresponding to the $k^{th}$ angle vector and the $l^{th}$ delay vector is a weighting coefficient corresponding to an angle-delay pair formed by the $k^{th}$ angle vector and the $l^{th}$ delay vector. For brevity, examples are not described one by one herein.

In this embodiment of this application, the network device precodes a downlink reference signal based on an angle determined through uplink channel measurement so that the terminal device performs downlink channel measurement based on a precoded reference signal. Because the network device precodes a reference signal based on a reciprocal angle between the uplink and downlink channels, the terminal device may not need to feed back a space domain vector (for example, the foregoing angle vector), but only needs to feed back a frequency domain vector (for example, the foregoing delay vector) and a weighting coefficient corresponding to each angle-delay pair. This can greatly reduce feedback overheads of the terminal device. In addition, based on reciprocity between the uplink and downlink channels, a downlink channel measurement process performed by the terminal device is simplified, and calculation complexity of the terminal device in the channel measurement process is reduced. Moreover, performing space domain precoding on a downlink reference signal can reduce a quantity of reference signal ports, thereby reducing pilot overheads.

It should be understood that a specific process of performing downlink channel measurement and determining a precoding matrix when a space-frequency matrix is obtained based on a transpose of a real channel is shown in this embodiment of this application only for ease of understanding. However, this shall not constitute any limitation on this application. A relationship between the real channel and the space-frequency matrix $H_{DL}$ is not fixed. Different definitions of the space-frequency matrix and the space-frequency component matrix may change the relationship between the real channel and the space-frequency matrix $H_{DL}$. For example, the space-frequency matrix $H_{DL}$ may be obtained based on the transpose of the real channel, or may be obtained based on a conjugate transpose of the real channel.

When the relationship between the space-frequency matrix and the channel matrix is defined differently, operations performed by the network device during delay and angle loading are also different, and operations performed by the terminal device during channel measurement and feedback also correspondingly change. However, these operations are only implementation behavior of the terminal device and the network device, and shall not constitute any limitation on this application. The definition of the channel matrix, the dimension and the definition of the space-frequency matrix, and a transform relationship between the channel matrix and the space-frequency matrix are not limited in this application. Likewise, a transform relationship between the space-frequency matrix and the precoding matrix is not limited in this application either.

In the foregoing method embodiment, the channel measurement method provided in this application is described in detail by using an example of precoding a reference signal based on an angle vector. However, this shall not constitute any limitation on this application. Alternatively, the network device may precode a reference signal based on only a delay vector so that the terminal device performs downlink channel measurement based on a precoded reference signal.

For ease of understanding the embodiments of this application, in the following embodiments, one polarization direction of the transmit antenna is first used as an example to describe in detail a channel measurement method 500 provided in an embodiment of this application. It should be understood that the polarization direction may be any one of one or more polarization directions of the transmit antenna. In other words, channel measurement may be performed in any one of the one or more polarization directions according to the method 400 provided in the embodiment of this application. It should be further understood that a quantity of polarization directions of the transmit antenna is not limited in this application. For example, there may be one polarization direction, that is, a single polarization direction; or there may be a plurality of polarization directions, for example, dual polarization directions.

FIG. 5 is a schematic flowchart of the channel measurement method 500 from the perspective of device interaction according to the embodiment of this application. As shown in the figure, the method 500 may include step 510 to step 540. The following describes the steps in the method 500 in detail.

Step 510: A terminal device receives precoded reference signals, where the precoded reference signals are obtained by precoding reference signals based on L delay vectors. Correspondingly, a network device sends the precoded reference signals, where L≥1, and L is an integer.

In this embodiment, the network device may precode the reference signals based on the L delay vectors. Because no space domain precoding is performed on the reference signals, precoded reference signals obtained through precoding based on one delay vector may correspond to at least some of T transmit antenna ports, where T is a quantity of transmit antenna ports in one polarization direction, T≥1, and T is an integer.

In a possible implementation, the network device may traverse the L delay vectors; precode, based on each of the L delay vectors, reference signals carried on each RB; and send precoded reference signals through the T transmit antenna ports. T×L different combinations, in other words, T×L antenna delay pairs, may be obtained by traversing the L delay vectors and the T transmit antenna ports. Because no space domain precoding is involved, each combination may correspond to one delay vector. In other words, a total of T×L different combinations of delay vectors and transmit antenna ports may be obtained by loading the L delay vectors to reference signals on different transmit antenna ports.

In another possible implementation, the network device may precode, based on the L delay vectors, reference signals carried on each RB in a measurement bandwidth; and send precoded reference signals through the T transmit antenna ports. Precoded reference signals obtained through precoding based on different delay vectors may be mapped to different RBs. To be specific, delay vectors corresponding to precoded reference signals carried on at least two RBs are different. In other words, a total of T×L' different combinations of delay vectors and transmit antenna ports may be obtained by loading the L delay vectors to reference signals on different transmit antenna ports, where 1≤L'<L, and L' is an integer.

Because of delay reciprocity between uplink and downlink channels, the L delay vectors all may be determined through uplink channel measurement. A specific method in which the network device determines L relatively strong delays through uplink channel measurement has been described in detail in the foregoing method 200. For brevity, details are not described herein again.

Because there is delay reciprocity between uplink and downlink channels in an FDD mode, the L delay vectors obtained through uplink channel measurement may be loaded to downlink reference signals so that the terminal device performs downlink channel measurement based on received precoded reference signals.

The network device may precode the downlink reference signals such as CSI-RSs based on the L delay vectors, to obtain the precoded reference signals. The network device may further transmit the precoded reference signals by using a preconfigured reference signal resource.

Optionally, the method 500 further includes: The terminal device receives fifth indication information, where the fifth indication information is used to configure one or more reference signal resources. Correspondingly, the network device sends the fifth indication information.

The one or more reference signal resources configured by using the fifth indication information may be used to carry precoded reference signals. Precoded reference signals carried on a same reference signal resource may correspond to one or more ports. When the fifth indication information is used to configure a plurality of reference signal resources, delay vectors and/or transmit antenna ports corresponding to precoded reference signals carried on the reference signal resources may be different from each other, and the reference signal resources do not overlap in frequency domain and/or time domain. In this embodiment, a precoded reference signal corresponding to each port corresponds to one transmit antenna port and one delay vector.

Because the fifth indication information has been described in detail above, for brevity, details are not described herein again.

In an implementation, the network device may traverse each of the L delay vectors to precode a reference signal on each transmit antenna port, to obtain a precoded reference signal. A reference signal resource used to transmit the precoded reference signal may be preconfigured by the network device by using higher layer signaling such as the fifth indication information. The reference signal resource may include one or more RBs, for example, N RBs. Precoded reference signals carried on each RB are all obtained through precoding based on L same delay vectors.

In this implementation, the network device may preconfigure one reference signal resource for the terminal device. Precoded reference signals carried on each RB in the reference signal resource may correspond to P (T×L) ports. A precoded reference signal corresponding to each port may be obtained by precoding a reference signal on one of the T transmit antenna ports based on one of the L delay vectors.

In addition, because the L delay vectors are loaded to each RB in the reference signal resource, and each RB corresponds to a relatively large quantity of ports, relatively high pilot overheads may be caused. Therefore, the network device may configure a relatively small pilot density by using the higher layer signaling such as the fifth indication information to reduce the pilot overheads.

A correspondence between a port and a precoded reference signal carried on each RB in a reference signal resource is described in detail above with reference to FIG. 3 when RBs are not grouped. This is similar to a correspondence between a port and a precoded reference signal carried on each RB in this embodiment, and only the angle vector in the foregoing embodiment is replaced with the transmit antenna port. For brevity, details are not described herein with reference to the accompanying drawings.

If the precoded reference signals on each RB are all obtained through precoding by traversing the L delay vectors, relatively high pilot overheads are caused when there are a relatively large quantity of RBs. To reduce the pilot overheads, the RBs may be grouped. A precoded reference signal carried in each frequency domain group may be obtained through precoding based on some of P combinations of angle vectors and delay vectors, for example, a combination of one delay vector and an angle vector corresponding to the delay vector, or a combination of one angle vector and a delay vector corresponding to the angle vector, or a combination of one delay vector and one angle vector. This can greatly reduce the pilot overheads.

In another possible implementation, the network device may precode the reference signals based on the L delay vectors. Precoded reference signals obtained through precoding based on different delay vectors may be mapped to different RBs. Precoded reference signals carried on each RB may be obtained through precoding based on some of the L delay vectors. In the plurality of RBs, precoded reference signals carried on at least two RBs are obtained through precoding based on different delay vectors.

In this implementation, there may be a plurality of reference signal resources used to transmit a precoded reference signal. The network device may preconfigure the plurality of reference signal resources for the terminal device by using higher layer signaling such as the fifth indication information. Each of the plurality of reference signal resources may include one or more RBs. Precoded reference signals carried in each reference signal resource may correspond to one or more ports, and precoded reference signals carried in the reference signal resources correspond to different delay vectors and/or transmit antenna ports. A precoded reference signal corresponding to each port may be obtained by precoding a reference signal on one transmit antenna port based on one of the L delay vectors. In addition, the reference signal resources do not overlap in frequency domain and/or time domain. For example, the reference signal resources are arranged in a staggered manner in frequency domain. Therefore, precoded reference signals obtained through precoding based on different delay vectors may be carried by using different time-frequency resources.

In this implementation, a quantity of ports to which the precoded reference signals carried on each RB may correspond may be less than P. For example, if one delay vector is loaded to each RB, the precoded reference signals carried on each RB may correspond to T ports, and precoded reference signals carried on at least two RBs correspond to different delay vectors. When precoded reference signals carried on two RBs correspond to different delay vectors, port numbers corresponding to the precoded reference signals carried on the two RBs may be the same or may be different. This is not limited in this application.

The network device may group the plurality of RBs, and perform frequency domain precoding based on different frequency domain groups. Specifically, the N RBs may be grouped into a plurality of frequency domain groups, for example, M frequency domain groups, where M>1, and M is an integer. Each frequency domain group may include $\lfloor N/M \rfloor$ RBs. If N cannot be exactly divided by M, a quantity of RBs in the last frequency domain group may be a quantity of remaining RBs, to be specific, a quantity of RBs included in an $M^{th}$ frequency domain group may be less than $\lfloor N/M \rfloor$.

When the RBs are grouped, precoded reference signals carried in each frequency domain group may be obtained through precoding based on some of the L delay vectors.

Optionally, M=L. To be specific, a quantity of frequency domain groups may be equal to a quantity of delay vectors. In this case, each frequency domain group may include $\lfloor N/L \rfloor$ RBs. RBs included in an $l^{th}$ frequency domain group in the L frequency domain groups may be an $1^{th}$ RB, an $(1+L)^{th}$ RB, and an $(1+2L)^{th}$ RB to $(1+(\lfloor N/L \rfloor -1) \times L)^{th}$ RB in the N RBs. In other words, the $l^{th}$ frequency domain group in the L frequency domain groups includes an $(1+(i-1) \times L)^{th}$ RB in the N RBs, where i=1, 2, . . . , $\lfloor N/L \rfloor$.

The $1^{th}$ RB in the N RBs may be a first RB in the $l^{th}$ frequency domain group, the $(1+L)^{th}$ RB in the N RBs may be a second RB in the $l^{th}$ frequency domain group, the $(1+2L)^{th}$ RB in the N RBs may be a third RB in the $l^{th}$ frequency domain group, and the RB in the N RBs may be an $(\lfloor N/L \rfloor)^{th}$ RB in the $l^{th}$ frequency domain group. By analogy, an $(1+(n-1) \times L)^{th}$ RB in the N RBs may be an $n^{th}$ RB in the $l^{th}$ frequency domain group.

The network device may perform, based on an $l^{th}$ delay vector in the L delay vectors, frequency domain precoding on a reference signal carried on each RB in the $l^{th}$ frequency domain group in the L frequency domain groups. Each frequency domain group may correspond to one delay vector, and an RB in each frequency domain group may correspond to one element in the delay vector.

In this case, a quantity of ports corresponding to precoded reference signals carried on each RB may be T. The T ports may specifically correspond to the T transmit antenna ports.

FIG. 6 shows another example in which a plurality of RBs carry precoded reference signals corresponding to a plurality of ports. The figure shows an example in which a quantity of RBs is 16.

In the 16 RBs shown in FIG. 6, a precoded reference signal carried on each RB may be obtained through precoding based on one delay vector. The 16 RBs may be grouped into four frequency domain groups. An RB #1, an RB #5, an RB #9, and an RB #13 may be grouped into a frequency domain group #1; an RB #2, an RB #6, an RB #10, and an RB #14 may be grouped into a frequency domain group #2; an RB #3, an RB #7, an RB #11, and an RB #15 may be grouped into a frequency domain group #3; and an RB #4, an RB #8, an RB #12, and an RB #16 may be grouped into a frequency domain group #4.

The 16 RBs may belong to four reference signal resources. Each frequency domain group may be one reference signal resource. The four frequency domain groups may be used as an example of the plurality of reference signal resources. Precoded reference signals carried in a same frequency domain group may be obtained through precoding based on a same delay vector. For example, if L=4, the L delay vectors may include $b(\tau_1)$, $b(\tau_2)$, $b(\tau_3)$, and $b(\tau_4)$, and precoded reference signals carried on each frequency domain group may be obtained through precoding based on one delay vector, in other words, L'=1. In this case, precoded reference signals carried on the RB #1, the RB #5, the RB #9, and the RB #13 may be obtained through precoding based on a same delay vector, for example, the delay vector $b(\tau_1)$; precoded reference signals carried on the RB #2, the RB #6, the RB #10, and the RB #14 may be obtained through precoding based on a same delay vector, for example, the delay vector $b(\tau_2)$; precoded reference signals carried on the RB #3, the RB #7, the RB #11, and the RB #15 may be obtained through precoding based on a same delay vector, for example, the delay vector $b(\tau_3)$; and precoded reference signals carried on the RB #4, the RB #8, the RB #12, and the RB #16 may be obtained through precoding based on a same delay vector, for example, the delay vector $b(\tau_4)$.

Because precoded reference signals carried in a same frequency domain group are obtained through precoding based on a same delay vector, the precoded reference signals carried in the same frequency domain group may correspond to the same delay vector, or may correspond to a same port group, where each port group includes T transmit antenna ports. Because precoded reference signals carried in different frequency domain groups are obtained through precoding based on different delay vectors, the precoded reference signals carried in the different frequency domain groups may correspond to the different delay vectors, and port numbers corresponding to the precoded reference signals carried in the different frequency domain groups may be the same or may be different. This is not limited in this application. For example, precoded reference signals carried in each of the frequency domain group #1 to the frequency domain group #4 may correspond to a port #1 to a port #T. For another example, the precoded reference signals carried in the frequency domain group #1 may correspond to the port #1 to the port #T; the precoded reference signals carried in the frequency domain group #2 may correspond to a port #T+1 to a port #2T; the precoded reference signals carried in the frequency domain group #3 may correspond to a port #2T+1 to a port #3T; and the precoded reference signals carried in the frequency domain group #4 may correspond to a port #3T+1 to a port #4T.

It should be understood that loading one delay vector to each frequency domain group is merely an example for ease of understanding. A quantity of delay vectors loaded to each frequency domain group is not limited in this application.

For example, the precoded reference signals carried on each RB shown in the figure may correspond to more ports, for example, 2T ports, in other words, L'=2. For example, precoded reference signals corresponding to eight ports may be obtained by precoding reference signals on the T transmit antenna ports based on two delay vectors, where the two delay vectors may be selected from the foregoing four delay vectors.

It should be understood that the value of L and the quantity L' of delay vectors loaded to each frequency domain group enumerated above are merely examples, and shall not constitute any limitation on this application. Values of L and L', and a quantity of delay vectors loaded to each frequency domain group are not limited in this application.

It can be understood that, when the quantity of delay vectors loaded to each frequency domain group is L, it is equivalent to that the RBs are not grouped.

It should be understood that FIG. 6 is merely an example for ease of understanding, and does not show all REs in one RB. A quantity of REs in each RB is not limited in this application. In addition, ports corresponding to precoded reference signals carried on each RB and a specific manner of multiplexing a resource between the reference signals corresponding to the ports are not limited in this application.

Further, a delay vector length is $\lfloor N/M \rfloor$. For each port, $\lfloor N/M \rfloor$ elements in the corresponding delay vector may be in a one-to-one correspondence with $\lfloor N/M \rfloor$ RBs. Therefore, a value of a precoded reference signal corresponding to each port on an $n^{th}$ RB in an $m^{th}$ ($1 \leq m \leq M$, and m is an integer) frequency domain group in M frequency domain groups is determined based on at least an $n^{th}$ element in an $m^{th}$ delay vector in M delay vectors.

Optionally, a delay vector length is $\lfloor N/L \rfloor$. For each port, $\lfloor N/L \rfloor$ elements in the corresponding delay vector may be in a one-to-one correspondence with $\lfloor N/L \rfloor$ RBs. Therefore, a value of a precoded reference signal corresponding to each port on an $n^{th}$ RB in an $l^{th}$ ($1 \leq l \leq L$, and l is an integer) frequency domain group in L frequency domain groups is determined based on at least an $n^{th}$ element in an $l^{th}$ delay vector in L delay vectors.

For example, a precoded reference signal carried on a first RB (namely, the RB #1) in the 16 RBs, that is, a first RB in the frequency domain group #1 is determined based on at least a first element in the delay vector $b(\tau_1)$; a precoded reference signal carried on a fifth RB (namely, the RB #5) in the 16 RBs, that is, a second RB in the frequency domain group #1 is determined based on at least a second element in the delay vector $b(\tau_1)$; a precoded reference signal carried on a ninth RB (namely, the RB #9) in the 16 RBs, that is, a third RB in the frequency domain group #1 is determined based on at least a third element in the delay vector $b(\tau_1)$; and a precoded reference signal carried on a thirteenth RB (namely, the RB #14) in the 16 RBs, that is, a fourth RB in the frequency domain group #1 is determined based on at least a fourth element in the delay vector $b(\tau_1)$.

It should be understood that a correspondence between each RB in another frequency domain group and each element in a delay vector is similar to this correspondence. For brevity, the correspondences are not enumerated one by one herein.

It should be noted that a length of each of the L delay vectors determined by the network device through uplink channel measurement may be N. After the RBs are grouped, a length of a delay vector used to precode a reference signal is $\lfloor N/L \rfloor$. The network device may extract some elements from each delay vector based on the L delay vectors determined through uplink channel measurement, to form L new delay vectors. Herein, for ease of distinguishing and description, the L delay vectors determined through uplink channel measurement are referred to as L original delay vectors.

Specifically, if the N RBs are grouped into the L frequency domain groups, the $l^{th}$ frequency domain group in the L frequency domain groups corresponds to an $l^{th}$ original delay vector in the L original delay vectors, and the first RB to the $(\lfloor N/L \rfloor)^{th}$ RB in the $l^{th}$ frequency domain group respectively correspond to an $l^{th}$ element, an $(l+L)^{th}$ element, an $(l+2L)^{th}$ element, and an $(l+(\lfloor N/L \rfloor-1) \times L)^{th}$ element in the $l^{th}$ original delay vector. By analogy, the $n^{th}$ RB in the $l^{th}$ frequency domain group may correspond to an $(l+(n-1) \times L)^{th}$ element in the $l^{th}$ original delay vector.

It should be understood that the original delay vector is defined above only for distinguishing. In the following embodiments, the original delay vector is not involved. All delay vectors in the following embodiments may be understood as delay vectors used to perform frequency domain precoding on reference signals. A delay vector length may be N, or may be $\lfloor N/M \rfloor$.

It should be further understood that a process of grouping the N RBs and performing frequency domain precoding on the reference signals on the L frequency domain groups based on the L delay vectors is described in detail above with reference to the accompanying drawings only for ease of understanding. However, this shall not constitute any limitation on this application. A manner of grouping the N RBs is not limited in this application. A correspondence between each frequency domain group and a delay vector is not limited in this application either. A correspondence between each RB in each frequency domain group and each element in a delay vector is not limited in this application either.

It should be further understood that the correspondence between a port and a precoded reference signal carried on each RB is enumerated above only for ease of understanding. However, this shall not constitute any limitation on this application. A correspondence among a precoded reference signal carried on each RB, a delay vector, and a port is not limited in this application.

It should be further understood that FIG. 6 is merely an example to describe in detail the specific process of loading a delay vector to a reference signal. However, it should be understood that this shall not constitute any limitation on this application.

It should be further understood that the specific process of precoding reference signals based on a plurality of delay vectors and mapping precoded reference signals to an RB is described with reference to the accompanying drawings only for ease of understanding. However, this shall not constitute any limitation on this application. A quantity of RBs, a quantity of frequency domain groups, a quantity of delay vectors, a quantity of transmit antenna ports, and a quantity of reference signal ports are not limited in this application. A position of an RE corresponding to each port on each RB is not limited in this application either.

It should be further understood that the foregoing definition of the quantity of ports based on each RB is merely a possible implementation and shall not constitute any limitation on this application. This application further provides a method for defining a quantity of ports. To be specific, the quantity of ports may be a quantity of ports corresponding to precoded reference signals carried on each reference signal resource. In other words, the quantity of ports may be defined across RBs.

Such a manner of defining a quantity of ports may be applied to a case in which RBs are grouped.

Optionally, the method 500 further includes. The terminal device receives sixth indication information, where the sixth indication information is used to configure one reference signal resource. Correspondingly, the network device sends the sixth indication information.

The reference signal resource configured by using the sixth indication information may be used to carry precoded reference signals, and the precoded reference signals carried on the reference signal resource may be the reference signals obtained through precoding based on the L delay vectors. In addition, in the reference signal resource, precoded reference signals carried on at least two RBs are obtained through precoding based on different delay vectors. Moreover, when precoded reference signals carried on two RBs correspond to different delay vectors, port numbers corresponding to the precoded reference signals carried on the two RBs may be different. In other words, the precoded reference signals carried on the at least two RBs correspond to different ports. Therefore, in a same reference signal resource, ports corresponding to precoded reference signals carried on RBs are not necessarily the same.

In this embodiment, the reference signal resource may include, for example, the 16 RBs described above with reference to FIG. 5, in other words, may include a plurality of frequency domain groups. Precoded reference signals carried in the reference signal resource may correspond to P ports.

It should be noted that, when the network device groups RBs to precode, by using different delay vectors, reference signals carried on different RBs, the network device may transmit precoded reference signals based on the plurality of reference signal resources configured by using the fifth indication information, or may transmit precoded reference signals based on the one reference signal resource configured by using the sixth indication information. This is not limited in this application.

Step 520: The terminal device generates third indication information, where the third indication information may be used to indicate at least one angle vector and P weighting coefficients.

When the precoded reference signals are sent to the terminal device through a radio channel, the precoded reference signals pass through a downlink channel. Therefore, the terminal device may detect information about a downlink channel that does not have complete reciprocity. The terminal device may determine, based on the received precoded reference signals, an angle vector that can be used to construct a precoding matrix that adapts to the downlink channel, and a weighting coefficient corresponding to the angle vector. The terminal device may generate the third indication information based on the determined angle vector and the determined weighting coefficient.

First, the terminal device may perform downlink channel estimation based on the precoded reference signals.

As described above, the precoded reference signals received by the terminal device are obtained by precoding the reference signals based on the L delay vectors. The terminal device may perform downlink channel estimation based on the precoded reference signal corresponding to each port, in other words, may perform downlink channel estimation based on the precoded reference signals obtained through precoding based on the L delay vectors.

If precoding on a reference signal is not considered, for each receive antenna, a dimension of a downlink channel may be N×T. A dimension of a downlink channel received on one receive antenna and one RB may be 1×T. Because the network device precodes a reference signal based on one or more delay vectors, a dimension of a downlink channel estimation value obtained by the terminal device by performing channel estimation based on a precoded reference signal received on each receive antenna and each RB may be 1×(T×L) or 1×(T×L'), where T×L may indicate that L delay vectors are loaded to a reference signal on each of the T transmit antenna ports, and T×L' may indicate that L' delay vectors are loaded to a reference signal on each of the T transmit antenna ports.

It should be understood that, for a specific method in which the terminal device performs channel matrix estimation based on a precoded reference signal, refer to a channel estimation method in the conventional technology. For brevity, detailed descriptions of the specific method are omitted herein.

Then, the terminal device determines, based on the downlink channel estimation value, the at least one angle vector used to constitute the P angle-delay pairs and the P weighting coefficients corresponding to the P angle-delay pairs. The at least one angle vector and the P weighting coefficients may be fed back to the network device by using the third indication information.

The at least one angle vector and the P weighting coefficients may be determined by the terminal device based on the downlink channel estimation values. Therefore, the at least one angle vector and the P weighting coefficients may be determined based on the precoded reference signals obtained through precoding based on the L delay vectors, in other words, the at least one delay vector and the P weighting coefficients may be determined based on the precoded reference signal obtained through precoding based on each of the K angle vectors.

In an implementation, the terminal device may determine at least one angle vector for each delay vector. The angle vectors determined for the delay vectors may be different from each other. The angle vectors determined for the delay vectors may be partially different. When angle vectors determined for at least two delay vectors are different, the terminal device may determine one or more corresponding angle vectors based on each delay vector.

For example, a quantity of angle vectors determined for the $l^{th}$ delay vector is $K_l$, where $K_l \geq 1$, and $K_l$ is an integer. Because the $K_l$ angle vectors are determined for the $l^{th}$ delay vector, the $K_l$ angle vectors and the $l^{th}$ delay vector may constitute $K_l$ angle-delay pairs. The L delay vectors and the angle vectors corresponding each delay vector may constitute the P angle-delay pairs. In other words, a quantity of angle vectors determined by the terminal device is P, where $$P = \sum_{l=1}^{L} K_l,$$

$1 \leq k \leq K$, and k is an integer.

Optionally, the P angle vectors include the one or more angle vectors determined for each of the L delay vectors. The $K_l$ angle vectors determined based on the $l^{th}$ delay vector may be determined based on a plurality of channel estimation values obtained by performing channel estimation on a plurality of RBs based on the precoded reference signal obtained through precoding based on the $l^{th}$ delay vector.

That angle vectors determined for at least two delay vectors are different may mean that the angle vectors corresponding to the at least two delay vectors are different, but angle vectors corresponding to other delay vectors may be the same or may be different. This is not limited in this application. The angle vectors determined for the delay vectors may be partially or all different.

That angle vectors corresponding to two delay vectors are different may mean that the angle vectors corresponding to the two delay vectors are all different, in other words, are not repeated or have no intersection; or may mean that the angle vectors corresponding to the two delay vectors are partially different, in other words, are partially repeated but are not all the same, or have an intersection but are not all the same. In addition, when the angle vectors corresponding to the two delay vectors are different, quantities of angle vectors corresponding to the two delay vectors may be the same or may be different. This is not limited in this application.

The quantity of angle vectors determined based on each delay vector may be indicated by the network device. Because of angle reciprocity between the uplink and downlink channels, the network device may indicate, to the terminal device based on a quantity of angles determined through uplink channel measurement, a quantity of angles that need to be fed back during downlink channel measurement. Each angle may be represented by using one angle vector. Optionally, before step 520, the method further includes: The terminal device receives fourth indication information, where the fourth indication information is used to indicate a quantity of angle vectors fed back for each delay vector. Correspondingly, the network device sends the fourth indication information.

The quantity of angle vectors determined based on each delay vector may alternatively be determined by the terminal device and reported to the network device. The terminal device may determine, based on the received precoded reference signal, the one or more angle vectors corresponding to each delay vector. When determining the angle vector, the terminal device may determine the quantity of angle vectors corresponding to each delay vector. Optionally, the method further includes: The terminal device sends fourth indication information, where the fourth indication information is used to indicate a quantity of angle vectors fed back for each delay vector. Correspondingly, the network device receives the fourth indication information.

When the terminal device voluntarily determines the quantity of angle vectors corresponding to each delay vector, the terminal device may determine the quantity of angle vectors based on the downlink channel estimation value. A specific process in which the terminal device determines, based on a downlink channel estimation value, an angle vector corresponding to each delay vector is described in detail in step 220. Detailed descriptions of the specific process are omitted herein.

For example, the terminal device may indicate, in the first indication information, the quantity of angle vectors corresponding to each delay vector. In other words, the fourth indication information and the third indication information may be same indication information, or the fourth indication information may be independent of the third indication information. The terminal device may add the fourth indication information, for example, to CSI.

The terminal device determines, through downlink channel measurement, the quantity of angles corresponding to each delay vector so that feedback can be more accurately performed based on a downlink channel state. This is particularly applicable to a scenario in which uplink-downlink angle reciprocity is not very good.

Optionally, the quantity of angle vectors determined based on each delay vector may alternatively be predefined, for example, predefined in a protocol.

The quantity of angle vectors fed back for each delay vector and a manner of obtaining the quantity are not limited in this application.

The following describes in detail a process in which the terminal device determines, based on a received precoded reference signal, a delay vector corresponding to each angle vector and a weighting coefficient corresponding to each angle-delay pair.

As described above, the space-frequency matrix $H_{DL}$ satisfies: $H_{DL} = SC_{DL}F^H$. In this embodiment, a dimension of $H_{DL}$ may be T×N. There may be K angle vectors, and a length of each angle vector may be T. In this case, a dimension of S may be T×K. There may be L delay vectors, and a length of each delay vector may be N. In this case, a dimension of F may be N×L. The following formula may be obtained by transforming the foregoing formula: $(F^T H_{DL}^T)^T = SC_{DL}$. Herein, $H_{DL}^T$ is a space-frequency matrix determined based on a real channel; and $F^T H_{DL}^T$ represents a sum of channel estimation values obtained by the terminal device through measurement by loading delay vectors to downlink channels, and dimension of the result may be L×T.

The terminal device may further determine, based on a received precoded reference signal, an angle vector used to construct a downlink channel and a weighting coefficient corresponding to each angle-delay pair.

In this embodiment, if the network device does not group the RBs, precoded reference signals of each RB may correspond to T×L ports. The T×L ports may be understood as L groups of ports corresponding to L delay vectors. A precoded reference signal corresponding to an $l^{th}$ group of ports in the L groups of ports may be, for example, a precoded reference signal that is obtained by precoding a reference signal based on one delay vector such as the $l^{th}$ delay vector and that is sent through T transmit antenna ports.

For the precoded reference signal corresponding to the $l^{th}$ group of ports, the terminal device may determine, based on downlink channels received on the N RBs, at least one angle vector corresponding to the $l^{th}$ delay vector and a weighting coefficient corresponding to the $l^{th}$ delay vector. The angle vector and the weighting coefficient corresponding to the $l^{th}$ delay vector may be separately determined by summing up N channel estimation values on the N RBs.

For the precoded reference signal corresponding to the $l^{th}$ group of ports, the terminal device may estimate, based on downlink channels received on the N RBs, at least one angle vector corresponding to the $l^{th}$ delay vector and a weighting coefficient corresponding to an angle-delay pair determined based on the $l^{th}$ delay vector and the at least one angle vector.

It is assumed that a downlink channel estimation value obtained by the terminal device by performing channel estimation on one RB based on the precoded reference signal corresponding to the $l^{th}$ group of ports is denoted as $y_n^{(l)}$, and the estimation value $y_n^{(l)}$ may be a vector whose dimension is T×1. In this case, a sum of a plurality of estimation values obtained by the terminal device by performing channel estimation on the N RBs based on the precoded reference signal corresponding to the $l^{th}$ group of ports may be represented as $y^{(l)}$, where $$y^{(l)} = \sum_{n=1}^{N} y_n^{(i)}.$$

Therefore, $y^{(l)}$ may also be the vector whose dimension is T×1.

The terminal device may determine, based on the vector $y^{(l)}$, the at least one angle vector and the weighting coefficient corresponding to the $l^{th}$ delay vector. Assuming that the angle vector is obtained from a DFT matrix, the terminal device may project the vector $y^{(l)}$ onto each angle vector in a predefined angle vector set to obtain a plurality of projection values. The terminal device may determine, based on a modulus of each projection value, that $K_l$ columns that are in the angle vector set and that correspond to $K_l$ projection values with relatively large moduli are the at least one angle vector corresponding to the $l^{th}$ delay vector, in other words, the $K_l$ angle vectors corresponding to the $l^{th}$ delay vector may be combined with the $l^{th}$ delay vector to obtain $K_l$ angle-delay pairs. The terminal device may further determine the $K_l$ projection values with relatively large moduli as weighting coefficients corresponding to the $K_l$ angle-delay pairs.

For example, the $K_l$ weighting coefficients corresponding to the $l^{th}$ delay vector may be obtained by performing the following matrix operation:

$$\begin{bmatrix} c_1^{(l)} \\ c_2^{(l)} \\ \vdots \\ c_T^{(l)} \end{bmatrix} = U_s^H y^{(l)}.$$

$K_l$ elements with relatively large moduli in the vector $$\begin{bmatrix} c_1^{(l)} \\ c_2^{(l)} \\ \vdots \\ c_T^{(l)} \end{bmatrix}$$

are the $K_l$ weighting coefficients corresponding to the $l^{th}$ delay vector.

It should be noted that the $K_l$ weighting coefficients may be the weighting coefficients corresponding to the $K_l$ angle-delay pairs corresponding to the $l^{th}$ delay vector (or the $l^{th}$ group of ports) in the P angle-delay pairs. Each of the $K_l$ angle-delay pairs may be determined based on the $l^{th}$ delay vector and the $K_l$ angle vectors corresponding to the $l^{th}$ delay vector Therefore, the $K_l$ weighting coefficients may be referred to as weighting coefficients corresponding to the $K_l$ angle vectors or weighting coefficients corresponding to the $l^{th}$ delay vector.

If the network device groups the RBs, precoded reference signals of each RB may correspond to T×L' ports. The T×L' ports may be understood as L' groups of ports corresponding to L' delay vectors. The terminal device may determine, in a predefined grouping rule, a time-frequency resource occupied by a precoded reference signal corresponding to each port, and may further receive, on a corresponding time-frequency resource, precoded reference signals corresponding to each group of ports.

After receiving the precoded reference signals corresponding to each group of ports, the terminal device may perform channel estimation according to the foregoing method. A difference is that the precoded reference signals corresponding to each group of ports are not necessarily carried on the N RBs, but may be carried on some of the N RBs, for example, an RB in a frequency domain group. In this case, the P weighting coefficients may be determined based on precoded reference signals carried on each frequency domain group. Therefore, when performing full-band superposition on channel estimation values based on precoded reference signals corresponding to a specific group of ports, the terminal device may sum up channel estimation values obtained by performing estimation on RBs used to carry precoded reference signals corresponding to a same group of ports, to obtain a channel estimation value corresponding to each group of ports.

The terminal device does not perceive a delay vector used by the network device to precode a reference signal, and does not perceive a correspondence between each frequency domain group and a combination of a transmit antenna port and a delay vector. The terminal device only needs to perform channel estimation in the predefined grouping rule based on a precoded reference signal received in each frequency domain group.

The grouping manner shown in FIG. 6 is used as an example. The RB #1, the RB #5, the RB #9, and the RB #13 may be grouped into the frequency domain group #1; the RB #2, the RB #6, the RB #10, and the RB #14 may be grouped into the frequency domain group #2; the RB #3, the RB #7, the RB #11, and the RB #15 may be grouped into the frequency domain group #3; and the RB #4, the RB #8, the RB #12, and the RB #16 may be grouped into the frequency domain group #4.

The terminal device may determine at least one weighting coefficient, for example, $K_1$ weighting coefficients, based on precoded reference signals received on the RB #1, the RB #5, the RB #9, and the RB #13, where the $K_1$ weighting coefficients may be weighting coefficients corresponding to $K_1$ angle-delay pairs formed by the delay vector $b(\tau_1)$ and $K_1$ angle vectors determined for the delay vector $b(\tau_1)$. The terminal device may determine at least one weighting coefficient, for example, $K_2$ weighting coefficients, based on precoded reference signals received on the RB #2, the RB #6, the RB #10, and the RB #14, where the $K_2$ weighting coefficients may be weighting coefficients corresponding to $K_2$ angle-delay pairs formed by the delay vector $b(\tau_2)$ and $K_2$ angle vectors determined for the delay vector $b(\tau_2)$. The terminal device may determine at least one weighting coefficient, for example, $K_3$ weighting coefficients, based on precoded reference signals received on the RB #3, the RB #7, the RB #11, and the RB #15, where the $K_3$ weighting coefficients may be weighting coefficients corresponding to $K_3$ angle-delay pairs formed by the delay vector $b(\tau_3)$ and $K_3$ angle vectors determined for the delay vector $b(\tau_3)$. The terminal device may determine at least one weighting coefficient, for example, $K_4$ weighting coefficients, based on precoded reference signals received on the RB #4, the RB #8, the RB #12, and the RB #16, where the $K_4$ weighting coefficients may be weighting coefficients corresponding to $K_4$ angle-delay pairs formed by the delay vector $b(\tau_4)$ and $K_4$ angle vectors determined for the delay vector $b(\tau_4)$ When the network device groups the RBs, the terminal device needs to learn of a quantity of frequency domain groups in advance. Therefore, the network device may notify the terminal device of the quantity of frequency domain groups in advance by using signaling.

Optionally, the method further includes: The terminal device receives seventh indication information, where the seventh indication information is used to indicate a quantity of frequency domain groups. Correspondingly, the network device sends the seventh indication information.

As described above, the network device may preconfigure a quantity of ports by using higher layer signaling. Therefore, the terminal device may determine, based on existing signaling, a quantity of ports corresponding to precoded reference signals carried on each RB. When the network device groups the RBs, the network device may further indicate the quantity of frequency domain groups by using the seventh indication information. The terminal device may determine RBs in each frequency domain group in a same grouping rule, further estimate a downlink channel of each port and determine a weighting coefficient corresponding to each angle-delay pair.

It should be noted that the terminal device and the network device may pre-agree on an RB grouping rule. The terminal device and the network device may group the RBs in the predefined grouping rule so that RBs included in each frequency domain group that are determined by the terminal device and the network device are the same.

In this embodiment, the quantity of frequency domain groups may be a quantity of delay vectors. Optionally, the seventh indication information is used to indicate a value of L. In addition, because P=T×L, in an RB grouping case, if a quantity of ports corresponding to precoded reference signals carried on each RB is K, the terminal device may calculate L based on P and T. Therefore, the seventh indication information may directly indicate the value of L. or may indirectly indicate the value of L by indicating the value of P. This is not limited in this application. In other words, the seventh indication information may be used to indicate either of L and P.

Therefore, the terminal device may determine, based on the channel estimation value corresponding to each group of ports, the at least one angle vector and the weighting coefficient corresponding to each of the L delay vectors. A specific method in which the terminal device determines, based on a channel estimation value corresponding to each group of ports, an angle vector and a weighting coefficient corresponding to each delay vector has been described in detail above. For brevity, details are not described herein again.

It should be understood that a manner in which the terminal device determines, based on a channel estimation value corresponding to each group of ports, an angle vector and a weighting coefficient corresponding to each delay vector is not limited to the foregoing enumerated manners. A specific manner in which the terminal device determines, based on a channel estimation value corresponding to each group of ports, an angle vector and a weighting coefficient corresponding to each delay vector is not limited in this application. For example, the terminal device may determine, by using a JADE algorithm in the conventional technology or through DFT, the angle vector and the weighting coefficient corresponding to each delay vector. For brevity, examples are not described one by one herein.

It should be further understood that, according to different implementations and algorithms, the terminal device may simultaneously determine, by using a same processing step, an angle vector and a weighting coefficient corresponding to a same delay vector, or may separately determine, by using different processing steps, an angle vector and a weighting coefficient corresponding to a same delay vector. This is not limited in this application.

Based on the $K_l$ angle vectors and the weighting coefficients corresponding to the angle vectors that are determined through channel estimation, the downlink channel estimation value $y^{(l)}$ may be approximately as follows:

$$y^{(l)} \approx \sum_{k_l=1}^{K_l} \alpha_{k_l}^{(l)} a(\theta_{k_l}^{(l)}).$$

Herein, $a(\theta_{k_l}^{(l)})$ represents a $k_l^{th}$ angle vector in the $K_l$ angle vectors corresponding to the $l^{th}$ group of ports (or the $l^{th}$ delay vector), and $\alpha_{k_l}^{(l)}$ represents a weighting coefficient corresponding to the angle vector $a(\theta_{k_l}^{(l)})$.

According to the foregoing method, the terminal device may obtain L groups of angle vectors and L groups of weighting coefficients through estimation based on the received precoded reference signals. Each group of angle vectors may correspond to one group of weighting coefficients. An $l^{th}$ group of angle vectors may include $K_l$ angle vectors, and an $l^{th}$ group of weighting coefficients may include $K_l$ weighting coefficients.

It can be understood that quantities of angle vectors included in the groups of angle vectors may be different from each other, or quantities of angle vectors included in the groups of angle vectors may be the same in pairs. Because the quantities of angle vectors included in the groups of angle vectors may be the same or different, quantities of weighting coefficients included in the groups of weighting coefficients may also be the same or different. This is not limited in this application.

In another implementation, the terminal device may determine at least one angle vector for L delay vectors, for example, K angle vectors, where K≥1, and K is an integer. The K angle vectors may be angle vectors shared by the L delay vectors and are used to constitute P angle-delay pairs, in other words, P=K×L.

Optionally, the third indication information is used to indicate the K angle vectors, and the K angle vectors are fed back based on the L delay vectors. Any two of the L delay vectors correspond to K same angle vectors. In other words, in the L delay vectors, one or more angle vectors fed back for a first delay vector are the same as one or more angle vectors fed back for a second delay vector. The first delay vector and the second delay vector are any two delay vectors in the L delay vectors. In other words, the K angle vectors may be shared by the L delay vectors. When indicating the K angle vectors by using the third indication information, the terminal device may generate only one piece of information used to indicate the K angle vectors.

A value of K may be indicated by the network device in advance by using signaling. Because of delay reciprocity between the uplink and downlink channels, the network device may indicate, to the terminal device based on a quantity of delays determined through uplink channel measurement, a quantity of delays that need to be fed back during downlink channel measurement. Each delay may be represented by using one delay vector. Optionally, before step 520, the method further includes: The terminal device receives fourth indication information, where the fourth indication information is used to indicate a value of K. Correspondingly, the network device sends the fourth indication information.

Alternatively, a value of K may be determined by the terminal device and reported to the network device. The terminal device may determine, based on the received precoded reference signals, the K angle vectors corresponding to the L delay vectors. When determining the angle vector, the terminal device may determine the quantity of angle vectors corresponding to the L delay vectors. Optionally, the method further includes: The terminal device sends fourth indication information, where the fourth indication information is used to indicate a value of K. Correspondingly, the network device receives the fourth indication information.

For example, the terminal device may indicate the quantity of angle vectors in the third indication information. In other words, the fourth indication information and the third indication information may be same indication information, or the fourth indication information may be independent of the third indication information. The terminal device may add the fourth indication information, for example, to CSI.

The terminal device determines, through downlink channel measurement, the quantity of angles corresponding to each delay vector so that feedback can be more accurately performed based on a downlink channel state. This is particularly applicable to a scenario in which uplink-downlink angle reciprocity is not very good.

Optionally, K may alternatively be predefined, for example, predefined in a protocol.

The value of K and a manner of obtaining the value of K are not limited in this application.

The K angle vectors may be determined based on the precoded reference signals obtained through precoding based on the L delay vectors, or may be determined based on a precoded reference signal obtained through precoding based on a specific delay vector. This is not limited in this application.

A specific method in which the terminal device performs downlink channel estimation based on the precoded reference signals obtained through precoding based on the L delay vectors, and determines the K angle vectors based on the downlink channel estimation values may be similar to the foregoing specific method in which the terminal device determines the L delay vectors based on the downlink channel estimation values obtained by performing estimation based on the precoded reference signals obtained through precoding based on the K angle vectors. For brevity, details are not described herein again.

It should be understood that the specific method in which the terminal device determines the K angle vectors and the P weighting coefficients based on the precoded reference signals obtained through precoding based on the L delay vectors is merely an example for ease of understanding, and shall not constitute any limitation on this application. For example, the terminal device may determine the K angle vectors and the P weighting coefficients by using a JADE algorithm in the conventional technology or through DFT. For brevity, examples are not described one by one herein.

It should be further understood that, according to different implementations and algorithms, the terminal device may simultaneously determine the K angle vectors and the P weighting coefficients by using a same processing step, or may separately determine the K angle vectors and the P weighting coefficients by using different processing steps. This is not limited in this application.

According to the foregoing method, the terminal device may obtain one group of angle vectors and L groups of weighting coefficients through estimation based on the received precoded reference signals. The group of angle vectors may include K angle vectors, and each group of weighting coefficients may include K weighting coefficients. It can be understood that, because the K angle vectors in the group of angle vectors may be shared by the L delay vectors, a quantity of weighting coefficients included in each group of weighting coefficients may be K.

In the foregoing plurality of implementations, the terminal device may feed back one or more angle vectors for each delay vector, or may feed back one or more angle vectors for all the L delay vectors. Whether the terminal device performs feedback based on each delay vector or based on all of a plurality of delay vectors may be predefined in a protocol, or may be indicated by the network device in advance by using signaling, for example, may be explicitly indicated by using signaling or may be implicitly indicated by using the fourth indication information. For example, if a quantity of angle vectors fed back for each delay vector is indicated, it indicates that feedback is performed based on each delay vector. If only a quantity of one type of angle vectors is indicated, it indicates that feedback is performed based on all of a plurality of delay vectors. This is not limited in this application.

After determining the at least one angle vector and the P weighting coefficients that are used to constitute the P angle-delay pairs, the terminal device may generate the third indication information to indicate the at least one angle vector and the P weighting coefficients.

A specific method in which the terminal device indicates the at least one angle vector and the P weighting coefficients by using the third indication information is similar to the foregoing specific method for indicating the at least one delay vector and the P weighting coefficients by using the first indication information in the foregoing method 200. For example, the at least one delay vector may be indicated by using a bitmap or an index. For another example, the P weighting coefficients may be indicated through normalization. The specific method for indicating the at least one delay vector and the P weighting coefficients by using the first indication information is described in detail in the foregoing method 200. For brevity, details are not described herein again.

It should be noted that a specific process in which the terminal device generates the third indication information is described in detail above by using one polarization direction and one receive antenna as an example. In other words, the P weighting coefficients may be determined based on a precoded reference signal that is sent on a transmit antenna in one polarization direction and that is received on one receive antenna. However, this shall not constitute any limitation on this application.

When a plurality of receive antennas are configured for the terminal device, one receive antenna described above as an example may be any one of the plurality of receive antennas configured for the terminal device. In other words, the terminal device may determine the P weighting coefficients for each receive antenna according to the foregoing method.

When transmit antennas in a plurality of polarization directions are configured for the network device, the polarization direction described above as an example may be any one of the plurality of polarization directions. In other words, the terminal device may determine, according to the foregoing method, the P weighting coefficients based on a precoded reference signal sent for a transmit antenna in each polarization direction.

If a quantity of polarization directions is 1 and a quantity of receive antennas is R, where R>1, and R is an integer, the third indication information may be used to indicate R groups of angle vectors and R groups of weighting coefficients corresponding to the R receive antennas, where each group of angle vectors may include one or more angle vectors corresponding to the L delay vectors, and each group of weighting coefficients may include P weighting coefficients. Herein, P weighting coefficients corresponding to one receive antenna are P weighting coefficients determined based on a precoded reference signal received on the receive antenna.

Specific content in the first indication information in this case has been described in detail in the foregoing method 200. For brevity, details are not described herein again.

If a quantity of receive antennas is 1 and a quantity of polarization directions is J, where J>1 and J is an integer, the third indication information may be used to indicate J groups of angle vectors and J groups of weighting coefficients corresponding to the J polarization directions, where each group of angle vectors may include one or more angle vectors corresponding to the L delay vectors, and each group of weighting coefficients may include P weighting coefficients. Herein. P weighting coefficients corresponding to one polarization direction are P weighting coefficients determined based on a precoded reference signal transmitted in the polarization direction.

Specific content in the first indication information in this case has been described in detail in the foregoing method 200. For brevity, details are not described herein again.

If a quantity of receive antennas is R and a quantity of polarization directions is J, the third indication information may be used to indicate J×R groups of angle vectors and J×R×P groups of weighting coefficients corresponding to the J polarization directions and the R receive antennas.

Specific content in the first indication information in this case has been described in detail in the foregoing method 200. For brevity, details are not described herein again.

In addition, when a weighting coefficient is fed back based on a receive antenna, the terminal device may further indicate a quantity of receive antennas. Optionally, the method 200 further includes: The terminal device sends eighth indication information, where the eighth indication information is used to indicate a quantity of receive antennas. Correspondingly, the network device receives the eighth indication information.

The eighth indication information and the third indication information may be sent through same signaling such as a PMI or CSI, or may be sent through different signaling. This is not limited in this application.

It should be understood that the quantity of receive antennas of the terminal device may alternatively be pre-defined, for example, defined in a protocol. In this case, the terminal device may not indicate the quantity of receive antennas by using additional signaling.

Actually, the terminal device may feed back a downlink channel measurement result based on each receive antenna, or the terminal device may feed back a downlink channel measurement result based on a transport layer.

In this embodiment, after determining, according to the foregoing method, a weighting coefficient corresponding to each polarization direction and each receive antenna, the terminal device may further process the weighting coefficient to obtain a weighting coefficient fed back based on each transport layer.

In the foregoing method 200, a specific method in which the terminal device determines P weighting coefficients corresponding to each transport layer is described in detail, and a specific method in which the terminal device indicates, by using the first indication information, a weighting coefficient corresponding to each transport layer is also described in detail. In this embodiment, a specific method in which the terminal device determines P weighting coefficients corresponding to each transport layer and a specific method for indicating, by using the fifth indication information, P weighting coefficients corresponding to each transport layer may be similar to the foregoing methods. For brevity, details are not described herein again.

When a weighting coefficient is fed back based on a transport layer, the terminal device may further indicate a quantity of transport layers. Optionally, the method 200 further includes: The terminal device sends ninth indication information, where the ninth indication information is used to indicate a quantity of transport layers. Correspondingly, the network device receives the ninth indication information.

Optionally, the ninth indication information is an RI.

It should be understood that the RI is merely an example of the ninth indication information, and shall not constitute any limitation on this application. A specific form of the ninth indication information is not limited in this application.

It should be further understood that the ninth indication information and the third indication information may be sent through same signaling such as CSI, or may be sent through different signaling. This is not limited in this application.

It should be further understood that the foregoing enumerated method for constructing a coefficient matrix and performing SVD on the coefficient matrix to determine a weighting coefficient corresponding to each transport layer is merely an example and shall not constitute any limitation on this application. A specific method for determining a weighting coefficient corresponding to each transport layer is not limited in this application.

Step 530: The terminal device sends the third indication information. Correspondingly, the network device receives the third indication information.

It should be understood that a specific process of step 530 is the same as that of step 230 in the method 200. Because step 230 has been described in detail in the foregoing method 200, for brevity, details are not described herein again.

Step 540: The network device determines the precoding matrix based on the third indication information.

As described above, the terminal device may feed back an angle vector and a weighting coefficient based on a receive antenna, or may feed back an angle vector and a weighting coefficient based on a transport layer. The network device may determine the precoding matrix based on different feedback granularities and the third indication information.

If the terminal device feeds back an angle vector and a weighting coefficient based on a receive antenna, the third indication information may indicate an angle vector corresponding to one or more receive antennas, and the third indication information may indicate a weighting coefficient corresponding to the one or more receive antennas. The network device may reconstruct a downlink channel based on the angle vector and the weighting coefficient corresponding to each receive antenna to further determine the precoding matrix of each RB.

Specifically, because the P weighting coefficients corresponding to each receive antenna may be in a one-to-one correspondence with the P angle-delay pairs and no space domain precoding is performed on a reference signal, the network device may construct, based on the P weighting coefficients corresponding to each receive antenna and the one or more angle vectors that are in the P angle-delay pairs and that correspond to each delay vector, a space-frequency matrix corresponding to each receive antenna; and reconstruct, based on the space-frequency matrix corresponding to each receive antenna, a downlink channel matrix corresponding to each RB, to determine the precoding matrix corresponding to each RB.

In this embodiment, a space-frequency matrix corresponding to the $r^{th}$ receive antenna may be determined based on P angle-delay pairs corresponding to the $r^{th}$ receive antenna and P weighting coefficients corresponding to the $r^{th}$ receive antenna. The P angle-delay pairs may be used to construct P space-frequency component matrices. As described above, a space-frequency component matrix $a(\theta_{k_l}) \times b(\tau_l)^H$ may be constructed by using the $l^{th}$ delay vector $b(\tau_l)$ in the L delay vectors and the $k_l^{th}$ angle vector $a(\theta_{k_l})$ in the $K_l$ angle vectors. The space-frequency matrix $H_{DL}^{(r)}$ corresponding to the $r^{th}$ receive antenna may be a weighted sum of the P space-frequency component matrices, to be specific, $$H_{DL}^{(r)} = \sum_{l=1}^{L} \sum_{k_l=1}^{K_l} \alpha_{l,k_l}^{(r)} a(\theta_{k_l}) \times b(\tau_l)^H.$$

A dimension of the space-frequency matrix may be T×N. Herein, $\alpha_{l,k_l}^{(r)}$ represents a weighting coefficient that is fed back based on the $r^{th}$ receive antenna and that corresponds to the angle-delay pair formed by the $l^{th}$ delay vector and the $k_l^{th}$ angle vector corresponding to the $l^{th}$ delay vector.

It should be noted that, for ease of understanding, the foregoing uses one polarization direction of a transmit antenna as an example to describe a specific process of determining a space-frequency matrix corresponding to a receive antenna. However, this shall not constitute any limitation on this application. When the quantity of polarization directions of the transmit antenna is greater than 1, the network device may still determine, according to the foregoing method, the space-frequency matrix corresponding to each receive antenna.

For example, if the quantity of polarization directions is 2, the space-frequency matrix corresponding to the $r^{th}$ receive antenna may be determined by using the following calculation formula:

$$H_{DL}^{(r)} = \begin{bmatrix} \sum_{l=1}^{L} \sum_{k_l=1}^{K_l} \alpha_{l,k_l,1}^{(r)} a(\theta_{k_l}) \times b(\tau_l)^H \\ \sum_{l=1}^{L} \sum_{k_l=1}^{K_l} \alpha_{l,k_l,2}^{(r)} a(\theta_{k_l}) \times b(\tau_l)^H \end{bmatrix}.$$

Herein, $\alpha_{l,k_l,1}^{(r)}$ represents a weighting coefficient that is fed back based on the $r^{th}$ receive antenna and that corresponds to the angle-delay pair formed by the $l^{th}$ delay vector and the $k_l^{th}$ delay vector corresponding to the $l^{th}$ delay vector in a first polarization direction; and $\alpha_{l,k_l,2}^{(r)}$ represents a weighting coefficient that is fed back based on the $r^{th}$ receive antenna and that corresponds to the angle-delay pair formed by the $l^{th}$ delay vector and the $k_l^{th}$ delay vector corresponding to the $l^{th}$ delay vector in a second polarization direction.

It can be understood that, when any two of the L delay vectors correspond to K same angle vectors, l in subscripts $k_l$ and $K_l$ in the foregoing calculation formula may be omitted, to be specific, $$H_{DL}^{(r)} = \sum_{l=1}^{L} \sum_{k=1}^{K} \alpha_{k,l}^{(r)} a(\theta_k) \times b(\tau_l)^H \text{ and } H_{DL}^{(r)} = \begin{bmatrix} \sum_{l=1}^{L} \sum_{k=1}^{K} \alpha_{k,l,1}^{(r)} a(\theta_k) \times b(\tau_l)^H \\ \sum_{l=1}^{L} \sum_{k=1}^{K} \alpha_{k,l,2}^{(r)} a(\theta_k) \times b(\tau_l)^H \end{bmatrix}.$$

It should be understood that the foregoing calculation formula of the space-frequency matrix $H_{DL}^{(r)}$ that is defined for the two polarization directions is merely an example, and shall not constitute any limitation on this application. For example, quantities of delay vectors and/or quantities of angle vectors loaded in different polarization directions may be the same or may be different, and delay vectors and/or angle vectors loaded in different polarization directions may be the same or may be different.

For the R receive antennas, the network device may determine space-frequency matrices $H_{DL}^{(1)}$ to $H_{DL}^{(R)}$ based on the P weighting coefficients corresponding to each receive antenna. Therefore, the network device may determine a downlink channel matrix corresponding to each RB.

For example, for an $n^{th}$ RB in the N RBs, the network device may determine a transpose $(V^{(n)})^T$ of a downlink channel matrix corresponding to the $n^{th}$ RB. The matrix $(V^{(n)})^T$ may be determined by using an $n^{th}$ column vector in each of the R space-frequency matrices $H_{DL}^{(1)}$ to $H_{DL}^{(R)}$ that are respectively determined based on the R receive antennas. For example, an $n^{th}$ column in $H_{DL}^{(1)}$ is used as a first column in the matrix $(V^{(n)})^T$, an $n^{th}$ column in $H_{DL}^{(2)}$ is used as a second column in the matrix $(V^{(n)})^T$, and by analogy, an $n^{th}$ column in $H_{DL}^{(r)}$ may be used as an $r^{th}$ column in the matrix $(V^{(n)})^T$. Therefore, the matrix $(V^{(n)})^T$ may be obtained so that the downlink channel matrix $V^{(n)}$ corresponding to the $n^{th}$ RB can be further determined.

The downlink channel matrix corresponding to each RB may be determined according to the foregoing method.

The network device may further determine, based on the downlink channel matrix corresponding to each RB, the precoding matrix corresponding to each RB. For example, the network device may determine the precoding matrix by performing SVD on the downlink channel matrix or a covariance matrix of the channel matrix, or by performing eigenvalue decomposition (EVD) on the covariance matrix of the downlink channel matrix.

It should be understood that, for a specific manner in which the network device determines a precoding matrix based on a channel matrix, refer to the conventional technology. The manner of determining a precoding matrix is not limited in this application.

It should be further understood that the specific process in which the network device determines a downlink channel matrix based on a space-frequency matrix to determine a precoding matrix is shown above only for ease of understanding. However, this shall not constitute any limitation on this application. The network device may alternatively directly determine the precoding matrix based on the space-frequency matrix. For example, the network device may determine a matrix $V^{(n)}$ based on a space-frequency matrix, perform SVD on $V^{(n)}$, and then determine a precoding matrix by taking a right eigenvector. For another example, the network device may directly perform SVD on $(V^{(n)})^T$ and then determine a precoding matrix based on a conjugate obtained by taking a left eigenvector.

If the terminal device feeds back an angle vector and a weighting coefficient based on a transport layer, the third indication information may indicate weighting coefficients corresponding to one or more transport layers. The network device may determine, based on the at least one angle vector and the weighting coefficients corresponding to each transport layer, a space-frequency matrix corresponding to each transport layer and further determine a precoding matrix corresponding to each RB.

Specifically, because the P weighting coefficients corresponding to each transport layer may be in a one-to-one correspondence with the P angle-delay pairs, the network device may construct, based on the P weighting coefficients corresponding to each transport layer and the one or more angle vectors that are in the P angle-delay pairs and that correspond to the delay vector, the space-frequency matrix corresponding to the transport layer.

In this embodiment, a space-frequency matrix $H_{DL}^{(z)}$ corresponding to a $z^{th}$ transport layer may be determined based on P angle-delay pairs and P weighting coefficients corresponding to the $z^{th}$ transport layer. The P angle-delay pairs may be used to construct P space-frequency component matrices. As described above, a space-frequency component matrix $a(\theta_{k_l}) \times b(\tau_l)^H$ may be constructed by using the $l^{th}$ delay vector $b(\tau_l)$ in the L delay vectors and the $k_l^{th}$ angle vector $a(\theta_{k_l})$ in the $K_l$ angle vectors. The space-frequency matrix corresponding to the $z^{th}$ transport layer may be a weighted sum of the P space-frequency component matrices, to be specific.

$$H_{DL}^{(z)} = \sum_{l=1}^{L} \sum_{k_l=1}^{K_l} \alpha_{l,k_l}^{(n)} a(\theta_{k_l}) \times b(\tau_l)^H.$$

Herein, $\alpha_{l,k_l}^{(z)}$ represents a weighting coefficient that is fed back based on the $z^{th}$ transport layer and that corresponds to the angle-delay pair formed by the $l^{th}$ delay vector and the $k_l^{th}$ angle vector corresponding to the $l^{th}$ delay vector. A dimension of the space-frequency matrix may be T×N.

It should be noted that, for ease of understanding, the foregoing uses one polarization direction of a transmit antenna as an example to describe a specific process of determining a space-frequency matrix corresponding to a receive antenna. However, this shall not constitute any limitation on this application. When the quantity of polarization directions of the transmit antenna is greater than 1, the network device may still determine, according to the foregoing method, the space-frequency matrix corresponding to each receive antenna.

For example, if the quantity of polarization directions is 2, the space-frequency matrix corresponding to the $r^{th}$ receive antenna may be determined by using the following calculation formula:

$$H_{DL}^{(z)} = \begin{bmatrix} \sum_{l=1}^{L} \sum_{k_l=1}^{K_l} \alpha_{l,k_l,1}^{(z)} a(\theta_{k_l}) \times b(\tau_l)^H \\ \sum_{l=1}^{L} \sum_{k_l=1}^{K_l} \alpha_{l,k_l,2}^{(z)} a(\theta_{k_l}) \times b(\tau_l)^H \end{bmatrix}.$$

Herein, $\alpha_{l,k_l}^{(z)}$ represents a weighting coefficient that is fed back based on the $z^{th}$ transport layer and that corresponds to an angle-delay pair formed by a $k^{th}$ angle vector and an $l_k^{th}$ delay vector corresponding to the $k^{th}$ angle vector in the first polarization direction; and $\alpha_{l,k_l,2}^{(r)}$ represents a weighting coefficient that is fed back based on the $z^{th}$ transport layer and that corresponds to an angle-delay pair formed by a $k^{th}$ angle vector and an $l_k^{th}$ delay vector corresponding to the $k^{th}$ angle vector in the second polarization direction.

It can be understood that, when any two of the K angle vectors correspond to L same delay vectors, l in subscripts $k_l$ and $K_l$ in the foregoing calculation formula may be omitted, to be specific, $$H_{DL}^{(z)} = \sum_{l=1}^{L} \sum_{k=1}^{K} \alpha_{k,l}^{(z)} a(\theta_k) \times b(\tau_l)^H \text{ and } H_{DL}^{(z)} = \begin{bmatrix} \sum_{l=1}^{L} \sum_{k=1}^{K} \alpha_{k,l,1}^{(z)} a(\theta_k) \times b(\tau_l)^H \\ \sum_{l=1}^{L} \sum_{k=1}^{K} \alpha_{k,l,2}^{(z)} a(\theta_k) \times b(\tau_l)^H \end{bmatrix}.$$

It should be understood that the foregoing calculation formula of the space-frequency matrix $H_{DL}^{(z)}$ that is defined for the two polarization directions is merely an example, and shall not constitute any limitation on this application. For example, quantities of delay vectors and/or quantities of angle vectors loaded in different polarization directions may be the same or may be different, and delay vectors and/or angle vectors loaded in different polarization directions may be the same or may be different.

For the Z transport layers, the network device may determine, based on the P weighting coefficients corresponding to each transport layer, space-frequency matrices $H_{DL}^{(1)}$ to $H_{DL}^{(Z)}$ corresponding to the transport layers. Therefore, the network device may determine the precoding matrix $W^{(n)}$ corresponding to each RB.

For example, for the $n^{th}$ RB in the N RBs, the network device may first determine a conjugate $(W^{(n)})^*$ of a precoding matrix $W^{(n)}$ corresponding to the $n^{th}$ RB. The conjugate of the precoding matrix corresponding to the $n^{th}$ RB may be constructed by an $n^{th}$ column vector in each of the Z space-frequency matrices $H_{DL}^{(1)}$ to $H_{DL}^{(Z)}$ that are respectively determined based on the Z transport layers. For example, an $n^{th}$ column in $H_{DL}^{(1)}$ is used as a first column in the downlink channel matrix $(W^{(n)})^*$, an $n^{th}$ column in $H_{DL}^{(2)}$ is used as a second column in the downlink channel matrix $(W^{(n)})$, and by analogy, an $n^{th}$ column in $H_{DL}^{(z)}$ is used as a $z^{th}$ column in the downlink channel matrix $(W^{(n)})^*$. Therefore, the matrix $(W^{(n)})$ may be obtained so that the precoding matrix $W^{(n)}$ corresponding to the $n^{th}$ RB can be further determined.

The precoding matrix corresponding to each RB may be determined according to the foregoing method. It should be understood that, only for ease of understanding, the foregoing uses a space-frequency component matrix as an example to describe in detail the specific process in which the network device determines a precoding matrix. However, this shall not constitute any limitation on this application. Alternatively, the network device may determine P space-frequency component vectors based on the P angle-delay pairs to further determine the precoding matrix. A person skilled in the art may construct P space-frequency basic units in different forms based on the P angle-delay pairs to further determine the precoding matrix. A manner of constructing the P space-frequency basic units in different forms based on the P angle-delay pairs to determine the precoding matrix based on a weighted sum of the P space-frequency basic units shall fall within the protection scope claimed in this application.

It should be further understood that the foregoing description is merely an example and shows a possible implementation in which the network device determines the precoding matrix based on the third indication information. However, this shall not constitute any limitation on this application. A specific implementation in which the network device determines the precoding matrix based on the fifth indication information is not limited in this application. Based on a same concept, a person skilled in the art performs transform or equivalent replacement on the foregoing enumerated matrix operation, and a method for determining a precoding matrix shall fall within the protection scope of this application.

It should be further understood that the precoding matrix determined above is a precoding matrix corresponding to an RB. Herein, the RB is an example of a frequency domain unit. A precoding matrix corresponding to an RB may be a precoding matrix determined at a granularity of an RB based on a channel matrix corresponding to the RB, or a precoding matrix determined based on a precoded reference signal received on the RB and may be used to precode data transmitted through the RB. A downlink channel corresponding to an RB may be a downlink channel determined based on a precoded reference signal received on the RB, and may be used to determine a precoding matrix corresponding to the RB.

When a granularity of a frequency domain unit is relatively large, for example, when the frequency domain unit is a subband, a PRG, or a PRB, the network device may determine a precoding matrix for the frequency domain unit based on a precoding matrix corresponding to each RB in each frequency domain unit. A specific method in which the network device determines, based on a precoding matrix corresponding to each RB in each frequency domain unit, a precoding matrix corresponding to the frequency domain unit has been described in detail in the foregoing method 200. For brevity, details are not described herein again.

It should be further understood that a weighting coefficient that is mentioned above and that corresponds to an angle vector and a delay vector is a weighting coefficient corresponding to an angle-delay pair formed by the angle vector and the delay vector. For example, a weighting coefficient corresponding to the $k^{th}$ angle vector and the $l^{th}$ delay vector is a weighting coefficient corresponding to an angle-delay pair formed by the $k^{th}$ angle vector and the $l^{th}$ delay vector. For brevity, examples are not described one by one herein.

In this embodiment of this application, the network device precodes a downlink reference signal based on a delay determined through uplink channel measurement so that the terminal device performs downlink channel measurement based on a precoded reference signal. Because the network device precodes a reference signal based on a reciprocal delay between the uplink and downlink channels, the terminal device may not need to feed back a space domain vector and a frequency domain vector (for example, the foregoing transmit antenna port and the foregoing delay vector), but only needs to feed back a weighting coefficient corresponding to an angle-delay pair. This greatly reduces feedback overheads of the terminal device. In addition, based on reciprocity between the uplink and downlink channels, a downlink channel measurement process performed by the terminal device is simplified, and calculation complexity of the terminal device in the channel measurement process is reduced.

It should be understood that a specific process of performing downlink channel measurement and determining a precoding matrix when a space-frequency matrix is obtained based on a transpose of a real channel is shown in this embodiment of this application only for ease of understanding. However, this shall not constitute any limitation on this application. A relationship between the real channel and the space-frequency matrix $H_{DL}$ is not fixed. Different definitions of the space-frequency matrix and the space-frequency component matrix may change the relationship between the real channel and the space-frequency matrix $H_{DL}$. For example, the space-frequency matrix $H_{DL}$ may be obtained based on the transpose of the real channel, or may be obtained based on a conjugate transpose of the real channel.

When the relationship between the space-frequency matrix and the channel matrix is defined differently, operations performed by the network device during delay and angle loading are also different, and operations performed by the terminal device during channel measurement and feedback also correspondingly change. However, these operations are only implementation behavior of the terminal device and the network device and shall not constitute any limitation on this application. The definition of the channel matrix, the dimension and the definition of the space-frequency matrix, and a transform relationship between the channel matrix and the space-frequency matrix are not limited in this application. Likewise, a transform relationship between the space-frequency matrix and the precoding matrix is not limited in this application either.

It should be further understood that sequence numbers of the processes do not mean execution sequences in the foregoing embodiments. The execution sequences of the processes should be determined based on functions and internal logic of the processes and shall not constitute any limitation on the implementation processes of the embodiments of this application.

Figure 7:
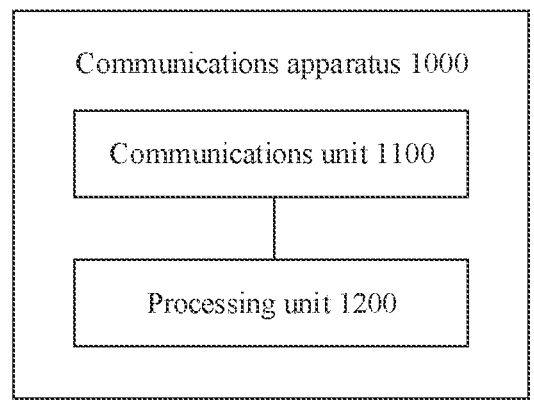
FIG. 7 is a schematic block diagram of a communications apparatus according to an embodiment of this application.
Figure 8:
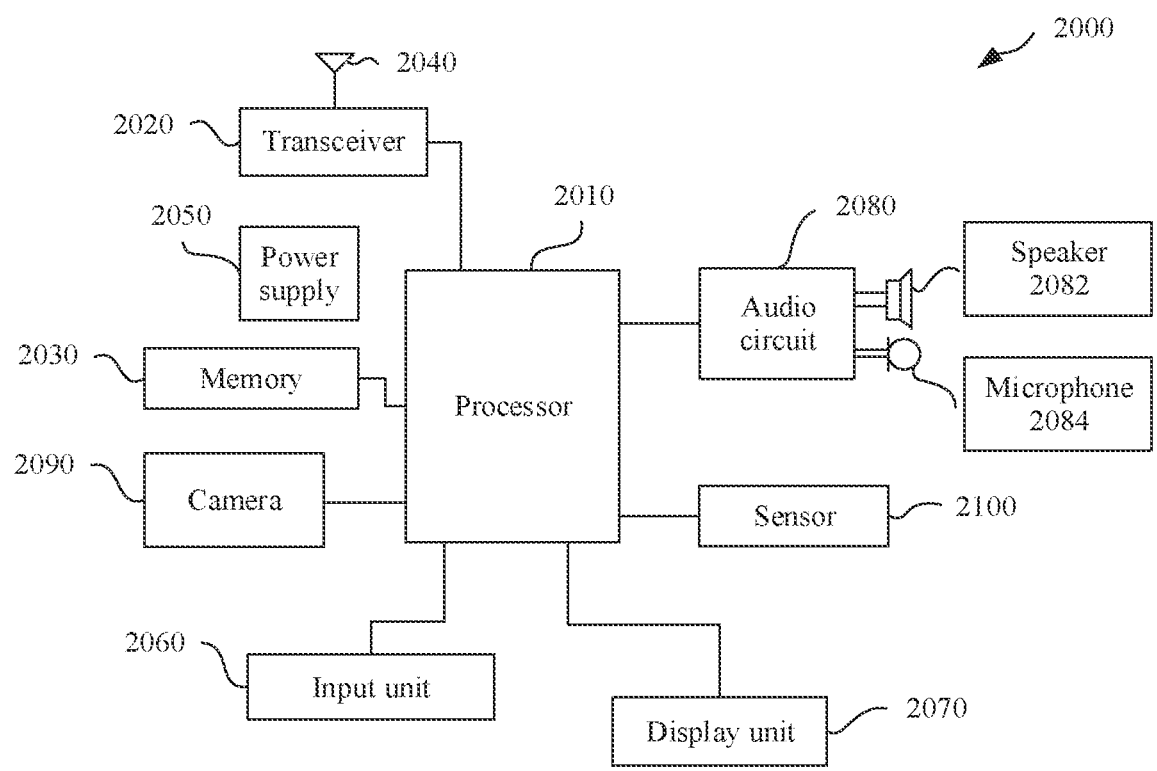
FIG. 8 is a schematic structural diagram of a terminal device according to an embodiment of this application.
Figure 9:
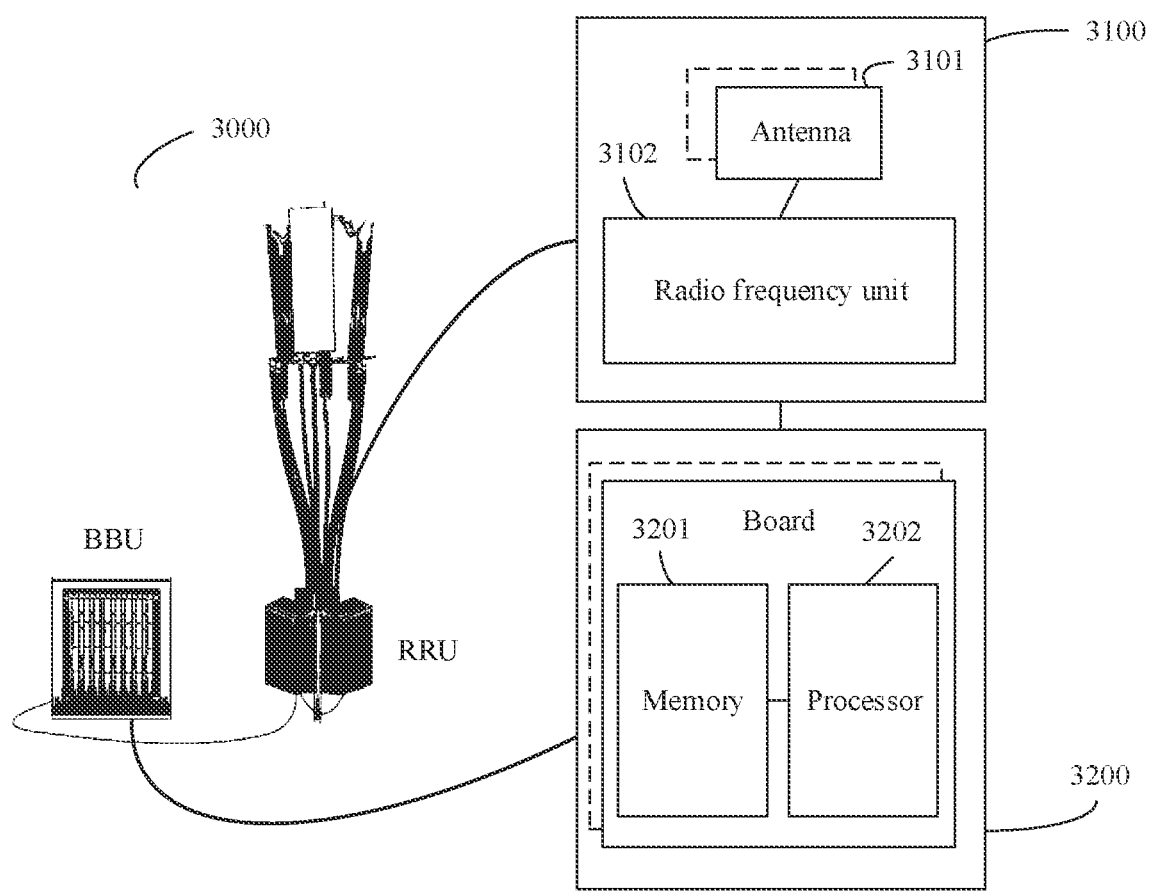
FIG. 9 is a schematic structural diagram of a network device according to an embodiment of this application.

With reference to FIG. 2 to FIG. 6, the foregoing describes in detail the precoding vector indication and determining methods provided in the embodiments of this application. With reference to FIG. 7 to FIG. 9, the following describes in detail communications apparatuses provided in the embodiments of this application.

FIG. 7 is a schematic block diagram of a communications apparatus according to an embodiment of this application. As shown in the figure, the communications apparatus 1000 may include a communications unit 1100 and a processing unit 1200.

In a possible design, the communications apparatus 1000 may correspond to the terminal device in the foregoing method embodiments. For example, the communications apparatus 1000 may be a terminal device, or may be a chip disposed in the terminal device.

Specifically, the communications apparatus 1000 may correspond to the terminal device in the method 200 or the method 500 in the embodiments of this application. The communications apparatus 1000 may include units configured to perform the method 200 in FIG. 2 or the method 500 in FIG. 5 performed by the terminal device. In addition, the units in the communications apparatus 1000 and the foregoing other operations and/or functions are separately intended to implement corresponding procedures of the method 200 in FIG. 2 or the method 500 in FIG. 5.

When the communications apparatus 1000 is configured to perform the method 200 in FIG. 2, the communications unit 1100 may be configured to perform step 210 and step 230 in the method 200, and the processing unit 1200 may be configured to perform step 220 in the method 200.

When the communications apparatus 1000 is configured to perform the method 500 in FIG. 5, the communications unit 1100 may be configured to perform step 510 and step 530 in the method 500, and the processing unit 1200 may be configured to perform step 520 in the method 500.

It should be understood that a specific process in which each unit performs the foregoing corresponding step is described in detail in the foregoing method embodiments. For brevity, details are not described herein again.

It should be further understood that, when the communications apparatus 1000 is a terminal device, the communications unit 1100 in the communications apparatus 1000 may correspond to a transceiver 2020 in a terminal device 2000 shown in FIG. 8, and the processing unit 1200 in the communications apparatus 1000 may correspond to a processor 2010 in the terminal device 2000 shown in FIG. 8.

It should be further understood that, when the communications apparatus 1000 is a chip disposed in a terminal device, the communications unit 1100 in the communications apparatus 1000 may be an input/output interface.

In another possible design, the communications apparatus 1000 may correspond to the network device in the foregoing method embodiments. For example, the communications apparatus 1000 may be a network device, or may be a chip disposed in the network device.

Specifically, the communications apparatus 1000 may correspond to the network device in the method 200 or the method 500 in the embodiments of this application. The communications apparatus 1000 may include units configured to perform the method 200 in FIG. 2 or the method 500 in FIG. 5 performed by the network device. In addition, the units in the communications apparatus 1000 and the foregoing other operations and/or functions are separately intended to implement corresponding procedures of the method 200 in FIG. 2 or the method 500 in FIG. 5.

When the communications apparatus 1000 is configured to perform the method 200 in FIG. 2, the communications unit 1100 may be configured to perform step 210 and step 230 in the method 200, and the processing unit 1200 may be configured to perform step 240 in the method 200.

When the communications apparatus 1000 is configured to perform the method 500 in FIG. 5, the communications unit 1100 may be configured to perform step 510 and step 530 in the method 500, and the processing unit 1200 may be configured to perform step 540 in the method 500.

It should be further understood that, when the communications apparatus 1000 is a network device, the communications unit in the communications apparatus 1000 may correspond to a transceiver 3200 in a network device 3000 shown in FIG. 9, and the processing unit 1200 in the communications apparatus 1000 may correspond to a processor 3100 in the network device 3000 shown in FIG. 9.

It should be further understood that, when the communications apparatus 1000 is a chip disposed in a network device, the communications unit 1100 in the communications apparatus 1000 may be an input/output interface.

FIG. 8 is a schematic structural diagram of a terminal device 2000 according to an embodiment of this application. The terminal device 2000 may be applied to the system shown in FIG. 1, and perform the functions of the terminal device in the foregoing method embodiments. As shown in the figure, the terminal device 2000 includes a processor 2010 and a transceiver 2020. Optionally, the terminal device 2000 further includes a memory 2030. The processor 2010, the transceiver 2020, and the memory 2030 may communicate with each other through an internal connection path, to transfer a control signal and/or a data signal. The memory 2030 is configured to store a computer program. The processor 2010 is configured to invoke the computer program in the memory 2030 and run the computer program, to control the transceiver 2020 to receive or send a signal. Optionally, the terminal device 2000 may further include an antenna 2040, configured to send, by using a radio signal, uplink data or uplink control signaling that is output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit in FIG. 7.

The transceiver 2020 may correspond to the communications unit in FIG. 7, and may also be referred to as a transceiver unit. The transceiver 2020 may include a receiver (or referred to as a receiver or a receiver circuit) and a transmitter (or referred to as a transmitter or a transmitter circuit). The receiver is configured to receive a signal, and the transmitter is configured to transmit a signal.

It should be understood that the terminal device 2000 shown in FIG. 8 can implement each process performed by the terminal device in the method embodiment in FIG. 2 or FIG. 5. The operations and/or the functions of the modules in the terminal device 2000 are intended to implement corresponding procedures in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments. The transceiver 2020 may be configured to perform an action that is of sending information by the terminal device to the network device or receiving information by the terminal device from the network device and that is described in the foregoing method embodiments. For details, refer to the descriptions in the foregoing method embodiments. Details are not described herein again.

Optionally, the terminal device 2000 may further include a power supply 2050, configured to supply power to various components or circuits in the terminal device.

In addition, to improve functions of the terminal device, the terminal device 2000 may further include one or more of an input unit 2060, a display unit 2070, an audio circuit 2080, a camera 2090, a sensor 2100, and the like. The audio circuit may further include a speaker 2082, a microphone 2084, and the like.

FIG. 9 is a schematic structural diagram of a network device according to an embodiment of this application, for example, may be a schematic structural diagram of a base station. The base station 3000 may be applied to the system shown in FIG. 1 and perform functions of the network device in the foregoing method embodiments. As shown in the figure, the base station 3000 may include one or more radio frequency units, for example, a remote radio unit (RRU) 3100 and one or more baseband units (BBU) (which may also be referred to as distributed units (DU)) 3200. The RRU 3100 may be referred to as a transceiver unit, and corresponds to the communications unit 1100 in FIG. 7. Optionally, the transceiver unit 3100 may also be referred to as a transceiver machine, a transceiver circuit, a transceiver, or the like, and may include at least one antenna 3101 and a radio frequency unit 3102. Optionally, the transceiver unit 3100 may include a receiving unit and a sending unit. The receiving unit may correspond to a receiver (or referred to as a receiver or a receiver circuit), and the sending unit may correspond to a transmitter (or referred to as a transmitter or a transmitter circuit). The RRU 3100 is mainly configured to: receive and send a radio frequency signal, and perform conversion between a radio frequency signal and a baseband signal. For example, the RRU 3100 is configured to send indication information to a terminal device. The BBU 3200 is mainly configured to: perform baseband processing, control the base station, and so on. The RRU 3100 and the BBU 3200 may be physically disposed together, or may be physically disposed separately; to be specific, the base station is a distributed base station.

The BBU 3200 is a control center of the base station, which may be referred to as a processing unit, may correspond to the processing unit 1200 in FIG. 7, and is mainly configured to implement a baseband processing function, for example, channel coding, multiplexing, modulation, or spreading. For example, the BBU (the processing unit) may be configured to control the base station to perform an operation procedure related to the network device in the foregoing method embodiments, for example, to generate the foregoing indication information.

In an example, the BBU 3200 may include one or more boards, and a plurality of boards may jointly support a radio access network (such as an LTE network) having a single access standard, or may separately support radio access networks (such as an LTE network, a 5G network, or another network) having different access standards. The BBU 3200 further includes a memory 3201 and a processor 3202. The memory 3201 is configured to store necessary instructions and necessary data. The processor 3202 is configured to control the base station to perform a necessary action, for example, configured to control the base station to perform the operation procedure related to the network device in the foregoing method embodiments. The memory 3201 and the processor 3202 may serve one or more boards. In other words, a memory and a processor may be independently disposed on each board, or a plurality of boards may share a same memory and a same processor. In addition, a necessary circuit may further be disposed on each board.

It should be understood that the base station 3000 shown in FIG. 9 can implement each process performed by the network device in the method embodiment in FIG. 2 or FIG. 5. The operations and/or functions of the modules in the base station 3000 are intended to implement corresponding procedures in the foregoing method embodiments. For details, refer to the descriptions in the foregoing method embodiments. To avoid repetition, detailed descriptions are properly omitted herein.

The BBU 3200 may be configured to perform an action that is implemented inside the network device and that is described in the foregoing method embodiments. The RRU 3100 may be configured to perform an action that is of sending information by the network device to the terminal device or receiving information by the network device from the terminal device and that is described in the foregoing method embodiments. For details, refer to the descriptions in the foregoing method embodiments. Details are not described herein again.

An embodiment of this application further provides a processing apparatus including a processor and an interface. The processor is configured to perform the communication method in any one of the foregoing method embodiments.

It should be understood that, the processing apparatus may be a chip. For example, the processing apparatus may be a field programmable gate array (FPGA), an application-specific integrated circuit (ASIC), a system on a-chip (SoC), a central processing unit (CPU), a network processor (NP), a digital signal processing circuit (DSP), a micro controller unit (MCU), a programmable logic device (PLD), or another integrated chip.

In an implementation process, the steps in the foregoing method may be implemented by using a hardware integrated logic circuit in the processor, or by using instructions in a form of software. The steps of the methods disclosed with reference to the embodiments of this application may be directly performed by a hardware processor, or may be performed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that, the processor in the embodiments of this application may be an integrated circuit chip and has a signal processing capability. In an implementation process, the steps in the foregoing method embodiments may be implemented by using a hardware integrated logic circuit in the processor, or by using instructions in a form of software. The foregoing processor may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in the embodiments of this application. The general purpose processor may be a microprocessor, or the processor may be any conventional processor, or the like. The steps of the methods disclosed with reference to the embodiments of this application may be directly performed by a hardware decoding processor, or may be performed by a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It can be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memories in the systems and methods described in this specification include but are not limited to these memories and any memory of another suitable type.

According to the methods provided in the embodiments of this application, this application further provides a computer program product. The computer program product includes computer program code. When the computer program code is run on a computer, the computer is enabled to perform the method in either of the embodiments shown in FIG. 2 and FIG. 5.

According to the methods provided in the embodiments of this application, this application further provides a computer-readable medium. The computer-readable medium stores program code. When the program code is run on a computer, the computer is enabled to perform the method in either of the embodiments shown in FIG. 2 and FIG. 5.

According to the methods provided in the embodiments of this application, this application further provides a system. The system includes one or more terminal devices and one or more network devices described above.

All or a part of the foregoing embodiments may be implemented by using software, hardware, firmware, or any combination thereof. When the software is used to implement the embodiments, all or a part of the embodiments may be implemented in a form of a computer program product. The computer program product includes one or more computer instructions. When the computer instructions are loaded and executed on a computer, all or some of the procedures or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments entirely correspond to the network device or the terminal device in the method embodiments, and a corresponding module or unit performs a corresponding step. For example, a communications unit (a transceiver) performs a receiving step or a sending step in the method embodiments, and a processing unit (a processor) may perform steps other than the sending step or the receiving step. For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. The components may communicate, by using a local and/or remote process and based on, for example, a signal having one or more data packets (for example, data from two components interacting with another component in a local system, in a distributed system and/or across a network such as the Internet interacting with another system by using the signal).

A person of ordinary skill in the art may be aware that, in combination with examples described in the embodiments disclosed in this specification, units and algorithm steps be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

When functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel measurement method, comprising:
   receiving one or more precoded reference signals, wherein the one or more precoded reference signals are obtained by precoding one or more reference signals based on K angle vectors;
   generating first indication information, wherein the first indication information is used to indicate at least one delay vector and P weighting coefficients corresponding to P angle-delay pairs, the at least one delay vector and the P weighting coefficients are determined based on the one or more precoded reference signals, each of the P angle-delay pairs comprises one of the K angle vectors and one of the at least one delay vector, and the P angle-delay pairs and the P weighting coefficients are used to determine a precoding matrix, wherein both P and K are positive integers, and wherein P≥1, K≥1; and
   sending the first indication information.

2. The method according to claim 1, wherein:
   the at least one delay vector comprises one or more delay vectors fed back for each of the K angle vectors; and
   for a $k^{th}$ angle vector in the K angle vectors, the first indication information is used to indicate $L_k$ delay vectors, and the $k^{th}$ angle vector and the $L_k$ delay vectors are used to determine $L_k$ angle-delay pairs in the P angle-delay pairs, wherein $L_k \geq 1$ and $L_k$ is an integer.

3. The method according to claim 1, wherein the method further comprises:
   receiving second indication information, wherein the second indication information is used to indicate a quantity of delay vectors fed back for each of the K angle vectors.

4. The method according to claim 1, wherein the method further comprises:
   sending second indication information, wherein the second indication information is used to indicate a quantity of delay vectors fed back for each of the K angle vectors.

5. The method according to claim 1, wherein a quantity of delay vectors fed back for each of the K angle vectors is a predefined value.

6. The method according to claim 1, wherein in the K angle vectors, a delay vector fed back for a first angle vector is the same as a delay vector fed back for a second angle vector, the first angle vector and the second angle vector are any two angle vectors in the K angle vectors, and the first indication information is used to indicate L delay vectors, wherein L≥1 and L is an integer.

7. The method according to claim 1, wherein:
   the P weighting coefficients comprise one or more weighting coefficients fed back for each of the K angle vectors; and
   for a $k^{th}$ angle vector in the K angle vectors, the first indication information is used to indicate $L_k$ weighting coefficients, the $L_k$ weighting coefficients correspond to $L_k$ angle-delay pairs in the P angle-delay pairs, and each of the $L_k$ angle-delay pairs comprises the $k^{th}$ angle vector and one of $L_k$ delay vectors corresponding to the $k^{th}$ angle vector, wherein $L_k \geq 1$ and $L_k$ is an integer.

8. The method according to claim 1, wherein the K angle vectors are determined through uplink channel measurement.

9. The method according to claim 1, wherein the P weighting coefficients correspond to one receive antenna or one transport layer.

10. A channel measurement method, comprising:
    sending one or more precoded reference signals, wherein the one or more precoded reference signals are obtained by precoding one or more reference signals based on K angle vectors;
    receiving first indication information, wherein the first indication information is used to indicate at least one delay vector and P weighting coefficients corresponding to P angle-delay pairs, the at least one delay vector and the P weighting coefficients are determined based on the one or more precoded reference signals, each of the P angle-delay pairs comprises one of the K angle vectors and one of the at least one delay vector, and the P angle-delay pairs and the P weighting coefficients are used to determine a precoding matrix, wherein both P and K are positive integers, and wherein P≥1, K≥1; and
    determining the precoding matrix based on the first indication information.

11. The method according to claim 10, wherein:
    the at least one delay vector comprises one or more delay vectors fed back for each of the K angle vectors; and
    for a $k^{th}$ angle vector in the K angle vectors, the first indication information is used to indicate $L_k$ delay vectors, and the $k^{th}$ angle vector and the $L_k$ delay vectors are used to determine $L_k$ angle-delay pairs in the P angle-delay pairs, wherein $L_k \geq 1$ and $L_k$ is an integer.

12. The method according to claim 10, wherein the method further comprises:
    sending second indication information, wherein the second indication information is used to indicate a quantity of delay vectors fed back for each of the K angle vectors.

13. The method according to claim 10, wherein the method further comprises:
    receiving second indication information, wherein the second indication information is used to indicate a quantity of delay vectors fed back for each of the K angle vectors.

14. The method according to claim 10, wherein a quantity of delay vectors fed back for each of the K angle vectors is a predefined value.

15. The method according to claim 10, wherein in the K angle vectors, a delay vector fed back for a first angle vector is the same as a delay vector fed back for a second angle vector, the first angle vector and the second angle vector are any two angle vectors in the K angle vectors, and the first indication information is used to indicate L delay vectors, wherein L≥1 and L is an integer.

16. The method according to claim 10, wherein:
    the P weighting coefficients comprise one or more weighting coefficients fed back for each of the K angle vectors; and for a $k^{th}$ angle vector in the K angle vectors, the first indication information is used to indicate $L_k$ weighting coefficients, the $L_k$ weighting coefficients correspond to $L_k$ angle-delay pairs in the P angle-delay pairs, and each of the $L_k$ angle-delay pairs comprises the $k^{th}$ angle vector and one of $L_k$ delay vectors corresponding to the $k^{th}$ angle vector, wherein $L_k \geq 1$ and $L_k$ is an integer.

17. The method according to claim 10, wherein the K angle vectors are determined through uplink channel measurement.

18. The method according to claim 10, wherein the P weighting coefficients correspond to one receive antenna or one transport layer.

19. A communications apparatus, comprising:
at least one processor;
a transceiver; and
one or more memories coupled to the at least one processor and storing programming instructions for execution by the at least one processor to:
  receive, by the transceiver, one or more precoded reference signals, wherein the one or more precoded reference signals are obtained by precoding one or more reference signals based on K angle vectors;
  generate first indication information, wherein the first indication information is used to indicate at least one delay vector and P weighting coefficients corresponding to P angle-delay pairs, the at least one delay vector and the P weighting coefficients are determined based on the one or more precoded reference signals, each of the P angle-delay pairs comprises one of the K angle vectors and one of the at least one delay vector, and the P angle-delay pairs and the P weighting coefficients are used to determine a precoding matrix, wherein both P and K are positive integers, and wherein $P \geq 1$, $K \geq 1$; and
send, by the transceiver, the first indication information.

20. The apparatus according to claim 19, wherein:
the at least one delay vector comprises one or more delay vectors fed back for each of the K angle vectors; and
for a $k^{th}$ angle vector in the K angle vectors, the first indication information is used to indicate $L_k$ delay vectors, and the $k^{th}$ angle vector and the $L_k$ delay vectors are used to determine $L_k$ angle-delay pairs in the P angle-delay pairs, wherein $L_k \geq 1$ and $L_k$ is an integer.

* * * * *

UNITED STATES PATENT AND TRADEMARK OFFICE
CERTIFICATE OF CORRECTION

| | |
|---|---|
| PATENT NO. | : 11,411,623 B2 |
| APPLICATION NO. | : 17/347850 |
| DATED | : August 9, 2022 |
| INVENTOR(S) | : Haifan Yin et al. |

It is certified that error appears in the above-identified patent and that said Letters Patent is hereby corrected as shown below:

On the Title Page

Item (56) References Cited, in OTHER PUBLICATIONS, delete "V15.3 0" and insert -- V15.3.0 --.

Signed and Sealed this
Eleventh Day of April, 2023

Katherine Kelly Vidal
*Director of the United States Patent and Trademark Office*